US011388477B2

(12) United States Patent
Loheide et al.

(10) Patent No.: US 11,388,477 B2
(45) Date of Patent: *Jul. 12, 2022

(54) CLIENT-SIDE DYNAMIC PRESENTATION OF PROGRAMMING CONTENT IN AN INDEXED DISPARATE LIVE MEDIA OUTPUT STREAM

(71) Applicant: Turner Broadcasting System, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/017,052

(22) Filed: Sep. 10, 2020

(65) Prior Publication Data

US 2020/0413141 A1 Dec. 31, 2020

Related U.S. Application Data

(63) Continuation-in-part of application No. 16/234,870, filed on Dec. 28, 2018, now Pat. No. 10,965,967, (Continued)

(51) Int. Cl.
*H04N 21/458* (2011.01)
*H04N 21/433* (2011.01)
*H04N 21/8547* (2011.01)

(52) U.S. Cl.
CPC ......... *H04N 21/458* (2013.01); *H04N 21/433* (2013.01); *H04N 21/8547* (2013.01)

(58) Field of Classification Search
CPC ............... H04N 21/84; H04N 21/8456; H04N 21/2187; H04L 65/601; H04L 65/607
See application file for complete search history.

(56) References Cited

U.S. PATENT DOCUMENTS 8,553,853 B2 10/2013 Middleswarth et al.
8,600,382 B2 12/2013 Hicks, III
(Continued)

OTHER PUBLICATIONS

Corrected Notice of Allowability for U.S. Appl. No. 16/230,493 dated Jul. 8, 2021.
(Continued)

*Primary Examiner* — Chenea Davis
(74) *Attorney, Agent, or Firm* — Chip Law Group

(57) ABSTRACT

A system is provided for client-side dynamic presentation of programming content in indexed disparate live media output stream. Client request is generated based on user input when indexed first disparate live media output stream is played back or to be played back at client interface of first client device. The client request comprises at least a program identifier referenced in published first programming schedule with respect to playback position in published first programming schedule that comprises one or more functionalities enabled via one or more constraints and rights associated with at least indexed first disparate live media output stream. Based on insertion of manifest data and indexed metadata associated with program identifier, at least one of the first disparate live media output stream is altered or second disparate live media output stream is generated, which comprises manifest data, indexed metadata and updated playback position, is presented at client interface based on client request.

25 Claims, 21 Drawing Sheets

Related U.S. Application Data which is a continuation-in-part of application No. 15/396,475, filed on Dec. 31, 2016, now Pat. No. 11,134,309.

(60) Provisional application No. 62/898,582, filed on Sep. 11, 2019, provisional application No. 62/699,131, filed on Jul. 17, 2018.

(56) References Cited

U.S. PATENT DOCUMENTS

| | | | |
|---|---|---|---|
| 8,954,521 | B1 | 2/2015 | Faaborg et al. |
| 2003/0110507 | A1 | 6/2003 | Dimitrova et al. |
| 2003/0236832 | A1 | 12/2003 | McIntyre et al. |
| 2004/0172650 | A1 | 9/2004 | Hawkins et al. |
| 2004/0172662 | A1 | 9/2004 | Danker et al. |
| 2005/0015816 | A1 | 1/2005 | Christofalo et al. |
| 2006/0287915 | A1 | 12/2006 | Boulet et al. |
| 2007/0186228 | A1 | 8/2007 | Ramaswamy et al. |
| 2009/0285217 | A1 | 11/2009 | Frink et al. |
| 2010/0010899 | A1 | 1/2010 | Lambert et al. |
| 2010/0287297 | A1 | 11/2010 | Lefebvre |
| 2011/0123062 | A1 | 5/2011 | Hilu |
| 2011/0153464 | A1 | 6/2011 | Hendricks et al. |
| 2011/0246202 | A1 | 10/2011 | McMillan et al. |
| 2013/0205212 | A1 | 8/2013 | Sinha et al. |
| 2014/0186001 | A1 | 7/2014 | Aldrey et al. |
| 2014/0189514 | A1 | 7/2014 | Hilliard |
| 2014/0359656 | A1 | 12/2014 | Banica et al. |
| 2015/0074732 | A1 | 3/2015 | Green et al. |
| 2016/0105477 | A1 | 4/2016 | Holden et al. |
| 2016/0142783 | A1 | 5/2016 | Bagga et al. |
| 2016/0150290 | A1 | 5/2016 | Chandler et al. |
| 2016/0316247 | A1 | 10/2016 | Biagini et al. |
| 2017/0099506 | A1 | 4/2017 | Grover |
| 2017/0164019 | A1 | 6/2017 | Oh et al. |
| 2017/0195718 | A1 | 7/2017 | Nair et al. |
| 2017/0257446 | A1 | 9/2017 | Bevilacqua et al. |
| 2017/0289597 | A1* | 10/2017 | Riedel ............ H04N 21/25875 |
| 2018/0343505 | A1 | 11/2018 | Loheide et al. |
| 2020/0059308 | A1 | 2/2020 | Cox et al. |

OTHER PUBLICATIONS

Corrected Notice of Allowance for U.S. Appl. No. 16/902,775 dated Jul. 30, 2021.
Corrected Notice of Allowance for U.S. Appl. No. 15/396,475 dated Aug. 24, 2021.
Corrected Notice of Allowance for U.S. Appl. No. 15/396,475 dated Jul. 12, 2021.
Corrected Notice of Allowance for U.S. Appl. No. 15/986,406 dated Jul. 16, 2021.
Corrected Notice of Allowance for U.S. Appl. No. 15/986,451 dated Aug. 11, 2021.
Final Office Action for U.S. Appl. No. 16/854,970 dated Aug. 18, 2021.
Non-Final Office Action for U.S. Appl. No. 16/918,085 dated Aug. 19, 2021.
Non-Final Office Action for U.S. Appl. No. 15/988,572 dated Aug. 25, 2021.
Non-Final Office Action for U.S. Appl. No. 16/985,444 dated Sep. 3, 2021.
Non-Final Office Action for U.S. Appl. No. 17/094,102 dated Sep. 20, 2021.
Notice of Allowance for U.S. Appl. No. 15/988,308 dated Jul. 30, 2021.
Notice of Allowance for U.S. Appl. No. 15/988,492 dated Jul. 30, 2021.
Corrected Notice of Allowance for U.S. Appl. No. 16/234,870 dated Feb. 24, 2021.
Corrected Notice of Allowance for U.S. Appl. No. 16/234,870 dated Jan. 15, 2021.
Final Office Action for U.S. Appl. No. 15/396,468 dated Feb. 10, 2021.
Final Office Action for U.S. Appl. No. 15/988,308 dated Jan. 28, 2021.
Final Office Action for U.S. Appl. No. 15/988,492 dated Jan. 6, 2021.
Non-Final Office Action for U.S. Appl. No. 16/854,970 dated Mar. 17, 2021.
Notice of Allowance for U.S. Appl. No. 15/396,475 dated Feb. 5, 2021.
Notice of Allowance for U.S. Appl. No. 15/986,406 dated Mar. 3, 2021.
Notice of Allowance for U.S. Appl. No. 16/229,310 dated Dec. 14, 2020.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,493 dated Feb. 12, 2021.
Notice of Allowance for U.S. Appl. No. 16/902,775 dated Feb. 2, 2021.
Supplemental Notice of Allowance for U.S. Appl. No. 15/986,218 dated Jan. 27, 2021.
Corrected Notice of Allowance for U.S. Appl. No. 16/235,445 dated Mar. 26, 2021.
Corrected Notice of Allowance for U.S. Appl. No. 15/986,286 dated May 27, 2021.
Corrected Notice of Allowance for U.S. Appl. No. 16/229,310 dated Apr. 27, 2021.
Corrected Notice of Allowance for U.S. Appl. No. 16/229,310 dated Jun. 3, 2021.
Corrected Notice of Allowance for U.S. Appl. No. 16/229,497 dated Jun. 3, 2021.
Corrected Notice of Allowance for U.S. Appl. No. 16/229,614 dated Jun. 29, 2021.
Corrected Notice of Allowance for U.S. Appl. No. 16/236,713 dated Apr. 8, 2021.
Corrected Notice of Allowance for U.S. Appl. No. 16/236,713 dated May 17, 2021.
Corrected Notice of Allowance for U.S. Appl. No. 16/902,775 dated Apr. 26, 2021.
Corrected Notice of Allowance for U.S. Appl. No. 16/902,775 dated Apr. 9, 2021.
Corrected Notice of Allowance for U.S. Appl. No. 16/902,775 dated Jun. 11, 2021.
Final Office Action for U.S. Appl. No. 15/988,572 dated May 12, 2021.
Non-Final Office Action for U.S. Appl. No. 15/396,468 dated Jun. 1, 2021.
Non-Final Office Action for U.S. Appl. No. 15/988,492 dated Apr. 14, 2021.
Non-Final Office Action for U.S. Appl. No. 17/038,323 dated Jul. 1, 2021.
Notice of Allowance for U.S. Appl. No. 15/986,451 dated May 5, 2021.
Supplemental Notice of Allowance for U.S. Appl. No. 15/986,406 dated Apr. 7, 2021.
Supplemental Notice of Allowance for U.S. Appl. No. 15/986,406 dated Jun. 9, 2021.
Corrected Notice of Allowance for U.S. Appl. No. 15/988,241 dated Nov. 18, 2020.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/236,673 dated Oct. 23, 2020.

(56) References Cited

OTHER PUBLICATIONS

Corrected Notice of Allowance for U.S. Appl. No. 16/236,673 dated Sep. 21, 2020.
Final Office Action for U.S. Appl. No. 15/986,451 dated Sep. 29, 2020.
Final Office Action for U.S. Appl. No. 16/236,713 dated Sep. 30, 2020.
Non-Final Office Action for U.S. Appl. No. 15/986,406 dated Oct. 30, 2020.
Non-Final Office Action for U.S. Appl. No. 15/988,572 dated Nov. 6, 2020.
Non-Final Office Action for U.S. Appl. No. 16/902,775 dated Oct. 5, 2020.
Notice of Allowability for U.S. Appl. No. 15/986,361 dated Sep. 30, 2020.
Notice of Allowance for U.S. Appl. No. 16/235,445 dated Nov. 4, 2020.
Notice of Allowance for U.S. Appl. No. 16/236,713 dated Nov. 18, 2020.
Corrected Notice of Allowance for U.S. Appl. No. 15/986,451 dated Jan. 5, 2022.
Corrected Notice of Allowance for U.S. Appl. No. 15/986,451 dated Nov. 16, 2021.
Corrected Notice of Allowance for U.S. Appl. No. 15/988,308 dated Dec. 22, 2021.
Corrected Notice of Allowance for U.S. Appl. No. 15/988,308 dated Oct. 20, 2021.
Corrected Notice of Allowance for U.S. Appl. No. 15/988,492 dated Dec. 3, 2021.
Corrected Notice of Allowance for U.S. Appl. No. 15/988,492 dated Oct. 20, 2021.
Corrected Notice of Allowance for U.S. Appl. No. 17/326,258 dated Dec. 22, 2021.
Final Office Action for U.S. Appl. No. 15/396,468 dated Dec. 2, 2021.
Final Office Action for U.S. Appl. No. 16/918,085 dated Dec. 8, 2021.
Final Office Action for U.S. Appl. No. 17/038,323 dated Nov. 1, 2021.
Non-Final Office Action for U.S. Appl. No. 17/017,145 dated Dec. 22, 2021.
Non-Final Office Action for U.S. Appl. No. 17/017,241 dated Dec. 20, 2021.
Non-Final Office Action for U.S. Appl. No. 17/094,319 dated Dec. 8, 2021.
Non-Final Office Action for U.S. Appl. No. 17/147,887 dated Dec. 22, 2021.
Non-Final Office Acton for U.S. Appl. No. 17/016,789 dated Dec. 21, 2021.
Notice of Allowance for U.S. Appl. No. 16/985,444 dated Jan. 10, 2022.
Notice of Allowance for U.S. Appl. No. 17/038,323 dated Jan. 12, 2022.
Notice of Allowance for U.S. Appl. No. 17/094,102 dated Jan. 14, 2022.
Notice of Allowance for U.S. Appl. No. 17/326,258 dated Nov. 17, 2021.
Supplemental Notice of Allowance for U.S. Appl. No. 15/988,492 dated Nov. 9, 2021.
Corrected Notice of Allowance for U.S. Appl. No. 15/396,468 dated Apr. 1, 2022.
Corrected Notice of Allowance for U.S. Appl. No. 15/988,308 dated Jan. 24, 2022.
Corrected Notice of Allowance for U.S. Appl. No. 15/988,308 dated Mar. 2, 2022.
Corrected Notice of Allowance for U.S. Appl. No. 16/985,444 dated Apr. 20, 2022.
Corrected Notice of Allowance for U.S. Appl. No. 16/985,444 dated Mar. 25, 2022.
Corrected Notice of Allowance for U.S. Appl. No. 17/017,145 dated Mar. 4, 2022.
Corrected Notice of Allowance for U.S. Appl. No. 17/038,323 dated Apr. 19, 2022.
Corrected Notice of Allowance for U.S. Appl. No. 17/038,323 dated Feb. 2, 2022.
Corrected Notice of Allowance for U.S. Appl. No. 17/094,102 dated Apr. 20, 2022.
Corrected Notice of Allowance for U.S. Appl. No. 17/094,102 dated Mar. 10, 2022.
Corrected Notice of Allowance for U.S. Appl. No. 17/326,258 dated Apr. 19, 2022.
Corrected Notice of Allowance for U.S. Appl. No. 17/326,258 dated Feb. 25, 2022.
Corrected Notice of Allowance for U.S. Appl. No. 17/326,258 dated Mar. 14, 2022.
Corrected Notice of Allowance for U.S. Appl. No. 17/326,258 dated Mar. 2, 2022.
Final Office Action for U.S. Appl. No. 15/988,572 dated Mar. 10, 2022.
Non-Final Office Action for U.S. Appl. No. 16/854,970 dated Feb. 17, 2022.
Non-Final Office Action for U.S. Appl. No. 16/918,085 dated Mar. 31, 2022.
Notice of Allowance for U.S. Appl. No. 15/396,468 dated Mar. 18, 2022.
Notice of Allowance for U.S. Appl. No. 16/895,439 dated Mar. 1, 2022.
Notice of Allowance for U.S. Appl. No. 16/902,893 dated Feb. 25, 2022.
Notice of Allowance for U.S. Appl. No. 17/016,789 dated Feb. 11, 2022.
Notice of Allowance for U.S. Appl. No. 17/017,145 dated Feb. 16, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/340,166 dated Mar. 21, 2022.
Final Office Action for U.S. Appl. No. 17/017,241 dated Apr. 28, 2022.
Notice of Allowance for U.S. Appl. No. 17/326,258 dated Apr. 27, 2022.

* cited by examiner

CLIENT-SIDE DYNAMIC PRESENTATION OF PROGRAMMING CONTENT IN AN INDEXED DISPARATE LIVE MEDIA OUTPUT STREAM

CROSS-REFERENCE TO RELATED APPLICATIONS/INCORPORATION BY REFERENCE

This patent application claims priority to, and the benefit of U.S. Provisional Application Ser. No. 62/898,582, filed on Sep. 11, 2019, and is a Continuation-in-part of U.S. patent application Ser. No. 16/234,870, filed on Dec. 28, 2018, which claims priority to and the benefit from U.S. Provisional Application Ser. No. 62/699,131, filed Jul. 17, 2018, and which is a continuation-in-part of U.S. patent application Ser. No. 15/396,475, filed on Dec. 31, 2016.

This application also makes reference to:
U.S. application Ser. No. 16/229,310, filed on Dec. 21, 2018;
U.S. application Ser. No. 16/229,497, filed on Dec. 28, 2018;
U.S. application Ser. No. 16/229,614, filed on Dec. 21, 2018;
U.S. application Ser. No. 16/235,445, filed on Dec. 28, 2018;
U.S. application Ser. No. 16/236,673, filed on Dec. 31, 2018;
U.S. application Ser. No. 17/016,789, filed on Sep. 10, 2020;
U.S. application Ser. No. 17/017,145, filed on Sep. 10, 2020; and
U.S. application Ser. No. 17/017,241, filed on Sep. 10, 2020.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for publishing a disparate per-client live media output stream based on dynamic insertion of targeted non-programming content and customized programming content, and for client-side dynamic presentation of programming content in an indexed disparate live media output stream.

BACKGROUND

Recent advancements in the field of television content packaging and distribution systems have led to a massive development of numerous technologies and broadcasting platforms that are revolutionizing the way consumer devices access and playout media content. Usually, broadcasting platforms refer to the types of networks that are used to deliver the media content to the consumers. Currently, the broadcasting platforms, such as analog terrestrial broadcast, digital terrestrial broadcast, direct-to-home satellite broadcast, cable, Internet Protocol (IP), and over-the-top television (OTT), compete and strive to increase their appeal by gaining and retaining the audience viewing the media content.

Modern streaming protocols, such as HTTP Live Streaming (HLS) and Dynamic Adaptive Streaming over HTTP (DASH), are implemented to support streaming of various live content services, such as DIRECTV NOW℠, SLING TV℠ and PLAYSTAYION™ VUE, to consumer devices. Due to dissemination of such modern streaming protocols in the television, radio, and broadcasting sector, it is evident that the success of broadcasting will be dependent on the ability of the network provider to gain access to the content that consumers demand, and to differentiate their offering from that of incumbent broadcasters or find breakthrough modes of media content delivery.

Existing systems for Server-Side Ad Insertion (SSAI) support live streaming and make decisions to insert non-programing content in near real-time. However, for On-Demand streaming, such decisions to insert non-programing content are made upfront. Further, legacy technology of the existing systems for server-side content insertion and client-side content presentation support a finite playback buffer as the encoder typically publishes a rolling window having limited duration. Accordingly, amount of control the user can excerpt to influence what non-programming content and programming content is shown may get limited. Further, a concern with SSAI systems may be scaling to support millions of simultaneous sessions.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for publishing a disparate per-client live media output stream based on dynamic insertion of targeted non-programming content and customized programming content, and for client-side dynamic presentation of programming content in an indexed disparate live media output stream, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
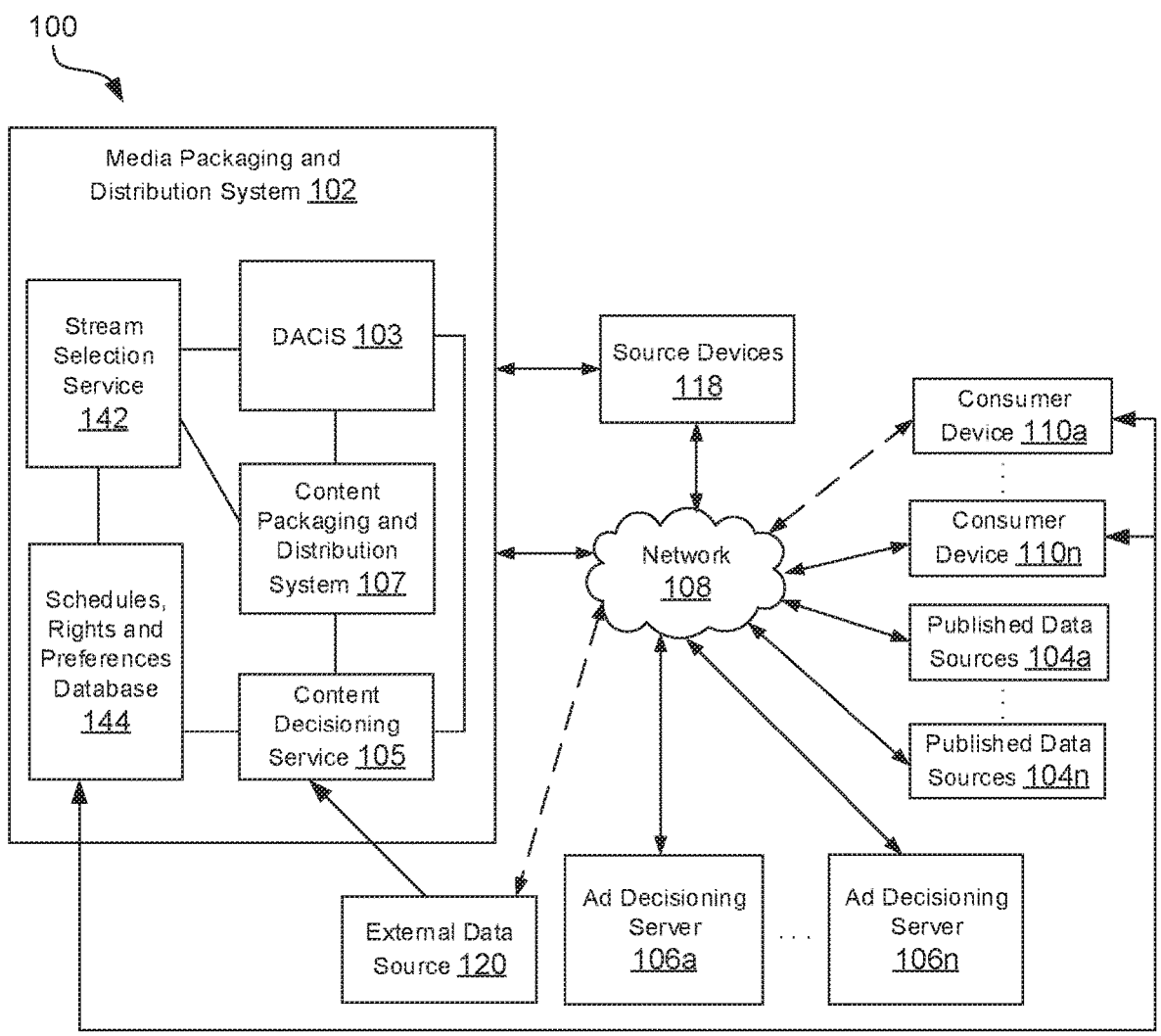
FIG. 1A is a block diagram that illustrates an exemplary system for publishing a disparate per-client live media output stream based on dynamic insertion of targeted non-programming content and customized programming content, and for server-side dynamic insertion of programming content in an indexed disparate live media output stream, in accordance with exemplary embodiments of the disclosure.

Certain embodiments of the disclosure may be found in a method and system for publishing a disparate per-client live media output stream based on dynamic insertion of targeted non-programming content and customized programming content, and for client-side dynamic presentation of programming content in an indexed disparate live media output stream. Various embodiments of the disclosure provide a method and system that not only provide live channel offerings in cost-effective manner but also provide enhanced, intelligent, and personalized viewer experience to increase their appeal by retaining the audience viewing the media content. Further, additional embodiments of the disclosure provide another method and system that allows for simulation of an infinite live window (or an infinite playback buffer). Accordingly, the user may seek to a desired point scheduled backwards or forwards with respect to a live point in a playback buffer of the first disparate live media output stream, as limited or stimulated by business rules. Furthermore, additional embodiments of the disclosure provide another method and system that allows dynamic presentation of programming content in an indexed disparate live media output stream at a client device.

Modern streaming protocols, such as HLS and DASH, break media content into numerous small media content segments, typically less than 10 seconds in length. Further, the modern streaming protocols implement manifests that instruct a media player on what media content segment to retrieve and play next. The manifest may enlist the media segments that make up the full length of the media asset. The manifest may include information, based on which the media player at a consumer device may be able to determine the media segments. The manifest and/or media content segment may also include and/or specify additional information to facilitate a media player to transition smoothly between media content streams from different sources. The manifest may be used for creating a playlist of multiple media content files, or for interrupting media content with advertising and then resuming the media content.

Such modern streaming protocols support video-on-demand (VOD) assets and live content as well. The VOD assets prepared for distribution, for example Internet distribution, may have a sequence of short duration segments added to a manifest. The short duration segments may be separate physical files or pointers (real or to be calculated) to the short media content segments inside a larger file. On the other hand, in case of live content, new short content media segments are made available as soon as they are created. In some protocols, each new segment is added to a manifest while in others the media player is provided with information that may be utilized to calculate what the next live segment will be. In the latter case, a signal in the media content itself may be utilized to inform the player when to re-inspect or check the manifest for a change in media content. In live streaming, delivery of live content is supported by making available each new short media content segments as soon as such media content segments are generated. In some protocols, new media content segments may be added to the manifest, while in others, the media player calculates necessary information about the next live media content segments.

In accordance with various embodiments of the disclosure, a system is provided for publishing a disparate per-client live media output stream based on dynamic insertion of targeted non-programming content and customized programming content. One or more processors in the system may be configured to receive a first manifest request from a first client device, wherein the first manifest request comprises one or more parameters. The one or more processors in the system may be further configured to determine a first additional content that comprises a customized first programming content and a targeted first non-programming content for the first client device based on the one or more parameters and the associated indexed metadata. The one or more processors in the system may be further configured to generate a first programming schedule for the first client device based on the selected one or more live input streams and/or the one or more pre-encoded media assets, the associated indexed metadata, and the determined first additional content. Accordingly, one or more live input stream manifests and/or one or more pre-encoded media asset manifests published in a content delivery network and associated indexed metadata may be selected based on the one or more parameters. The one or more processors in the system may be further configured to publish a first disparate live media output stream manifest for the first client device based on insertion of the selected one or more live input stream manifests and/or the one or more pre-encoded media asset manifests, the associated indexed metadata, and the determined first additional content in accordance with the first programming schedule generated for the first client device.

In accordance with another embodiment of the disclosure, a system is provided for server-side dynamic insertion of programming content in an indexed disparate live media output stream. One or more processors in the system may be configured to publish a first programming schedule that comprises one or more functionalities enabled via one or more constraints and rights associated with at least a first disparate live media output stream. The published first programming schedule may reference one or more pre-encoded media assets and/or one or more live input streams. The one or more processors in the system may be further configured to generate an indexed first disparate live media output stream for a first client device based on the published first programming schedule. Based on a playback of the indexed first disparate live media output stream at the first client device, the one or more processors in the system may be further configured to receive a client request from the first client device. The client request comprises at least a program identifier referenced in the published first programming schedule with respect to a playback position in the published first programming schedule. The one or more processors in the system may be further configured to insert manifest data and indexed metadata of a programming content associated with the program identifier to a first disparate live media output stream manifest in accordance with the one or more functionalities. Based on the insertion of the manifest data and indexed metadata associated with the program identifier referenced in the first programming schedule, the one or more processors in the system may be further configured to at least one of alter the first disparate live media output stream or generate a second disparate live media output stream. The altered first disparate live media output stream or the generated second disparate live media output stream comprises the manifest data, the indexed metadata and an updated playback position.

In accordance with another embodiment of the disclosure, a system is provided for client-side dynamic presentation of programming content in an indexed disparate live media output stream. One or more processors in the system may be configured to generate a client request based on a user input when an indexed first disparate live media output stream is played back or to be played back at a client interface of the first client device. The client request comprises at least a program identifier referenced in a published first programming schedule with respect to a playback position in the published first programming schedule. The published first programming schedule comprises one or more functionalities enabled via one or more constraints and rights associated with at least the indexed first disparate live media output stream. The one or more processors in the system may be further configured to present at least one of an altered first disparate live media output stream or a generated second disparate live media output stream at the client interface based on the generated client request. The alteration of the first disparate live media output stream or the generation of the second disparate live media output stream may be based on an insertion of manifest data and indexed metadata associated with the program identifier, associated with a programming content, referenced in the first programming schedule. The altered first disparate live media output stream or the generated second disparate live media output stream comprises the manifest data, the indexed metadata and an updated playback position.

FIG. 1A is a block diagram that illustrates an exemplary system for publishing a disparate per-client live media output stream based on dynamic insertion of targeted non-programming content and customized programming content, and for server-side dynamic insertion of programming content in an indexed disparate live media output stream, in accordance with exemplary embodiments of the disclosure, in accordance with exemplary embodiment of the disclosure. Referring to FIG. 1A, the system 100, comprises a media packaging and distribution system 102 that is communicatively coupled to published data sources 104a, ..., 104n, Ad decisioning servers 106a, ..., 106n, via a network 108 and/or other programmatic means. There are shown consumer devices 110a, ..., 110n that are communicatively coupled to the network 108. The media packaging and distribution system 102 may comprise at least a DACIS 103, a Content Decisioning Service (CDS) 105, a Content Packaging and Distribution System (CPDS) 107, a stream selection service 142, and a repository of schedules, rights, and user preferences database 144. There are also shown source devices 118 communicatively coupled to the media packaging and distribution system 102 through the network 108. An external data source 120 is also provided, which is communicatively coupled to the media packaging and distribution system 102 through the network 108.

The media packaging and distribution system 102 may comprise suitable logic, circuitry, and interfaces that may be configured to execute code that handles media content comprising audio, video, images, metadata, manifests, and/or other data (embedded and/or externally referenced). The media content may include a video, an audio, a combination of audio and video presentations, and/or embedded or externally referenced metadata, a combination of multiple-audio, multiple-video, and/or embedded or externally referenced metadata. Accordingly, the media packaging and distribution system 102 publishes a disparate per-client live media output stream based on dynamic insertion of targeted non-programming content and customized programming content.

In this regard, the media packaging and distribution system 102 may provide video programming services to viewers, usually for a subscription fee (such as pay television). The media packaging and distribution system 102 also handles distribution, for example, multicasting, unicasting, broadcasting, streaming, for one or more channels to be viewed on one or more of the plurality of consumer devices 110a, ..., 110n.

The media packaging and distribution system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs). In this regard, the broadcast provider may be configured to execute code that communicates linear video feeds (also referred to as a network television feed or broadcast feed) to the media packaging and distribution system 102. In a broadcast chain, the broadcast provider may receive actual content, for example, from a production studio, in one or more source formats. Examples of the one or more source formats may include, but are not limited to a tape file, or a live feed that may be further converted to a serial digital interface (SDI) video interface and/or on a high-definition SDI (HD-SDI) video interface for processing and playout. The broadcast provider may further process the content, such as insertion of graphics, closed captions, preparation of programming schedule, insertion of triggers, and the like, and provide final delivery by a broadcasting apparatus. The communicated linear video feed and the playout schedule may correspond to a channel, such as CNN channel that is broadcast to the media packaging and distribution system 102, via a communication network. The linear video feed may be broadcasted as a multi-program transport stream (MPTS) (also referred to as a live video feed) to the media packaging and distribution system 102, via the network 108. The broadcast provider may be owned by (or associated to) a broadcast provider or operator, a network provider or operator, or a content provider or operator.

The media packaging and distribution system 102 may receive the MPTS, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the media packaging and distribution system 102 may be signaled for various blackout types with in-band SCTE-35 message. Further, the media packaging and distribution system 102 may receive program metadata that specifies certain events or operations, such as, for example, when to blackout shows. Examples of legacy distribution system that may be benefitted from the media packaging and distribution system 102 may include direct-broadcast satellite (DBS) providers, cable television (CATV) systems, and other wireline video providers and competitive local exchange carriers (CLECs) using, for example, IPTV.

The DACIS 103 may comprise suitable logic, circuitry, and interfaces that may be configured to leverage one-to-one scale of traditional SSAI systems to support custom programming content choices and not just targeted non-programming content. For example when the user selects to join a live stream, a content decisioning system, such as the CDS 105 could determine that, instead of joining the live stream for the last few minutes of a program prior to the start of the intended program, the user should instead be shown content more relevant to the user so as to prevent them from tuning away, e.g. show a personalized set of basketball highlights and ads to a user who likely joined the stream to watch a basketball game that is coming on next. The DACIS 103 replaces original content in the live stream prior to game start with user relevant content, such that upon its conclusion, the user is seamlessly presented the game.

The DACIS 103 may be further configured to, via a programming schedule or tag indicator in a disparate live media output stream manifest, be notified of one or more content graphical treatment opportunities within the media content. The DACIS 103 may be further configured to make required non-programing content calls on behalf of the plurality of consumer devices 110a, . . . , 110n. Accordingly, the DACIS 103 may provide the plurality of consumer devices 110a, . . . , 110n with information needed to execute the graphical treatment graphical content via a secure out-of-band channel between the DACIS 103 and the plurality of consumer devices 110a, . . . , 110n. In accordance with an embodiment, the DACIS 103 may be configured to include not showing non-programming content that a user of a consumer device may elected to skip or rated poorly in an earlier non-programming content break. Further, the DACIS 103 may enable the user to skip non-programming content as the user interacted with a previous non-programming content or made a purchase and the advertiser elected to sponsor the remainder of the programming content.

In accordance with an embodiment, the DACIS 103 may be configured to provide seamless failover between redundant disparate live media output streams for large events, thus improving reliability. In certain instances, some of the plurality of consumer devices 110a, . . . , 110n may support a primary and backup disparate live media output streams and are able to fail between them. In other instances, others of the plurality of consumer devices 110a, . . . , 110n may not support the primary and backup disparate live media output streams. In such instances, the consumer devices may attempt to join an alternative disparate live media output stream after occurrence of an event such as a device failure or crash. For such consumer devices, the DACIS 103 may be configured to monitor both the primary and backup disparate live media output streams, and if there is a failure, write the alternative disparate live media output stream into the disparate live media output stream manifest.

Each of the plurality of published data sources 104a, . . . , 104n may be coupled to one or more television networks and may comprise suitable logic, circuitry, and interfaces that may be configured to execute code that provides actual audiences for programs that were distributed. As illustrated in FIG. 1A, the plurality of published data sources 104a, . . . , 104n are coupled to the media packaging and distribution system 102 via the network 108 and configured to monitor audience drift to or away from a tuned channel airing a live media output stream. The plurality of published data sources 104a, . . . , 104n may provide actual audiences for programs to the indexing and storage system 116. An exemplary published data source may be Nielsen. Nielsen has the capability to determine when a viewer watches the same set of media items, for example, advertisements and/or promotional content, in programming data, such as an episode, in a live video feed within 3 days of original airing, and provide Nielsen "C3" credit. Another exemplary published data source may be a published database that provides ratings for a media item, such as gross rating point (GRP). The GRP is advertising or promotion impact measure for each advertising and/or promotional campaigns, known in the art. Other exemplary published data sources may also include direct/indirect access to other public or private data sources (persistent or ephemeral) through programmatic means.

The CDS 105 may comprise suitable logic, circuitry, and interfaces that may be configured to determine, upon request, which programming content (or partial programming content) to deliver back to the plurality of consumer devices 110a, . . . , 110n. Thus, the CDS 105 may be configured to insert additional content (including non-programming content) or replace existing content, according to one or more parameters provided by the plurality of consumer devices 110a, . . . , 110n and data stored in various external systems and/or databases.

The Ad decisioning servers 106a, . . . , 106n may comprise suitable logic, circuitry, and interfaces that may be configured to implement at least an advertisement decisioning component that may be used during a real-time content or advertisement placement activity, for example during dynamic ad insertion. The Ad decisioning servers 106a, . . . , 106n may further determine ad-load opportunity, based on targeting data from schedules, rights, and user preferences database.

For example, commercial or non-commercial advertisements may be dynamically inserted within program segments of the live input streams based on the detected upcoming indicator, such as an inbound trigger, a signaling point, and/or a signal in a pre-encoded media asset and/or a live input stream by the Ad decisioning servers 106a, . . . , 106n.

In an embodiment, the DACIS 103 may be generalized as a proxy between the plurality of consumer devices 110a, . . . , 110n and the Ad decisioning servers 106a, . . . , 106n. In one implementation, a request is sent from a consumer device to the DACIS 103. The DACIS 10 may call on of the Ad decisioning servers 106a, . . . , 106n to determine a set of non-programming content that may be inserted into the disparate live media output stream.

The CPDS 107 may comprise suitable logic, circuitry, and interfaces that may be configured to index programming content, which is prepared for usage by a system, such as the stream publishing engine 114. The CPDS 107 may further define metadata detailing various facets of the programming and/or non-programing content including duration, known locations and opportunities for programing and/or non-programing content insertion/replacement.

The network 108 may be any kind of network, or a combination of various networks, and it is shown illustrating exemplary communication that may occur between the Ad decisioning servers 106a, . . . , 106n and the media packaging and distribution system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard; accordingly, other exemplary modes may comprise uni-directional or bi-directional distribution, such as packet-radio, satellite. Furthermore, the network 108 is an exemplary embodiment of a distribution system.

The consumer devices 110a, . . . , 110n may refer to end-user devices or consumption devices where the content is played to be consumed by a user. The number of impressions of a media item, such as an advertisement and/or promotional media, on such plurality of consumer devices 110a, . . . , 110n determines the advertising impact or promotion impact and number of actual audiences achieved during campaigns. Examples of the consumer devices 110a, . . . , 110n may include, but are not limited to, connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, and embedded devices. The consumer devices 110a, . . . , 110n may further include process/system that may process the output for any means, regardless of the capability or intent to decode for media presentation, and on which the consumer may launch a web page, a web application, or a web service to view media content.

The source devices 118 may comprise suitable logic, circuitry, and interfaces that may be configured to communicate a live media feed or live input streams of a channel, such as an existing channel, to the media packaging and distribution system 102. In accordance with an embodiment, the live input streams of the channel may correspond to a broadcast feed. The source device 118 may be communicatively coupled to the network 108.

The external data source 120 may comprise suitable logic, circuitry, and interfaces that may be configured to execute code that handles retrieval and storage of audience data that corresponds to subscribers of the plurality of consumer devices 110a, . . . , 110n. The audience data may include demographics data, audience targeting data, trending data, device type data, device platform data, and content recognition-based data, such as automatic content recognition (ACR)-based data. The trending data may comprise information on what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

The stream selection service 142 may comprise suitable logic, circuitry, and interfaces that may be configured to execute code that may be configured to provide a consumer device, for example, the consumer device 110a, requesting to view the disparate live media output stream with a correct variant of disparate live media output stream, based on the geolocation and identification of the consumer device 110a, along with data retrieved from the repository of schedules, rights, and user preferences database 144.

The repository of schedules, rights, and user preferences database 144 may comprise suitable logic, circuitry, and interfaces that may be configured to store the schedules for all source feeds, availability rights for all the content in the schedules, regional blackout zones for the various sports leagues, predefined location-based viewing preferences, individual client viewing preferences, and any viewing or transition rules provided by the stream owner operator. The repository of schedules, rights, and user preferences database 144 may further store one or more constraints and rights associated with disparate live media output streams based on which one or more functionalities may be enabled.

In operation, in accordance with an aspect of the disclosure, upon receiving a first manifest request from a consumer device, the DACIS 103 may be configured to publish a manifest of a first disparate live media output stream for the consumer device. The first disparate live media output stream may be chosen by the DACIS 103, at the time of the first manifest request, to best target a consumer device, according to a plurality of client-specific parameters. The plurality of client-specific parameters may comprise user preferences and identifiers, consumer device preferences and identifiers, and one or more rules/rights governed by geolocation data and current position of playback of a first disparate live media output stream at the consumer device. The first disparate live media output stream manifest may be generated, at the time of the first manifest request, to include additional content, such as the targeted non-programing content and the customized programming content. Examples of the targeted non-programing content may include, but are not limited to, advertisements, personalized (per-user)

advertisements, video advertisements, and graphical treatment (such as overlays). The targeted non-programing content may further include first interactive elements, such as an option to purchase goods or content, and second interactive elements. The second interactive elements may further affect the generation of the first disparate live media output stream manifest by providing various options. For example, a first option may be to skip a given ad, a second option may be to skip future ads for remainder of the playback of the first disparate live media output stream, a third option may be to choose one or more ads of a given category, or a fourth option may be too watch all ads immediately to avoid ads for the remainder of the playback. Examples of the customized programing content may include, but are not limited to, promotional content, short-form content, or alternate content (content replacing that of the requested first disparate live media output stream.

The DACIS 103 may further receive metadata associated with the content and additional content for the first disparate live media output stream from the CPDS 107. The metadata may include, for example, ad break locations, graphical treatment marker/triggers, SCTE35 markers, content duration, personalized content opportunities, and one or more decision point locations.

In accordance with an embodiment, the DACIS 103 may be configured to convert a pre-encoded media asset to the first disparate live media output stream to facilitate one or more subsequent modifications on the first disparate live media output stream. The one or more subsequent modifications may correspond to a user selection, a user preference, a change in a first programming schedule, or a time or geolocation-based rule. In accordance with an embodiment, the DACIS 103 may be configured to perform another conversion of remainder of the first disparate live media output stream into the one or more pre-encoded media assets to facilitate download of the one or more pre-encoded media assets at the consumer device and mitigate dependency on the DACIS 103 for playback of remaining portion.

In accordance with another aspect of the disclosure, upon receiving the first manifest request, a manifest of the first disparate live media output stream may be altered to include additional or alternate content, apart from the content originally scheduled for playback. The DACIS 103 may be configured to determine which content to include/replace by utilizing one or more parameters. The one or more parameters may include, but not limited to, URL requested for playback, and an identifier referencing a record for an existing first disparate live media output stream or an external connected system, such as the CPDS 107. The one or more parameters may include a plurality of client-specific parameters that may comprise user preferences and identifiers, consumer device preferences and identifiers, and one or more rules/rights governed by geolocation data and current position of playback of a first disparate live media output stream at the consumer device. The one or more parameters may include a plurality of client-specified attributes derived from user interaction with the consumer device. The plurality of client-specified attributes may include, for example, a preference for a given type and/or category (or categories) of programming content, a possible time constraint or duration to fill with content. The time constraint or duration to fill with content may be determined by user preferences from an external system, such as the repository of schedules, rights, and user preferences database 144, a range defined in the first client manifest request, schedule tolerances, as defined in the repository of schedules, rights, and user preferences database 144, device preferences/identifiers declared in the first manifest request, and a prior consumer request, or found in the repository of schedules, rights, and user preferences database 144. The time constraint or duration to fill with content may be further determined by geolocation information declared in the first manifest request or found in the first manifest request, or external database, such as the repository of schedules, rights, and user preferences database 144, or external systems, such as a content recommendation engine. The one or more parameters may further include rules, rights, and schedule data stored in the DACIS 103 or an adjacent, external system—such as the repository of schedules, rights, and user preferences database 144.

In accordance with an embodiment, the DACIS 103 may determine where to place new or alternate content within the requested disparate live media output stream. The DACIS 103 may utilize metadata, such as ad break locations, graphical treatment markers/triggers, SCTE35 markers, content duration, and one or more decision point locations. The metadata may be sourced from a system that has indexed metadata for the asset, such as the CPDS 107. The DACIS 103 may generate a new schedule from the determined alterations in the first disparate live media output stream. The DACIS 103 may transmit resulting schedule to the stream publishing engine 114 to generate a final disparate live media output stream. The final disparate live media output stream may be delivered back to originating client. The stream publishing engine 114 may generate the first disparate live media output stream manifest based on one of a pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams.

The final disparate live media output stream may contain one or more decision points, which, if configured, may be presented by the consumer device to the user. In this regard, the final disparate live media output stream may be delivered as a live stream between the decision points whether or not the programming content selected by a user is pre-encoded media asset or a live input stream. At the one or more decision points, the user interaction may correspond to one of a desired selection corresponding to the user interaction with one or more interactive elements, or a default selection corresponding to non-interaction of a user with the customized first programming content and/or the targeted first non-programming content in the first disparate live media output stream played back by the media player. The desired selection or the default selection may be transmitted to an external storage system that is the repository of schedules, rights, and user preferences database 144.

In accordance with an embodiment, at the one or more decision points, the one or more interactive elements may facilitate exclusion of the targeted first non-programming content or the customized first programming content and replacement by default content. The one or more interactive elements may further facilitate selection of alternate customized first programming content, selection of a subsequent second programming content, approval or disapproval of the selected customized first programming content, and/or exclusion of subsequent second non-programming content for a remaining portion of the first disparate live media output stream played back by the media player. The one or more interactive elements may further facilitate selection of one or more targeted first non-programming content of a specific category, or viewing of some or all of the targeted first non-programming content immediately to avoid some or all of the targeted first non-programming content for the remaining portion of the first disparate live media output stream played back by the media player.

In accordance with another aspect of the disclosure, the DACIS 103, upon the first manifest request, may seamlessly transition the first additional content to an alternate additional content according to determination made by the stream selection service 142, based on one or more transition parameters. The one or more transition parameters may comprise one or more parameters from the first manifest request, current state of the first disparate live media output stream manifest determined based on accessibility, regular update, and suitable encoding, digital rights management, and compatibility with the first client device, rules provided by a stream owner operator, and user preferences defined in the repository of schedules, rights, and user preferences database 144.

The DACIS 103 may retrieve alternate metadata for the alternate additional content from the CPDS 107. The alternate metadata may indicate a location to seamlessly transition from the first additional content to the alternate additional content, and may include ad break locations, graphical treatment markers/triggers, SCTE35 markers/triggers, content duration, and/or one or more decision points. The DACIS 103 may be configured to determine placement of the alternate additional content within the first disparate live media output stream manifest based on the associated indexed metadata and the alternate metadata. The DACIS 103 may generate an alternate programming schedule for the first client device based on the alternate additional content and the alternate metadata. The DACIS 103 may transmit the generated alternate programming schedule to the stream publishing engine 114. The stream publishing engine 114 may generate a final disparate live output stream manifest for the consumer device.

In accordance with an embodiment, the DACIS 103 may revoke the first disparate live media output stream manifest published for the first consumer device based on an identifier primitive associated with the first disparate live media output stream of the first consumer device in an instance in which a media player of the first consumer device is determined to be a plagiarized media player with unauthorized access to content. In such embodiment, the first disparate live media output stream may include at least one unique identifier inserted by the DACIS 103.

In accordance with another aspect of the disclosure, the DACIS 103 may be configured to receive a client request from a first client device based on a playback of an indexed first disparate live media output stream at the first client device. The client request may comprise at least a program identifier referenced in the published first programming schedule with respect to a playback position in the published first programming schedule. Accordingly, manifest data and indexed metadata of programming content associated with the program identifier may be inserted to a first disparate live media output stream manifest in accordance with the one or more functionalities. Based on such insertion, the DACIS 103 may be configured to at least one of alter the first disparate live media output stream or generate a second disparate live media output stream. The altered first disparate live media output stream or the generated second disparate live media output stream comprises the manifest data, the indexed metadata and an updated playback position.

In accordance with another aspect of the disclosure, each of the plurality of consumer devices 110a that correspond to client devices 132a, ..., 132n (as described in FIG. 1B) may be configured to generate a client request based on a user input when the indexed first disparate live media output stream is played back or to be played back at corresponding client interface. The client request may comprise at least a program identifier referenced in the published first programming schedule with respect to playback position in published first programming schedule that comprises one or more functionalities enabled via one or more constraints and rights associated with at least indexed first disparate live media output stream. Based on insertion of manifest data and indexed metadata associated with program identifier, at least one of the first disparate live media output stream is altered or second disparate live media output stream is generated, which comprises manifest data, indexed metadata and updated playback position. Each of the plurality of consumer devices 110a that correspond to client devices 132a, ..., 132n (as described in FIG. 1B) may be configured to present the altered or second disparate live media output stream at corresponding client interface based on the corresponding client request.

Figure 1B:
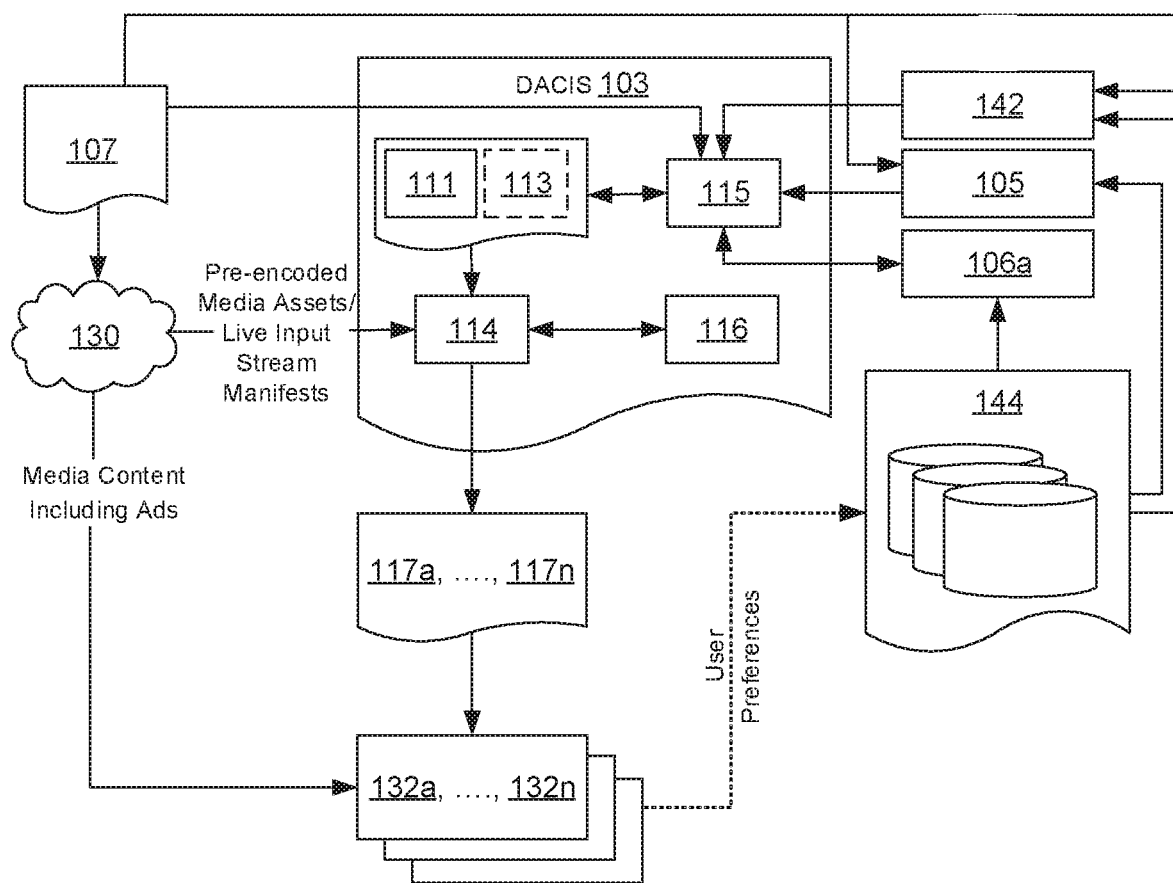
FIG. 1B is a block diagram that illustrates an exemplary dynamic ad/content insertion system (DACIS) for publishing a disparate per-client live media output stream based on dynamic insertion of targeted non-programming content and customized programming content, and for server-side dynamic insertion of programming content in an indexed disparate live media output stream, in accordance with exemplary embodiments of the disclosure.

FIG. 1B is a block diagram that illustrates an exemplary DACIS for publishing an updated disparate live media output stream in mixed mode based on user selection, in accordance with an exemplary embodiment of the disclosure. Referring to FIG. 1B, the DACIS 103 comprises a first programming schedule 111, an alternate programming schedule 113, a stream publishing engine 114, a personalized experience manager (PEM) 115, and an indexing and storage system 116. FIG. 1B further illustrates a content delivery system 130, which is an example of the network 108, client devices 132a, ..., 132n, which correspond to the plurality of consumer devices 110a, ..., 110n. There is further shown a per-client disparate live media output stream 117a, ..., 117n for corresponding client device from the client devices 132a, ..., 132n.

In some embodiments of the disclosure, the stream publishing engine 114, the PEM 115, and the indexing and storage system 116 may be integrated to form an integrated system, as illustrated in FIG. 1B. In some embodiments of the disclosure, as shown, the stream publishing engine 114, the PEM 115, and the indexing and storage system 116 may be distinct. In this regard, the PEM 115 may be implemented external to the DACIS 103 without loss of generality. Other separation and/or combination of the various entities of the exemplary media packaging and distribution system 102 illustrated in FIG. 1B may be done without departing from the spirit and scope of the various embodiments of the disclosure. In an embodiment, the implementation of the DACIS 103 may be on the server-side. In another embodiment, the implementation of the DACIS 103 may be on the client-side.

The first programming schedule 111 may correspond to an instruction set for a disparate live media output stream for a corresponding client device. The first programming schedule 111 may inform the stream publishing engine 114 about pre-encoded media assets and live input streams as well as when and how to switch between the various pre-encoded media assets and live input streams. The first programming schedule 111 may also support defining break durations for mid roll ads, break locations, and durations in the pre-encoded media asset and live input stream switches.

The alternate programming schedule 113 may correspond to an instruction set for an updated or alternate disparate live media output stream. The alternate programming schedule 113 may inform the stream publishing engine 114 about the alternate pre-encoded media asset and/or the alternate live input stream, and alternate additional content. Specifically, the alternate programming schedule 113 may indicate that when and how to switch between the various disparate live media output streams.

The stream publishing engine 114 in the DACIS 103 may be configured to generate disparate live media output stream manifests and variants of disparate live media output stream manifests. The stream publishing engine 114 may be configured to publish unique-to-client streaming manifests leveraging different indexes created by the indexing and storage system 116 from the various live input streams, pre-encoded media assets, targeted non-programming content and customized programming content based on a defined per-client schedule.

The PEM 115 in the DACIS 103 may be configured to personalize viewer experience of users by communicating with existing content decisioning systems, such as CDS 105, and executing/converting schedules provided, for example from the first programming schedule 111 to the alternate programming schedule 113. The PEM 115 in the DACIS 103 may be further configured to communicate with an ad server, such as the Ad decisioning server 106a, and stitching in targeted first non-programming content and customized first programming content, as required by the first programming schedule 111 and user preferences. The PEM 115 in the DACIS 103 may be further configured to generate a schedule for a disparate live media output stream of personalized content (i.e., clips or movies), communicating with the stream selection service 142 to switch or failover to different disparate live media input streams, and control overlays and other events triggered via the disparate live media output stream. In accordance with an embodiment, the stream selection service 142 may be used to switch between different output streams when a client device is requesting directly from the stream selection service 142. In accordance with other embodiment, the stream selection service 142 may be used to switch between different streams that may act as inputs for the PEM 115 and/or stream publishing engine 114 to generate a new output stream.

The indexing and storage system 116 in the DACIS 103 may be configured to ingest pre-encoded media assets, advertisement, and (continuously) live stream source manifests, indexes the media content segments, indexes one or more program indicators (such as program boundaries), non-programming indicators (such as ad break locations, overlay opportunities credits, and DRM systems supported, in the repository of schedules, rights, and user preferences database 144.

The per-client disparate live media output streams 117a, . . . , 117n may correspond to disparate live media output stream comprising live input streams and/or pre-encoded media assets to be sent back to a client device, upon request, that has been generated from a per-client schedule, such as the first programming schedule 111. Various media container formats of the live input streams and/or pre-encoded media assets may include, but are not limited to, transport stream (TS), fragmented MP4 (fMP4), Common Media Application Format (CMAF) and the like.

The content delivery system 130 may correspond to the network 108, described in FIG. 1. The content delivery system 130 may comprise networks configured for distributing media content to the plurality of client devices 132a, . . . , 132n. Generally, the term "content," "metadata," "media," and similar words are used interchangeably to refer to any type of media—audio, videos, datacasts, music, text, images, graphics, articles, still photos, animated photos, moving photos, photo galleries, video galleries, infographics, maps, polls, guest biographies, tweets or other social media, blog posts, and/or the like. The content delivery system 130 may be configured to provide a plurality of disparate live media output streams to the plurality of client devices 132a, . . . , 132n (in case packaged content is available on the network 108) or from the content packaging and distribution system 107 (in case packaged content is not available on the network 108). The plurality of disparate live media output streams may be provided to the plurality of client devices 132a, . . . , 132n via, for example, a transport stream, a segmented streaming, a progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client devices 132a, . . . , 132n may correspond to consumer devices 110a, . . . , 110n. In accordance with an embodiment, the client devices 132a, . . . , 132n may be content recognition (CR)-enabled devices, such as automatic content recognition enabled devices. Each of the client devices 132a, . . . , 132n may execute a client application, such as a client application 178 (as described in FIG. 1C), that may be configured to communicate with associated user to receive user inputs, generate client requests, and present disparate live media output streams based on the client requests. Further, the client application may be configured to communicate with the content delivery system 130, request content from the content delivery system 130, and receive, manage, and display content distributed from the content delivery system 130. The client devices 132a, . . . , 132n may be further configured to communicate with the Ad decisioning server 106a, via the content delivery system 130, or a separate communication network.

In accordance with various embodiments, various client devices 132a, . . . , 132n may be distributed over a large geographical area and communicate through a wide area network 108, such as the Internet. In accordance with an embodiment, a locally-run version of the client application for each of the client devices 132a, . . . , 132n may be provided that has a specific requirement (for example, a specific operating system or a particular Internet service provider). In accordance with another embodiment, a web-based version of the client application for each of the client devices 132a, . . . , 132n may be provided that has other types of system requirements (for example, a specific operating system or particular network restrictions).

In addition, in accordance with an embodiment, the content delivery system 130 may cease to deliver output streams to the client devices 132a, . . . , 132n if the client devices 132a, . . . , 132n do not have sufficient operating specifications. In accordance with another embodiment, the client application may notify the user of a first client device, such as the client device 132a, if the first client device does not have sufficient operating specifications for the client application to process a request from the user.

The stream selection service 142 may comprise suitable logic, circuitry, and interfaces that may be configured to provide a client device, for example, the client device 132a, requesting to view a disparate live media output stream with a correct variant of disparate live media output stream, based on the geolocation and identification of the client device 132a, along with data retrieved from the repository of schedules, rights, and user preferences database 144. The stream selection service 142 may further receive user preferences of a user associated with the client device 132a, for example, to view the recommended/desired existing disparate live media output stream on the client device 132a. The stream selection service 142 may further store the received preferences in the repository of schedules, rights, and user preferences database 144, and also communicate with the PEM 115. The stream selection service 142 acts as an interface between the PEM 115 of the media packaging and distribution system 102 and the plurality of client devices 132a, . . . , 132n.

The repository of schedules, rights, and user preferences database 144 may comprise suitable logic, circuitry, and interfaces that may be configured to execute code to store content rights, user preferences, regional preferences, live schedules, and regional rights. For example, content rights may store availability and platform rights for live input streams in the first programming schedules, such as the first programming schedule 111, the user preferences may store preferences of individual user viewing preferences, the regional preferences may store regional viewing preferences, the live schedules may store the schedules for live input streams, and the regional rights may store regional blackout zones for the various sports leagues, for example. The repository of schedules, rights, and user preferences database 144 may further store stream data supplied from a stream owner/operator including requirements, preferences, such as pre-defined location-based viewing preferences, stream transition rules, and any required client data, such as service level and zip code.

In operation, in accordance with an aspect (regarding just-in-time insertion of non-programming content and/or programming content) of the disclosure, a media player in a consumer device, such as the consumer device 110a, may send a first manifest request to the DACIS 103 to receive a disparate live media output stream manifest to begin or continue playback. The first manifest request may comprise one or more parameters, such as universal resource locators and/or identifiers referencing records for one or more live input streams or one or more pre-encoded media assets in the CPDS 107, a plurality of client-specific parameters, and a plurality of client-specified attributes derived from a user interaction with the consumer device, such as the consumer device 110a. The plurality of client-specific parameters may comprise user preferences and identifiers, client device preferences and identifiers, and one or more rules governed by geolocation data and current position of playback of a first disparate live media output stream at the consumer device, such as the consumer device 110a. The plurality of client-specified attributes may comprise the user interaction with interactive content in a customized first programming content and a targeted first non-programming content, and a preference for a type and/or category of the targeted first non-programming content and/or the customized first programming content. The user interaction with the interactive content may comprise a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations.

In case the first manifest request is for a first disparate live media output stream, the PEM 115 transmits the one or more parameters in the first manifest request to the stream selection service 142. The stream selection service 142 may determine live input streams and/or pre-encoded media assets, based on the one or more parameters in the first manifest request and in repository of schedules, rights, and user preferences database 144. The stream selection service 142 may transmit the determined identifiers or URLs of the live input streams and/or pre-encoded media assets to the PEM 115. The PEM 115 may then transmit the first manifest request to the CPDS 107 to retrieve metadata for the determined live input streams and/or pre-encoded media assets. The metadata may include, for example ad break locations, overlay markers/triggers, SCTE35 markers, and content duration.

The PEM 115 of the DACIS 103 may further transmit the received first manifest request to the CPDS 107 based on the selected one or more live input streams and/or one or more pre-encoded media assets. The PEM 115 may receive the indexed metadata, for example non-programming indicators, such as ad break locations, graphical treatment indicators, such as overlay markers/triggers, programming indictors, such as SCTE35 markers and content duration, from the CPDS 107.

The PEM 115 may further identify the one or more content placement opportunities defined by the metadata associated with the one or more live input streams and/or one or more pre-encoded media assets. The PEM 115 may further receive additional content, such as targeted first non-programming content from the Ad decisioning server 106a, and customized first programming content to match one or more personalization parameters from the CDS 105.

The PEM 115 may be configured to generate the first programming schedule 111 for a first client device, such as the client device 132a, based on selected one or more live input streams and/or the one or more pre-encoded media assets, the associated indexed metadata, and the determined first additional content. The generated first programming schedule 111 may be delivered to the stream publishing engine 114. The stream publishing engine 114 may be configured to select the one or more live input stream manifests and/or the one or more pre-encoded media asset manifests published in the content delivery system 130. The indexing and storage system 116 may be configured to index the plurality of media segments indicated by the one or more pre-encoded media asset manifests and the one or more live input stream manifests, the associated indexed metadata, the targeted first non-programming content, and the customized first programming content may be indexed based on the first programming schedule 111 generated for the first client device, for example the client device 132a. The stream publishing engine 114 may be further configured to publish the first disparate live media output stream manifest for the first client device, for example the client device 132a. The DACIS 103 may transmit the published first disparate live media output stream manifest to the media player of the first client device for playback of the first disparate live media output stream, for example the disparate live media output stream 117a.

In accordance with an embodiment, the PEM 115 may receive a user interaction from the media player of the first client device, for example the client device 132a. The user interaction may correspond to one of a desired selection corresponding to the user interaction with one or more interactive elements, or a default selection corresponding to a non-interaction of the user with the customized first programming content and/or the targeted first non-programming content in the first disparate live media output stream 117a played back by the media player. Based on the user interaction with the interactive content, the PEM 115 of the DACIS 103 may be configured to modify the remaining portion of the first programming schedule 111 that generates the first disparate live media output stream 117a corresponding to the first manifest request generated by the first client device, such as the client device 132a.

In accordance with another aspect (regarding personalized insertion of playlist of non-programming content and/or programming content) of the disclosure, the DACIS 103 may be configured to receive the first manifest request from the first client device, such as a client device 132a, to begin or continue playback of a first disparate live media output stream, for example the disparate live media output stream 117a. In such embodiment, in addition to the plurality of client-specific parameters described above, the plurality of client-specified attributes may comprise a preference for a given type and/or category (or categories) of targeted non-programming content or customized programming content, and a possible time constraint (duration) to fill with content. Thereafter, in similar manner as described above, the PEM 115 may transmit the one or more parameters in the first manifest request to the stream selection service 142. The stream selection service 142 may determine live input streams and/or pre-encoded media assets, based on the one or more parameters in the first manifest request and in repository of schedules, rights, and user preferences database 144. The stream selection service 142 may transmit the determined identifiers or URLs of the live input streams and/or pre-encoded media assets to the PEM 115. The PEM 115 may then transmit the first manifest request to the CPDS 107 to retrieve metadata for the determined live input streams and/or pre-encoded media assets. The metadata may include, for example, categories to which content is assigned to (for example, "basketball", "sports", "Knicks"), in addition to ad break locations, overlay markers/triggers, SCTE35 markers, and content duration.

The PEM 115 may identify one or more content placement opportunities defined by the metadata and may transmit a request to the CDS 105 to determine the customized first programming content from the CPDS 107 for matching one or more personalization parameters. Accordingly, the PEM 115 may generate the first programming schedule 111 defining locations and types of one or more decision points defined by the one or more content placement opportunities in the indexed metadata. The one or more decision points may define personalized content preferences, skipping of personalized content and moving to default content, and approval or disapproval of the personalized content. The remaining operations may be similar to the just-in-time insertion of non-programming content and/or programming content.

In accordance with another aspect (regarding stream failover) of the disclosure, the DACIS 103 may be configured to receive the first manifest request from the first client device, such as a client device 132a. The first manifest request may comprise one or more parameters, as described above. The PEM 115 may transmit the received first manifest request that comprises the one or more parameters to the stream selection service 142. The stream selection service 142 may determine if the set of criteria associated with the first disparate live media output stream is satisfied. The set of criteria may include accessibility of the first disparate live media output stream, update of the first disparate live media output stream and/or compatibility of the first disparate live media output stream having media and/or a manifest with the first manifest request. The stream selection service 142 may be further configured to determine the one or more live input streams and/or one or more pre-encoded media assets based on the one or more parameters in the first manifest request, and additional parameters retrieved from the repository of schedules, rights, and user preferences database 144. The stream selection service 142 may be further configured to determine the one or more live input streams and/or one or more pre-encoded media assets based on rules provided by a stream owner/operator (such as a regional blackout for the first client device leading to an alternative stream to watch) and user preferences (that exclude certain categories) defined in the repository of schedules, rights, and user preferences database 144.

When the set of criteria associated with the first disparate live media output stream is not satisfied, the stream selection service 142 may select a pre-encoded asset indicated in the first manifest request to continue playback as the first disparate live media output stream. The PEM 115 may receive the universal resource locators and/or identifiers that reference records for the selected one or more live input streams or alternate one or more pre-encoded media assets based on the one or more parameters and additional parameters retrieved from the repository of schedules, rights, and user preferences database 144. The PEM 115 may further transmit the received first manifest request to the CPDS 107 based on the selected one or more live input streams or alternate one or more pre-encoded media assets. The PEM 115 may further receive the alternate metadata for the alternate additional content from the CPDS 107. The metadata may include, for example, Ad break locations, overlay markers/triggers, SCTE35 markers/triggers, content duration, and one or more decision points. The alternate metadata may further include a location to transition from the first additional content to the alternate additional content. Thereafter, a placement of alternate additional content within the first disparate live media output stream manifest may be determined based on the associated indexed metadata and the alternate metadata. The PEM 15 may further generate the alternate programming schedule for the first client device, such as the client device 132a, based on the alternate additional content and alternate metadata. Accordingly, the stream selection service 142 may publish the final disparate live output stream manifest for the first client device, such as the client device 132a, based on the generated alternate programming schedule.

In accordance with another aspect (regarding server-side dynamic insertion of programming content in an indexed disparate live media output stream) of the disclosure, the PEM 115 may be configured to publish the first programming schedule 111 that may comprises one or more functionalities enabled via one or more constraints and rights associated with at least the first disparate live media output stream. The PEM 115 may publish the first programming schedule 111 referencing at least one live input stream or a pre-encoded asset as a source to be used in at least the first disparate live media output stream. In accordance with an embodiment, the one or more live input streams may comprise pre-encoded media assets. In accordance with another embodiment, the one or more live input streams may comprise singularly encoded live input streams. In accordance with an embodiment, the one or more functionalities enabled via the one or more constraints and rights may include a first functionality to restart a programming content in the first disparate live media output stream that is presented on at least the first client device, such as the client device 132a. In accordance with another embodiment, the one or more functionalities enabled via the one or more constraints and rights may include a second functionality to skip to a future scheduled programming content in the first disparate live media output stream. In accordance with another embodiment, the one or more functionalities enabled via the one or more constraints and rights may include a third functionality to time-shift within the programming content in the first disparate live media output stream. In accordance with another embodiment, the one or more functionalities enabled via the one or more constraints and rights may include a fourth functionality to resume playback within the programming content in the first disparate live media output stream. In accordance with an embodiment, the one or more constraints and rights associated with at least the first disparate live media output stream may be retrieved from the repository of schedules, rights, and user preferences database 144.

In accordance with an embodiment, the indexing and storage system 116 of the DACIS 103 may be configured to receive instructions from the stream publishing engine 114 to begin indexing of the one or more pre-encoded media assets and/or the one or more live input streams referenced in the published first programming schedule 111. The indexing and storage system 116 of the DACIS 103 may be further configured to record content of manifest data that may correspond to one or both of the one or more pre-encoded media assets and/or the one or more live input streams, including any variants defined in a master manifest. The manifest data may define at least an associated media content, one or more programming indicators (such as SCTE messages), timing metadata, one or more media content identifiers, and one or more contextual event identifiers. The timing metadata may correspond to the playback position in the published first programming schedule 111. The indexing and storage system 116 of the DACIS 103 may further process the manifest data to create the indexed metadata. The indexed metadata may define one or more program indicators (such as program start/end) and calculated durations, a program identification (that correspond to a programming content that is currently playing), non-programming content indicators (such as Ad break start/end) and calculated durations, a non-programming content identification (that correspond to Ads that are currently playing), and one or more event markers (such as blackout notifications). In accordance with an embodiment, the indexing and storage system 116 of the DACIS 103 may be configured to maintain the manifest data and the indexed metadata to encompass a time-range specified in the published first programming schedule 111.

In accordance with an embodiment, the stream publishing engine 114 may be configured to generate the indexed first disparate live media output stream for the first client device, such as the client device 132a, based on the published first programming schedule 111. In accordance with an embodiment, the content delivery system 130 of the DACIS 103 may be configured to present the generated indexed first disparate live media output stream on the first client device, such as the client device 132a.

In accordance with an embodiment, the stream publishing engine 114 may be configured to receive a client request from the first client device, such as the client device 132a, based on the playback of the indexed first disparate live media output stream at the first client device, such as the client device 132a. The client request may comprise at least a program identifier referenced in the published first programming schedule 111 with respect to the playback position in the published first programming schedule 111. The programming identifier may be associated with a programming content that may be selected based on a user input provided at the first client device, such as the client device 132a. Examples of the user input may include, but not limited to, a selection of the programming content from a list of programming content or a selection of a restart or resume option to initiate corresponding operation at the DACIS 103 operation. The client request may be generated by the first client device, such as the client device 132a, based on the user input while the first disparate live media output stream (returned from the DACIS 103) is played back at the first client device, such as the client device 132a.

Based on the user input, the first client device, such as the client device 132a, may instruct the DACIS 103 to perform an operation, such as restart, skip, time-shift, or resume, in accordance with one or more functionalities enabled via the one or more constraints and rights associated with at least the first disparate live media output stream.

In accordance with an embodiment, when the one or more functionalities correspond to the first functionality to restart the programming content in the first disparate live media output stream, at least the first client device, such as the client device 132a, may be configured to determine the program identifier of a programming content that is currently or recently played back in the first disparate live media output stream. The program identifier of the programming content may be determined based on a request for a list of programming content, via for example an electronic program guide, associated with the first disparate live media output stream from the repository of schedules, rights, and user preferences database 144.

As the first client device, such as the client device 132a, plays the first disparate live media output stream returned from the DACIS 103, the user input may be provided to restart the programming content that is currently or recently played back in the first disparate live media output stream, in accordance with the first functionality defined in the published first programming schedule 111. Based on the user input, the stream publishing engine 114 in the DACIS 103 may be configured to receive the client request from the first client device, such as the client device 132a. The client request thus received, includes the program identifier for the programming content (that is currently or recently played back in the first disparate live media output stream in accordance with the first functionality defined in the published first programming schedule 111) to be restarted.

The stream publishing engine 114 may query the indexing and storage system 116 with the received program identifier. The indexing and storage system 116 may provide the manifest data and indexed metadata of the programming content associated with the program identifier back to the stream publishing engine 114. The stream publishing engine 114 may validate against the published first programming schedule 111 that the programming content is eligible for a restart. If the programming content is found to be ineligible for the restart, the stream publishing engine 114 may ignore the client request and continue with the playback of the first disparate live media output stream. However, the programming content is found to be eligible for the restart, the stream publishing engine 114 may insert the manifest data and indexed metadata of the programming content associated with the program identifier to the first disparate live media output stream manifest in accordance with the first functionality. Accordingly, the stream publishing engine 114 may alter the first disparate live media output stream, based on the insertion of the manifest data and indexed metadata associated with the program identifier referenced in the first programming schedule 111. Such an altered first disparate live media output stream may comprise the manifest data, the indexed metadata and an updated playback position. Thus, the stream publishing engine 114 may alter the first disparate live media output stream to start playing out the programming content, as specified by the program identifier from the starting point.

In accordance with another embodiment, the one or more functionalities correspond to the second functionality to skip to a future scheduled programming content in the first disparate live media output stream. In such an embodiment, the second functionality is allowed for a first set of pre-encoded media content or the live input stream that comprises a second set of pre-encoded media content. As the first client device, such as the client device 132a, plays the first disparate live media output stream returned from the DACIS 103, the user input may be provided to select a future scheduled programming content from a list of programming content (that corresponds to upcoming programming content), in accordance with the second functionality defined in the published first programming schedule 111. In such an embodiment, at least the first client device, such as the client device 132a, may be configured to determine the program identifier based on selection of the future scheduled programming content from the list of programming content associated with the first disparate live media output stream from the repository of schedules, rights, and user preferences database 144. Based on the user input, the stream publishing engine 114 may receive the client request from the first client device, such as the client device 132a, to start the selected future scheduled programming content, in accordance with the second functionality defined in the published first programming schedule 111. The client request thus received, includes the program identifier for the future scheduled programming content to be skipped to and get started with.

The stream publishing engine 114 in the DACIS 103 may query the indexing and storage system 116 with the received program identifier. The indexing and storage system 116 may provide the manifest data and indexed metadata of the programming content associated with the program identifier back to the stream publishing engine 114. The stream publishing engine 114 may validate against the published first programming schedule 111 that the selected future scheduled programming content is eligible for a playback at a time of the client request. If the eligibility of the selected future scheduled programming content is determined to be invalid, the stream publishing engine 114 in the DACIS 103 may ignore the client request and the playback of the first disparate live media output stream is continued at the first client device, such as the client device 132a, as per the published first programming schedule 111. If the eligibility of the selected future scheduled programming content is determined to be valid, the stream publishing engine 114 may insert the manifest data and indexed metadata of the programming content associated with the program identifier to the first disparate live media output stream manifest in accordance with the second functionality. Accordingly, the stream publishing engine 114 may alter the first disparate live media output stream, based on the insertion of the manifest data and indexed metadata associated with the program identifier referenced in the first programming schedule 111. Such an altered first disparate live media output stream may comprise the manifest data, the indexed metadata and an updated playback position. Thus, the stream publishing engine 114 may play out the selected future scheduled programming content associated with the program identifier in the manifest data, the indexed metadata and the updated playback position, corresponding to a starting point of the selected future scheduled programming, of the altered first disparate live media output stream.

In accordance with another embodiment, the one or more functionalities include the third functionality to time-shift within the programming content in the first disparate live media output stream. In such an embodiment, the first disparate live media output stream manifest associated with the first disparate live media output stream presented at the client interface of the first client device, such as the client device 132a, comprises timing metadata. The timing metadata may comprise embedded time-based identifiers corresponding to media segments in the first disparate live media output stream.

The program identifier of the programming content may be determined based on a request for a list of programming content, via for example an electronic program guide, associated with the first disparate live media output stream from the repository of schedules, rights, and user preferences database 144. The list of programming content may comprise additional metadata that may control the third functionality which corresponds to each programming content as enabled via the one or more constraints and rights in the published first programming schedule 111.

In accordance with an embodiment, the client interface may be presented at the first client device, such as the client device 132a, in accordance with the third functionality. Accordingly, a seeking option within the programming content in the first disparate live media output stream may be enabled at the client interface of at least the first client device, such as the client device 132a. The seeking option may be enabled in accordance with a default playback buffer of at least the first client device, such as the client device 132a, when the programming content that is currently played back does not allow for the third functionality. In accordance with another embodiment, a seeking option within each programming content in the first disparate live media output stream may be enabled at the client interface of at least the first client device, such as the client device 132a, when the programming content that is currently played back allows for the third functionality. The seeking operation forwards in time may be enabled up to a latest published media segment within the first disparate live media output stream manifest. In accordance with another embodiment, the seeking option, such as a seeking operation backwards in time, is enabled within each programming content. The seeking operation backwards in time continues into a prior programming content when the seeking operation backwards in time reaches a starting point of the programming content that is currently played back and the third functionality of the prior programming content is enabled.

As the first client device, such as the client device 132a, plays the first disparate live media output stream returned from the DACIS 103, the user input may be provided to select one of the above seeking options, such as the seeking operation forwards in time or the seeking operation backwards in time, in accordance with the third functionality defined in the published first programming schedule 111.

Based on the user input, the stream publishing engine 114 may receive the client request from the first client device, such as the client device 132a, to time-shift within the programming content in the first disparate live media output stream, in accordance with the third functionality. The client request thus received, includes the program identifier for the programming content (within which the time-shift is to be performed) and a seeking position to which playback is to be time-shifted to. The stream publishing engine 114 may query the indexing and storage system 116 with the received program identifier and the seeking position to which playback is to be time-shifted to. The indexing and storage system 116 may determine the manifest data and indexed metadata corresponding to the programming content, corresponding to the first programming schedule 111, in proximity to the seeking position for the seeking operation and returns to the stream publishing engine 114. The stream publishing engine 114 may insert the determined manifest data and indexed metadata of the programming content associated with the program identifier to the first disparate live media output stream manifest in accordance with the third functionality. The stream publishing engine 114 may alter the first disparate live media output stream, based on the insertion of the determined manifest data and indexed metadata associated with the program identifier referenced in the first programming schedule 111. Such an altered first disparate live media output stream may comprise the manifest data, the indexed metadata and an updated playback position. The stream publishing engine 114 may play out the programming content associated with the program identifier in the manifest data, the indexed metadata and the updated playback position, of the altered first disparate live media output stream. The altered first disparate live media output stream may be viewed at the first client device, such as the client device 132a.

In accordance with another embodiment, the one or more functionalities include the fourth functionality to resume playback within the programming content in the first disparate live media output stream. In such an embodiment, the first disparate live media output stream manifest associated with the first disparate live media output stream comprises timing metadata. The timing metadata may comprise embedded time-based identifiers corresponding to media segments in the first disparate live media output stream. In accordance with an embodiment, the client interface may be presented at the first client device, such as the client device 132a, in accordance with the fourth functionality which corresponds to each programming content as enabled via the one or more constraints and rights. The first client device, such as the client device 132a, may proceed to playback the first disparate live media output stream. As the playback occurs, the first client device, such as the client device 132a, remains updated about the current playback time as provided by the embedded time-based identifiers in the timing metadata corresponding to media segments in the first disparate live media output stream. As the first disparate live media output stream is played back at the first client device, such as the client device 132a, a user input may be provided, which may correspond to a pause operation or a termination operation of the playback of the first disparate live media output stream at the first client device, such as the client device 132a.

Based on the pause operation or a termination operation, a stream identifier of the first disparate live media output stream, the program identifier of the programming content that is currently playing back, and the timing metadata within the first disparate live media output stream may be captured by at least the first client device, such as the client device 132a. In accordance with an embodiment, the stream publishing engine 114 may be configured to receive the client request from the first client device, such as the client device 132a, or the second client device, such as the client device 132b, to resume playback of the first disparate live media output stream on at least one of the first client device, such as the client device 132a, or the second client device, such as the client device 132b. The stream publishing engine 114 in the DACIS 103 may be further configured to check that if programming content that is currently played back does not allow for the fourth functionality, proceed with playout of the programming content from live point. Else, the stream publishing engine 114 in the DACIS 103 may be configured to determine the first programming schedule 111 from the set of programming schedules associated with the stream identifier from the indexing and storage system 116 based on the timing metadata in the client request.

In accordance with an embodiment, for an altered schedule, the stream publishing engine 114 in the DACIS 103 may be configured to determine an alternate representation of the first disparate live media output stream based on the repository of schedules, rights, and user preferences database 144 or third-party systems. The stream publishing engine 114 in the DACIS 103 may be further configured to reconstruct the first disparate live media output stream for an altered schedule associated with the stream identifier, the program identifier, and the timing metadata, and generate a second disparate live media output stream based on the insertion of the manifest data and indexed metadata of the programming content associated with the program identifier referenced in altered schedule, in addition to stream identifier and timing metadata. The programming content associated with the program identifier in the manifest data, indexed metadata and updated playback position, of the second disparate live media output stream may then be played out by the stream publishing engine 114.

In accordance with another embodiment, for an unaltered schedule, the stream publishing engine 114 in the DACIS 103 may be configured to insert the manifest data and the indexed metadata of the programming content associated with the program identifier to the first disparate live media output stream manifest in accordance with the fourth functionality. The stream publishing engine 114 may be further configured to generate the second disparate live media output stream, based on the insertion of the determined manifest data and indexed metadata associated with the program identifier referenced in the first programming schedule 111, in addition to the stream identifier and the timing metadata. Such a generated second disparate live media output stream may comprise the manifest data, the indexed metadata, and the updated playback position for resuming at one or both of the first client device, such as the client device 132a, and the second client device, such as client device 132b, as requested. Accordingly, the stream publishing engine 114 may be configured to play out the programming content associated with the program identifier in the manifest data, the indexed metadata and the updated playback position, of the second disparate live media output stream.

Figure 1C:
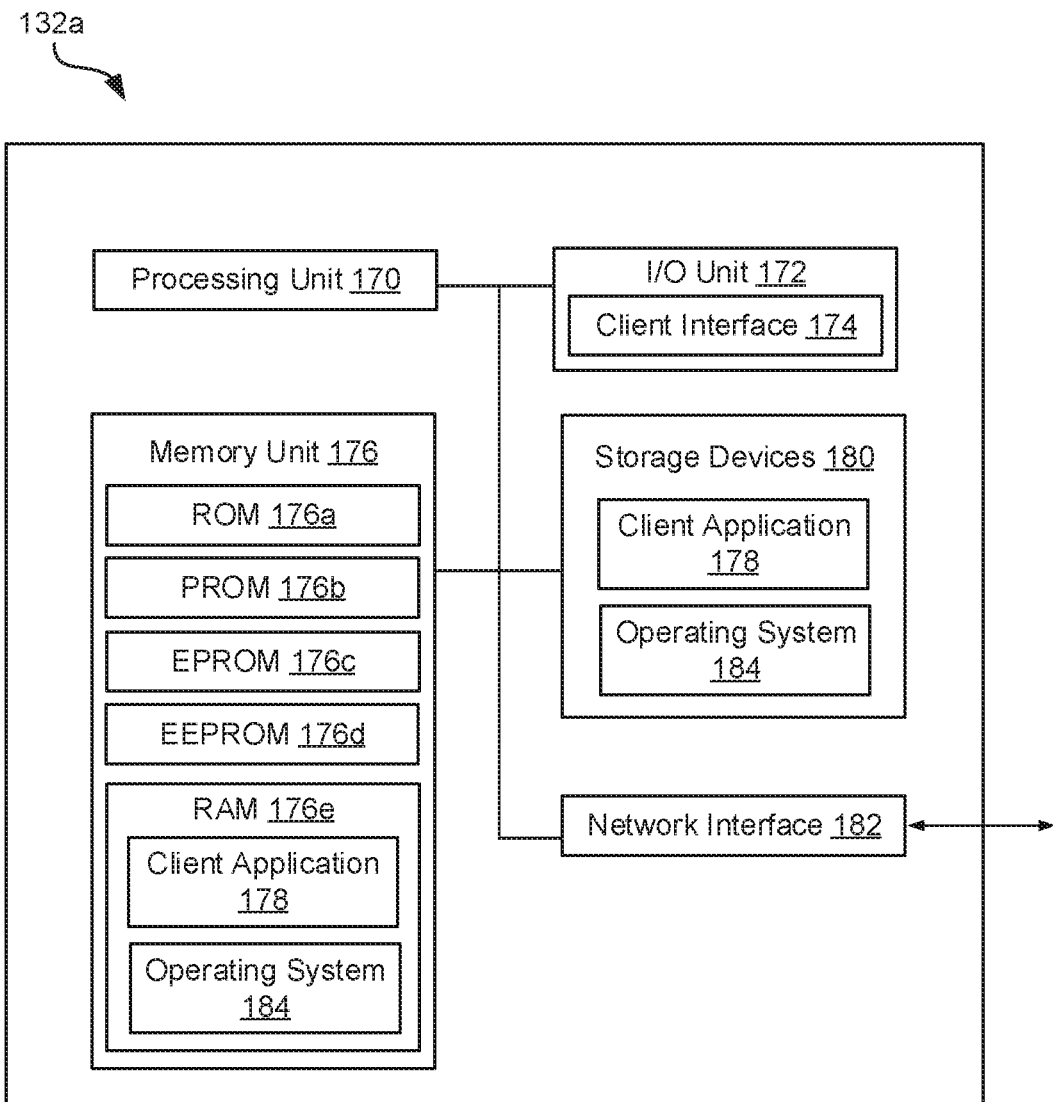
FIG. 1C is a block diagram that illustrates an exemplary first client device for client-side dynamic presentation of programming content in an indexed disparate live media output stream, in accordance with exemplary embodiments of the disclosure.

FIG. 1C is a block diagram that illustrates an exemplary first client device for client-side dynamic presentation of programming content in an indexed disparate live media output stream, in accordance with exemplary embodiments of the disclosure. Referring to FIG. 1C, the first client device, such as client device 132a, may comprise a processing unit 170 that may communicate with other elements within the first client device, such as client device 132a, via a system interface or bus interface. Also included in the first client device, such as client device 132a, may be an input/output (I/O) unit 172 for receiving user input and presenting a disparate live media output stream at a client interface 174. There is further shown memory unit 176, which includes read only memory (ROM) 176a (for example, masked ROM), programmable ROM (PROM) 176b, erasable programmable ROM (EPROM) 176c, electrically erasable programmable ROM (EEPROM)) 176d and random access memory (RAM) (for example, dynamic RAM (DRAM) and static RAM (SRAM)) 176*e*. The ROM 176*a* of the client device 132*a* may be used to store a basic input/output system (BIOS), containing the basic routines that help to transfer information between elements within the first client device, such as client device 132*a*.

In addition, the first client device, such as client device 132*a*, may include storage devices 180, and each of these storage devices 180 may be connected to the system bus by an appropriate interface. The storage devices 180 and associated computer-readable media may provide nonvolatile storage for a personal computer. In addition, the first client device, such as client device 132*a*, may further include a network interface 182 for interfacing and communicating with other elements of a computer network.

A number of program modules for various applications may be stored by the storage devices 180 and within RAM 176*e*. For example, according to various embodiments in which a client application 178 is executed locally on the first client device, such as client device 132*a*, such program modules include the operating system 184 and the various modules that are integrated into the client application 178 to control certain aspects of the operation of the client application 178 with the assistance of the processing unit 170 and the operating system 184.

In accordance with various embodiments, the client application 178 may be configured to process login information from a user, maintain subscription status of the user, manage the content, such as output streams, received from the content delivery system 130. The client application 178 may be configured to manage and store user preferences, manage the graphical user interfaces and client interfaces that are presented to the user, and receive input or selection from the user via the graphical user interfaces. In accordance with an embodiment, the client application 178 may be stored on and executed from the first client device, such as client device 132*a*, or executed through a link on a website by the first client device, such as client device 132*a*.

In accordance with various embodiments, upon launching and logging into the client application 178, the content delivery system 130 may be configured to deliver programming and/or non-programming content to the client application 178 over a network, such as, for example, a LAN or the Internet. For example, content received from the content delivery system 130 may include, but not limited to, live media output streams, pre-encoded media assets, a programming schedule for a specific television channel, a programming schedule of live media output streams for a particular time period (for example, next 24 hours, remainder of the day, week, or month), a list of programming content of pre-encoded media assets that has been watched by the most users, a list of programming content of pre-encoded media assets that has been suggested for viewing, a list of programming content, for example via an electronic program guide, associated with a disparate live media output stream, external links (for example, hyperlinks) to websites and other information relevant to the current live media output streams.

In accordance with various embodiments, the client application 178 may allow the user to control the playback of a disparate live media output stream in accordance with one or more functionalities. The first programming schedule 111 published by the DACIS 103 may comprise the one or more functionalities enabled via one or more constraints and rights associated with at least the indexed first disparate live media output stream. The one or more functionalities may include a first functionality to restart the programming content in the first disparate live media output stream that is presented on at least the first client device, a second functionality to skip to a future scheduled programming content in the first disparate live media output stream, a third functionality to time-shift within the programming content in the first disparate live media output stream, and a fourth functionality to resume playback within the programming content in the first disparate live media output stream.

In accordance with an embodiment, the one or more functionalities may be provided by interfacing with the play controls provided by one or more media players that reside on the first client device, such as client device 132*a*, (for example, RealPlayer™, Windows Media Player™ QuickTime™, and Adobe Flash Player™). For example, according to an embodiment, the client application 178 may display a "restart video" button, which if selected by the user instructs the media player in the client application 178 to restart the first disparate live media output stream; a "skip video" button, which if selected instructs media player in the client application 178 to skip to a future scheduled programming content in the first disparate live media output stream; a "seek backward video" button, which if selected instructs the media player in the client application 178 to time-shift in backward direction by a certain amount of time within the programming content in the first disparate live media output stream; a "resume video" button, which if selected at the first client device, instructs the media player in the client application 178 to resume the playback at one of the first client device or a second client device. Each function is discussed in more detail in FIGS. 7A to 7D in reference to selection of an exemplary button that instructs the client application 178 to perform the desired function.

In operation, in accordance with an embodiment corresponding to a first use case, the processing unit 170 of the first client device, such as the client device 132*a*, may be configured to request for a list of programming content associated with the first disparate live media output stream from the repository of schedules, rights, and user preferences database 144. The list of programming content may comprise additional metadata that controls the first functionality to restart the programming content in the first disparate live media output stream that is presented on at least the first client device. The processing unit 170 of the first client device, such as the client device 132*a*, may be configured to determine the program identifier based on the request for the list of programming content associated with the first disparate live media output stream from the repository of schedules, rights, and user preferences database 144. A user input may be provided by the user of the first client device when the indexed first disparate live media output stream is played back at the client interface 174 of the first client device, such as client device 132*a*. The processing unit 170 in conjunction with the client application 178, may be configured to generate the client request based on the user input when the indexed first disparate live media output stream is played back at the client interface 174 of the first client device. The processing unit 170 in conjunction with the client application 178 and the I/O unit 172, may be configured to present the altered first disparate live media output stream at the client interface 174 based on the generated client request.

In accordance with another embodiment corresponding to a second use case, the processing unit 170 of the first client device, such as the client device 132*a*, may be configured to request for a list of programming content associated with the first disparate live media output stream from the repository of schedules, rights, and user preferences database 144. The list of programming content may comprise additional metadata that controls the second functionality to skip to a future scheduled programming content in the first disparate live media output stream. A user input may be provided by the user of the first client device when the indexed first disparate live media output stream is played back at the client interface 174 of the first client device, such as client device 132*a*. The processing unit 170 of the first client device, such as the client device 132*a*, may be configured to determine the program identifier based on the selected future scheduled programming content that is scheduled to be played out during a future timestamp after a live point in a playback buffer of the first disparate live media output stream. The processing unit 170 in conjunction with the client application 178, may be configured to generate the client request based on the user input that corresponds to the selection of the future scheduled programming content from the list of programming content. The processing unit 170 in conjunction with the client application 178 and the I/O unit 172 may be configured to present the altered first disparate live media output stream at the client interface 174 based on the generated client request.

In accordance with another embodiment corresponding to a third use case, the processing unit 170 of the first client device, such as the client device 132*a*, may be configured to request for a list of programming content associated with the first disparate live media output stream from the repository of schedules, rights, and user preferences database 144. The list of programming content may comprise additional metadata that controls the third functionality to time-shift within the programming content in the first disparate live media output stream. The processing unit 170 in conjunction with the client application 178 and the I/O unit 172, may be configured to present the client interface 174 at the first client device in accordance with the third functionality which corresponds to each programming content as enabled via the one or more constraints and rights. The processing unit 170 in conjunction with the client application 178 may be configured to enable the seeking option within the programming content in the first disparate live media output stream at the client interface 174 of at least the first client device. A user input may be provided by the user of the first client device when the indexed first disparate live media output stream is played back at the client interface 174 of the first client device, such as client device 132*a*. The user input may be provided, via the enabled seeking option, for a seeking position to which playback is to be time-shifted to. The processing unit 170 of the first client device, such as the client device 132*a*, may be configured to determine the program identifier based on the user input that is provided to time-shift within the programming content in the first disparate live media output stream. The processing unit 170 in conjunction with the client application 178, may be configured to generate the client request based on the program identifier and a seeking position to which playback is to be time-shifted to. The processing unit 170 in conjunction with the client application 178 and the I/O unit 172 may be configured to present the altered first disparate live media output stream at the client interface 174 based on the generated client request.

In accordance with another embodiment corresponding to a fourth use case, the processing unit 170 in conjunction with the client application 178 may be configured to proceed to playback the first disparate live media output stream. The processing unit 170 in conjunction with the client application 178 and the I/O unit 172, may be configured to present the client interface 174 at the first client device in accordance with the fourth functionality which corresponds to each programming content as enabled via the one or more constraints and rights. The processing unit 170 in conjunction with the client application 178 and the I/O unit 172 may be configured to pause or terminate the playback of the first disparate live media output stream upon a first user selection. The processing unit 170 in conjunction with the client application 178 may be configured to capture the stream identifier of the first disparate live media output stream, the program identifier of the programming content that is currently playing back, and the timing metadata within the first disparate live media output stream. The processing unit 170 in conjunction with the client application 178 and the I/O unit 172 may be configured to resume the playback of the first disparate live media output stream on at least one of the first client device, such as the client device 132*a*, or a second client device, such as the client device 132*b*, upon a second user selection based on the captured stream identifier of the first disparate live media output stream, the program identifier of the programming content that is currently playing back, and the timing metadata. The processing unit 170 in conjunction with the client application 178 may be configured to generate the client request based on the stream identifier, program identifier and timing metadata. The processing unit 170 in conjunction with the client application 178 and the I/O unit 172 may be configured to present the generated second disparate live media output stream at the client interface 174 based on the generated client request.

Figure 2:
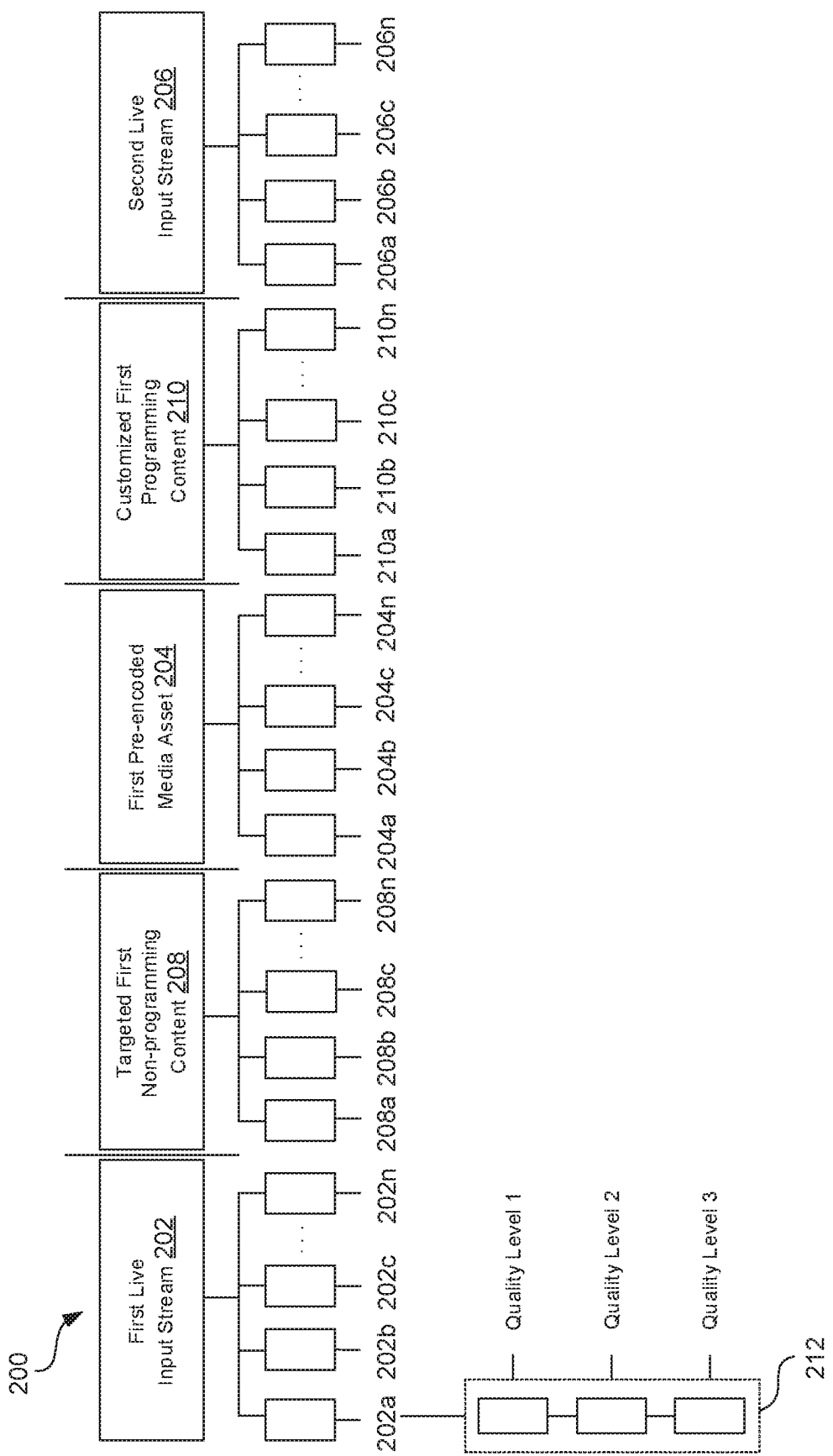
FIG. 2 illustrates segmentation of live input streams and pre-encoded media assets for a first programming schedule for publishing a disparate per-client live media output stream based on dynamic insertion of targeted non-programming content and customized programming content by the DACIS of FIG. 1B, and for server-side dynamic insertion of programming content in an indexed disparate live media output stream, in accordance with exemplary embodiments of the disclosure.

FIG. 2 illustrates segmentation of live input streams and pre-encoded media assets for the first programming schedule 111 or the alternate programming schedule 113 for publishing a disparate per-client live media output stream based on dynamic insertion of targeted non-programming content and customized programming content by the DACIS 103 of FIG. 1B, and for client-side dynamic presentation of programming content in an indexed disparate live media output stream, in accordance with exemplary embodiments of the disclosure. Referring to the exemplary arrangement of FIG. 2, there is shown a first live input stream 202, a first pre-encoded media asset 204, and a second live input stream 206. There is also shown a targeted first non-programming content 208 placed after the first live input stream 202, and a customized first programming content 210 placed after the first pre-encoded media asset 204. The first live input stream 202 may be segmented into a first set of video segments 202*a*, 202*b*, 202*c*, . . . , 202*n*. Similarly, the first pre-encoded media asset 204 and the second live input stream 206 may also be segmented into second set of video segments 204*a*, 204*b*, 204*c*, . . . , 204*n*, and third set of video segments 206*a*, 206*b*, 206*c*, . . . , 206*n* respectively. By way of example, the segmentation may be executed by a segmenting system (for example a live stream encoder/packager and/or a content encoder/packager (not shown)) during a preparation stage of the media assets. The encode stage may create various quality levels and the package stage segments the content into the short segments, and produces the correct format, such as TS, fMP4, or CMAF and encrypts the media content to prevent piracy. In accordance with an embodiment, the segments of the first set of video segments 202*a*, 202*b*, 202*c*, . . . , 202*n*, the second set of video segments 204*a*, 204*b*, 204*c*, . . . , 204*n*, and third set of video segments 206*a*, 206*b*, 206*c*, . . . , 206*n*, may be segmented into consistent length, for example, 10 seconds segments. It may be advantageous to have a consistent and smaller file size of segments to be able to quickly push to the content delivery system 130, and also for quick downloading by a media player at the end-user side, such as on the plurality of consumer devices 110*a*, . . . , 110*n*.

It should be understood by those skilled in the art that various changes may be made and segments of different file sizes (or length) may be used without departure from the scope of the present disclosure. Further, other streaming protocols may require a different processing of media content. Thus, the scope of the disclosure should not be limited to the processing or preparation of media content to allow delivery using different delivery methods, streaming protocols, or distribution system, known in the art. Further, instead of the live input streams and pre-encoded media asset arranged, as shown, different arrangements per the first programming schedule 111 or the alternate programming schedule 113 may be possible with respect to interstitial content items, such as the targeted first non-programming content 208 and the customized first programming content 210.

The insertion of the live input stream manifests, pre-encoded media asset manifests, the targeted first non-programming content 208 and the customized first programming content 210 may be done on-the-fly based on dynamic scheduling by the PEM 115 that generates the first programming schedule 111 or the alternate programming schedule 113. The insertion may be driven by real time or near-real time content context analysis, user-selection on the consumer devices 110a, . . . , 110n, or driven by external data received from the external data source 120. The PEM 115 in association with the stream selection service 142 may be configured to insert live input streams, such as the first live input stream 202 and the second live input stream 206, or pre-stored media assets, such as the first pre-encoded media asset 204, the targeted first non-programming content 208 and the customized first programming content 210, in an existing disparate live media output stream based on manipulation of a manifest the existing disparate live media output stream, such as an existing channel.

In accordance with an embodiment, each segment of the first set of video segments 202a, 202b, 202c, . . . , 202n, the second set of video segments 204a, 204b, 204c, . . . , 204n, and third set of video segments 206a, 206b, 206c, . . . , 206n, may be further processed to be stored at various quality levels, and content encryption modes for the purposes of adaptive bitrate streaming and digital rights management, for example, the video segment 202a may be stored in a plurality of quality levels, for example, high definition (HD), high dynamic range (HDR) video, or different quality levels in accordance with specified pixel resolutions, bitrates, frame rates, and/or sample frequencies. As each of the media content, such as 202 to 206, are encoded, segmented, and stored with the plurality of quality levels in a media content master storage system. The media content may be re-used to create new channels, such as a new disparate live media output stream, without having to re-encode a selected live input stream or a pre-encoded media asset when a new disparate live media output stream is created using the live input streams or a pre-encoded media asset.

For the sake of brevity, and with reference to FIG. 2, there is shown an example of publishing the first or the updated (or alternate) disparate live media output streams based on dynamic insertion of targeted non-programming content and customized programming content by the DACIS 103 of FIG. 1B. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the plurality of consumer devices 110a, . . . , 110n, based on at least the desired delivery method, delivery conditions, content protection requirements, to satisfy operational and technical requirements, as needed. The operational and technical requirements may include, but are not limited to, media encoding, media segmentation, programming schedule (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for same media content may not be required. Further, based on different operational and technical requirements, publishing of disparate live media output stream may be different. The media content that is prepared and distributed may include both the programming content, such as long-form presentations, short-form presentations, news or sporting events; and non-programming content, such as paid advertisements, public service advertisements, or promotional material.

Figure 3:
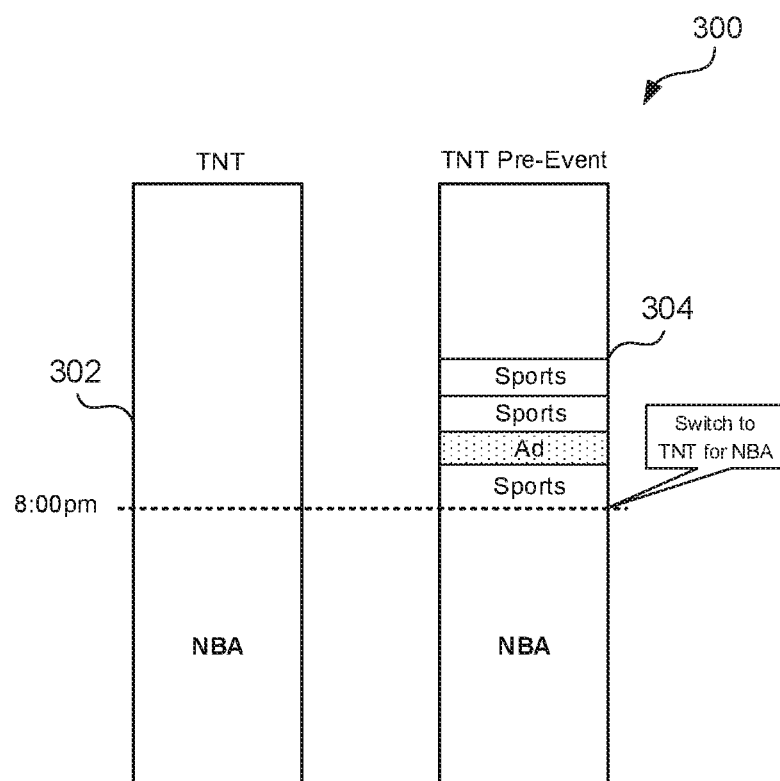
FIG. 3 illustrates an exemplary scenario associated with publishing a disparate live media output stream by the DACIS of FIG. 1B, in accordance with an exemplary embodiment of the disclosure.

FIG. 3 illustrates an exemplary scenario associated with publishing a disparate live media output stream by the DACIS 103 of FIG. 1B, in accordance with an exemplary embodiment of the disclosure. Referring to the exemplary scenario 300, there are illustrated two disparate live media output streams 302 and 304 published for two users associated with the client devices 132a and 132n, respectively. The disparate live media output stream 302 may be existing disparate live media output stream for the client device 132a. The disparate live media output stream 304 may be a disparate per-client live media output stream published based on dynamic insertion of targeted non-programming content and customized programming content by the DACIS 103 of FIG. 1B for the client device 132n.

The live NBA game may be scheduled to start at 8:00 pm. However, a user associated with the client device 132n tunes in early to watch the NBA game, for example at 7:15 pm. However, the user may not be interested in watching the end of the current programming media content. In such a case, the PEM 115 in the DACIS 103 may determine targeted non-programming content, such as sports items ads, and customized programming content, such as NBA highlights of previous game and generates the alternate programming schedule 113. Accordingly, the stream publishing engine 114 in the DACIS 103 may publish an alternate disparate live media output stream 117n for the client device 132n. At 8:00 pm, the DACIS 103 may switch back to the live NBA game scheduled at 8:00 pm.

Figure 3A:
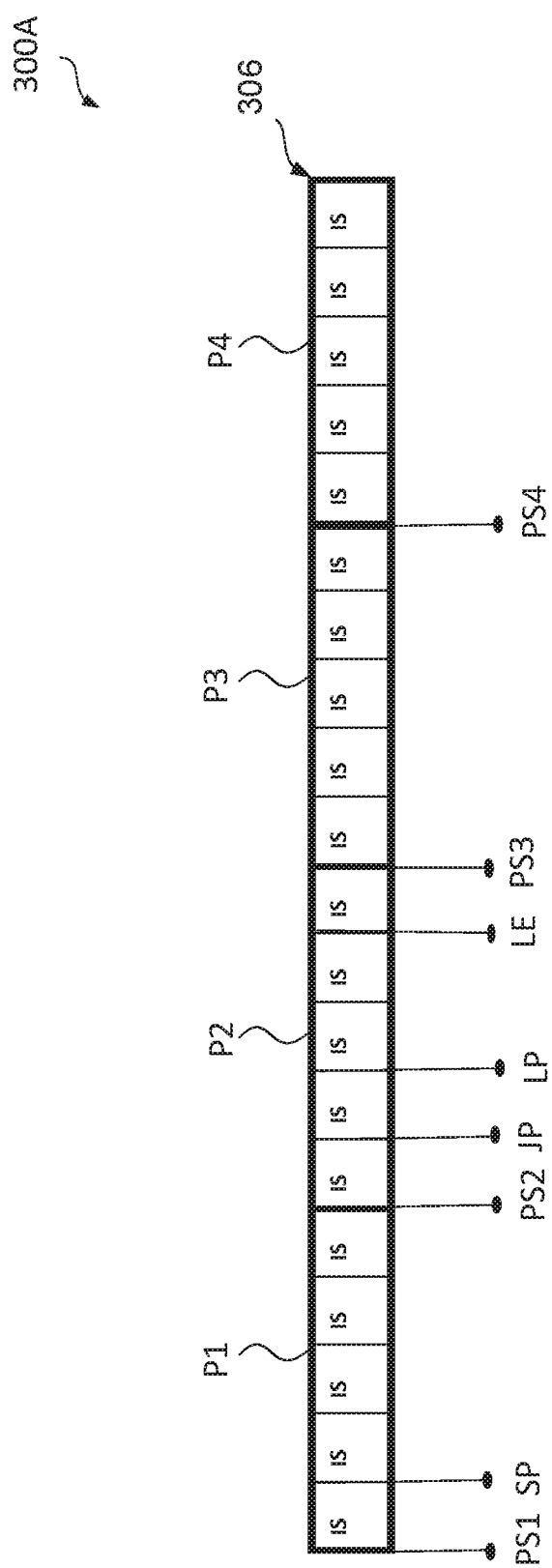
FIG. 3A illustrates a disparate live media output stream manifest, in accordance with an exemplary embodiment of the disclosure.

FIG. 3A illustrates an exemplary disparate live media output stream manifest, in accordance with an exemplary embodiment of the disclosure. Referring to an exemplary scenario 300A, there is illustrated a disparate live media output stream manifest 306 published for a user associated with the first client device, such as client device 132a. There are shown indexed media segments corresponding to four different programming content P1, P2, P3 and P4, with program start markers PS1, PS2, PS3, and PS4, respectively, scheduled as per the first programming schedule 111. Each of the programming content P1, P2, P3 and P4, is shown to comprise five indexed segments. In accordance with the exemplary embodiment, there is shown the program start point PS2 corresponding to the program start/restart identifier associated with the second programming content P2, which is the currently playing programming content. There are further shown a live point LP that corresponds to the current playback position in the published first programming schedule, a live edge LE that corresponds to the trailing edge of the live window, a join point JP that corresponds to a point when the user associated with the client device 132a joins to view the disparate live media output stream.

In accordance with a first use case corresponding to the first functionality to restart programming content, such as the programming content P2, in a disparate live media output stream, the user may provide a user input at the client device 132a to restart the programming content P2 that is currently being played back. The current playback position as per the published first programming schedule 111 corresponds to the live point LP. The DACIS 103 may be configured to insert the manifest data and indexed metadata of the second programming content P2 associated with the program identifier (of the programming content P2) to the disparate live media output stream manifest 306 and generate a corresponding altered disparate live media output stream that comprises the manifest data, the indexed metadata and an updated playback position. The updated playback position as per the published first programming schedule 111 corresponds to the program start point PS2.

In accordance with a second use case corresponding to the second functionality to skip to a future scheduled programming content, such as the programming content P4, in the disparate live media output stream, the user may provide a user input at the client device 132a to skip to the programming content P4 from the live point LP corresponding to the programming content PS2 (that is currently being played back). The DACIS 103 may be configured to insert the manifest data and indexed metadata of the fourth programming content P4 associated with the program identifier (of the programming content P4) to the disparate live media output stream manifest 306 and generate a corresponding altered disparate live media output stream that comprises the manifest data, the indexed metadata and an updated playback position. The updated playback position as per the published first programming schedule 111 corresponds to the program start point PS4 of the programming content P4. In such case, the media segments of the programming content P4 may correspond to a pre-encoded media asset converted to a live stream.

In accordance with a third use case corresponding to the third functionality to time-shift within a programming content, such as the programming content P1, in the disparate live media output stream, the user may provide a user input at the client device 132a to time-shift to the programming content P1 from the live point LP corresponding to the programming content P2 (that is currently being played back). The DACIS 103 may be configured to insert the manifest data and indexed metadata of the first programming content PS1 associated with the program identifier (of the programming content P1) and seeking point SP to the disparate live media output stream manifest 306 and generate a corresponding altered disparate live media output stream that comprises the manifest data, the indexed metadata and an updated playback position. The updated playback position as per the published first programming schedule 111 corresponds to the seeking point SP of the programming content P1.

In accordance with a fourth use case corresponding to the fourth functionality to resume playback within the programming content, such as the programming content P2, in the disparate live media output stream, the user may provide a user input at the client device 132a to resume playback of the programming content P2 from the live point LP at the other client device 132b. The DACIS 103 may be configured to reconstruct the disparate live media output stream manifest based on the stream identifier, the program identifier (i.e. PS2), and the timing metadata (corresponding to the live point LP). The user then switches to the client device 132b and playback is resumed using the state (saved by the client device 132a corresponding to the stream identifier, the program identifier, and the timing metadata) from the live point LP.

FIGS. 4A to 4D depict flowcharts illustrating exemplary operations for publishing a disparate per-client live media output stream based on dynamic insertion of targeted non-programming content and customized programming content in the media packaging and distribution system 102 of FIG. 1B, in accordance with an exemplary embodiment of the disclosure. Specifically, flowcharts 400A and 400B collectively depicts a method for just-in-time insertion of non-programming content and/or programming content, in accordance with an embodiment of the disclosure. Flowchart 400C depicts a method for personalized insertion of non-programming content and/or programming content, in accordance with an embodiment of the disclosure. Flowchart 400E depicts a method for stream failover, in accordance with an embodiment of the disclosure.

Figure 4A:
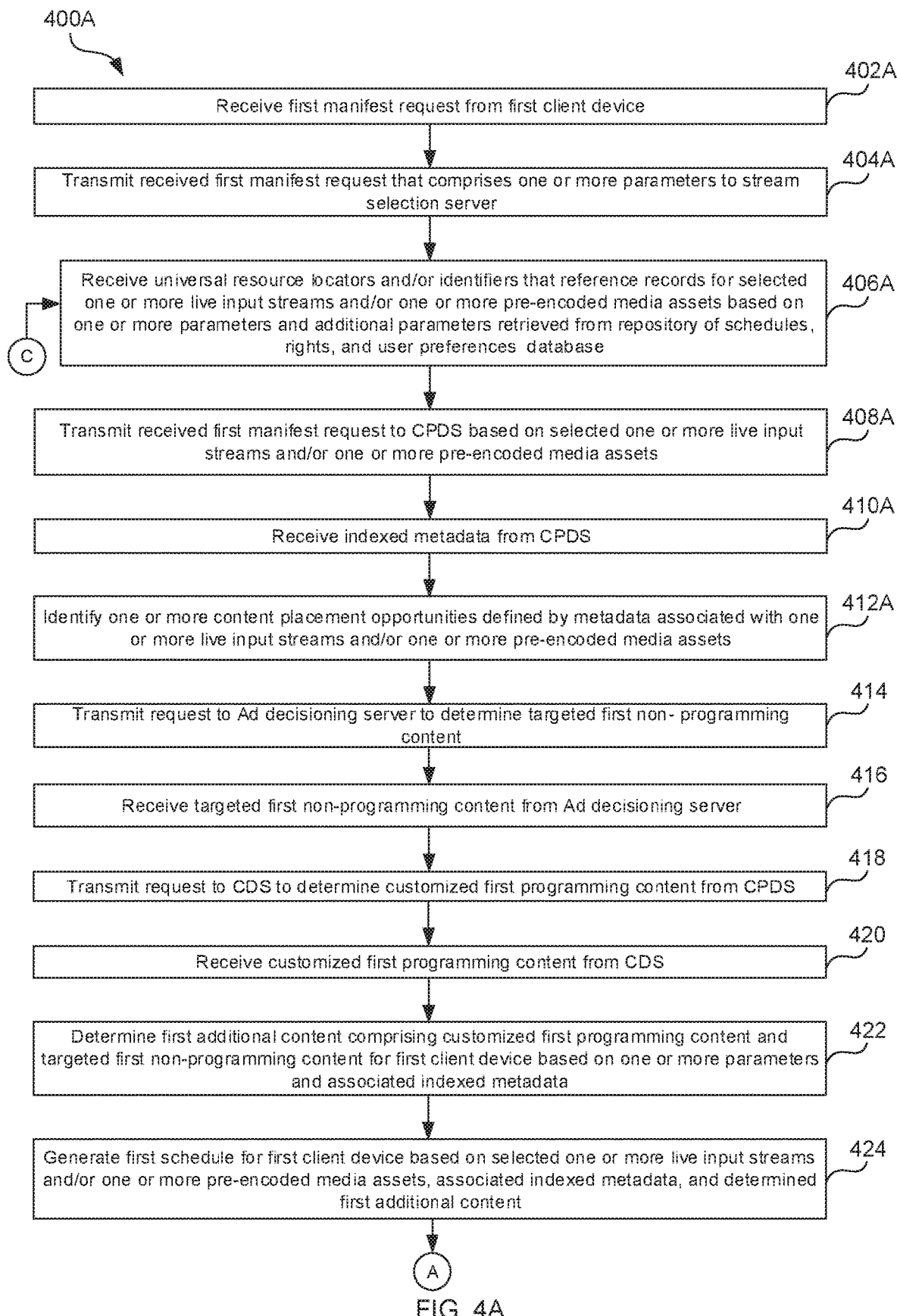
FIGS. 4A to 4D collectively depict a flowchart illustrating exemplary operations for publishing a disparate per-client live media output stream based on dynamic insertion of targeted non-programming content and customized programming content by the DACIS of FIG. 1B, in accordance with an exemplary embodiment of the disclosure.
Figure 4B:
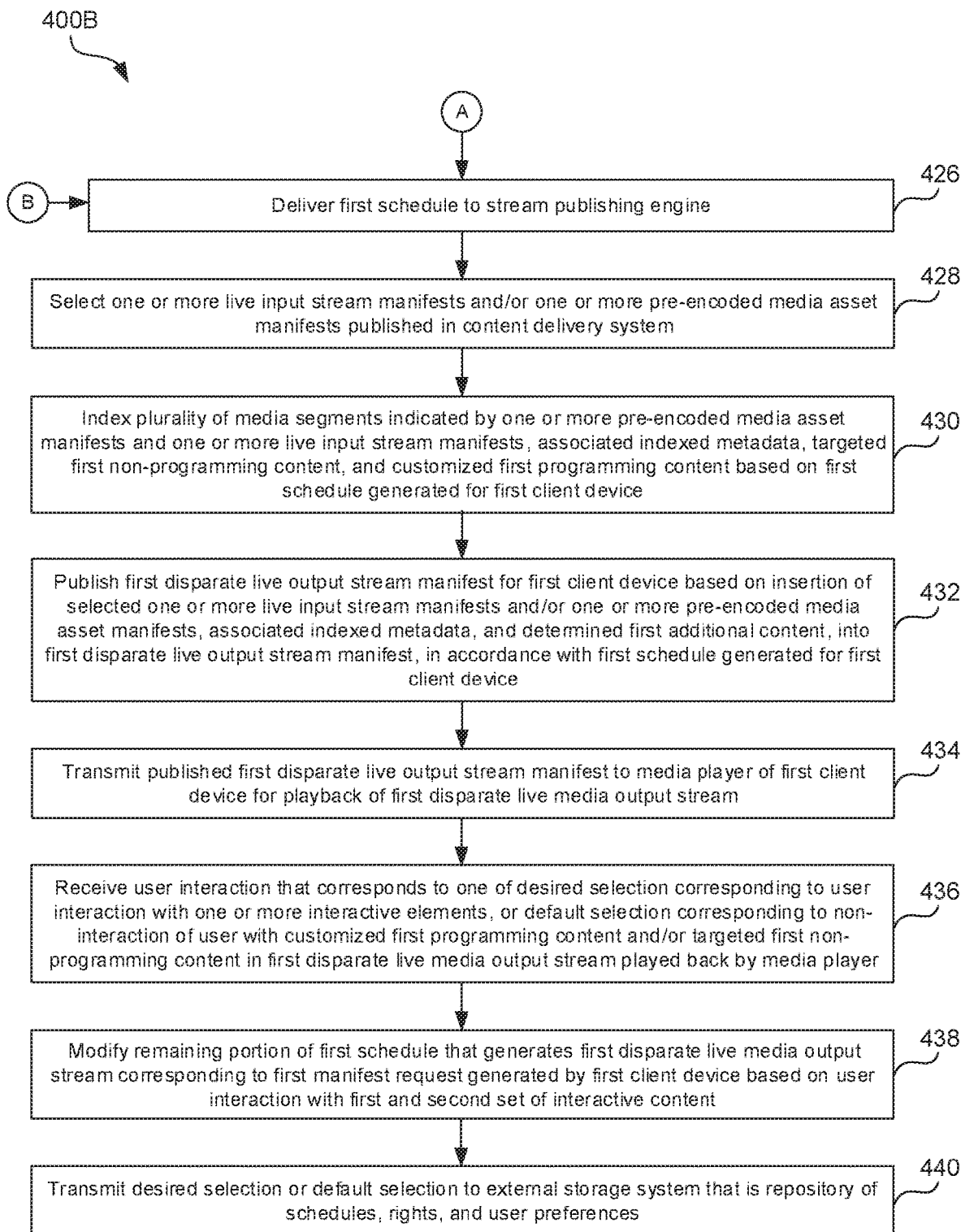

Referring to FIGS. 4A and 4B, flowcharts 400A and 400B collectively depicts a method for just-in-time insertion of non-programming content and/or programming content, in accordance with an embodiment of the disclosure.

At 402A, a first manifest request may be received from a first client device. In accordance with an embodiment, the DACIS 103 may be configured to receive the first manifest request from the first client device, such as a client device 132a, to begin or continue playback of a first disparate live media output stream, for example the disparate live media output stream 117a. The first manifest request may comprise one or more parameters. Examples of the one or more parameters may include, but are not limited to, universal resource locators and/or identifiers referencing records for existing one or more live input streams or one or more pre-encoded media assets in the CPDS 107, a plurality of client-specific parameters, and a plurality of client-specified attributes derived from a user interaction with the first client device, such as the client device 132a. Examples of the plurality of client-specific parameters may include, but are not limited to, user preferences and identifiers, client device preferences and identifiers, and one or more rules governed by geolocation data and current position of playback of a first disparate live media output stream, such as the disparate live media output stream 117a, at the first client device, such as the client device 132a. In an embodiment, the client-specified attributes derived from a user interaction with the first client device may include, but are not limited to, the user interaction with interactive content in a customized first programming content and a targeted first non-programming content, and a preference for a type and/or category of the targeted first non-programming content and/or the customized first programming content. The user interaction with the interactive content may comprise, for example, a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations.

At 404A, the received first manifest request that comprises one or more parameters may be transmitted to the stream selection service 142. In an embodiment, the PEM

115 of the DACIS 103 may be configured to transmit the received first manifest request that comprises the one or more parameters to the stream selection service 142.

In an embodiment, based on the received first manifest request, the stream selection service 142 may be configured to select one or more live input streams and/or one or more pre-encoded media assets based on the one or more parameters and additional parameters retrieved from the repository of schedules, rights, and user preferences database 144. Accordingly, the stream selection service 142 may be configured to return universal resource locators and/or identifiers that reference records for the selected one or more live input streams and/or one or more pre-encoded media assets to the PEM 115.

At 406A, the universal resource locators and/or identifiers that reference records for the selected one or more live input streams and/or one or more pre-encoded media assets based on the one or more parameters and additional parameters retrieved from the repository of schedules, rights, and user preferences database 144 may be received. In an embodiment, the PEM 115 of the DACIS 103 may be configured to receive the universal resource locators and/or identifiers that reference records for the selected one or more live input streams and/or one or more pre-encoded media assets based on the one or more parameters and additional parameters retrieved from the repository of schedules, rights, and user preferences database 144.

At 408A, the received first manifest request may be transmitted to the CPDS 107 based on the selected one or more live input streams and/or one or more pre-encoded media assets. In an embodiment, the PEM 115 of the DACIS 103 may be configured to transmit the received first manifest request to the CPDS 107 based on the selected one or more live input streams and/or one or more pre-encoded media assets.

In an embodiment, based on the received first manifest request, the CPDS 107 may be configured to retrieve indexed metadata, for example, non-programming indicators, such as ad break locations, graphical treatment indicators, such as overlay markers/triggers, programming indictors, such as SCTE35 markers and content duration. Accordingly, the CPDS 107 may be configured to return the indexed metadata to the PEM 115.

At 410A, the indexed metadata may be received from the CPDS 107. In an embodiment, the PEM 115 of the DACIS 103 may be configured to receive the indexed metadata from the CPDS 107. Examples of the indexed metadata may include, but are not limited to, non-programming indicators, such as ad break locations, graphical treatment indicators, such as overlay markers/triggers, programming indictors, such as SCTE35 markers and content duration, as described above.

At 412A, one or more content placement opportunities defined by the metadata associated with the one or more live input streams and/or one or more pre-encoded media assets may be identified. In an embodiment, the PEM 115 of the DACIS 103 may be configured to identify the one or more content placement opportunities defined by the metadata associated with the one or more live input streams and/or one or more pre-encoded media assets. Examples of the one or more content placement opportunities may include, but are not limited to, non-programming indicators, such as ad break locations, graphical treatment indicators, such as overlay markers/triggers, programming indictors, such as SCTE35 markers and personalized content opportunity. In an embodiment, for the identified one or more content placement opportunities, the PEM 115 of the DACIS 103 may be configured to determine additional content, such as non-programming content (such as advertisements), personalized programming content (such as promotional content), graphical treatment (such as overlays), and one or more decision point locations.

At 414, a request may be transmitted to the Ad decisioning server 106a to determine targeted first non-programming content. In an embodiment, the PEM 115 of the DACIS 103 may be configured to transmit the request to the Ad decisioning server 106a to determine the targeted first non-programming content.

In an embodiment, based on the request, the Ad decisioning server 106a may be configured to identify the targeted first non-programming content, such as an advertising or an graphical treatment content, to be scheduled in one or more content placement opportunities, based on the one or more parameters. In an embodiment, the Ad decisioning server 106a may be configured to identify the targeted first non-programming content based on execution of a non-programming content service based on rules and conditions defined in additional parameters of the repository of schedules, rights, and user preferences database 144, and the one or more parameters defined in the first manifest request. Accordingly, the Ad decisioning server 106a may be configured to transmit the identified targeted first non-programming content to the PEM 115 of the DACIS 103.

At 416, the targeted first non-programming content may be received from the Ad decisioning server 106a. In an embodiment, the PEM 115 of the DACIS 103 may be configured to receive the targeted first non-programming content from the Ad decisioning server 106a.

At 418, a request may be transmitted to the CDS 105 to determine a customized first programming content to match one or more personalization parameters. In an embodiment, the PEM 115 of the DACIS 103 may be configured to transmit the request to the CDS 105. The CDS 105 may determine a customized first programming content to match one or more personalization parameters.

In an embodiment, based on the request, the CDS 105 may be configured to identify the customized first programming content based on the one or more parameters in the first manifest request, and the rules and conditions defined in the additional parameters of the repository of schedules, rights, and user preferences database 144. Accordingly, the CDS 105 may be configured to transmit the identified customized first programming content to the PEM 115 of the DACIS 103.

At 420, the customized first programming content may be received from the CDS 105. In an embodiment, the PEM 115 of the DACIS 103 may be configured to receive the customized first programming content from the CDS 105.

At 422, a first additional content comprising the customized first programming content and the targeted first non-programming content may be determined for the first client device based on the one or more parameters and the associated indexed metadata. In an embodiment, the PEM 115 of the DACIS 103 may be configured to determine the first additional content comprising the customized first programming content, received from the CDS 105, and the targeted first non-programming content, received from the Ad decisioning server 106a. The first additional content may be determined for the first client device, such as the client device 132a, based on the one or more parameters and the associated indexed metadata, received from the CPDS 107.

At 424, a first programming schedule 111 may be generated for the first client device based on the selected one or more live input streams and/or the one or more pre-encoded media assets, the associated indexed metadata, and the determined first additional content. In an embodiment, the PEM 115 of the DACIS 103 may be configured to generate the first programming schedule 111 for the first client device, such as the client device 132a, based on selected one or more live input streams and/or the one or more pre-encoded media assets, the associated indexed metadata, and the determined first additional content.

In accordance with an embodiment, the generated first programming schedule 111 may not include the first additional content, in accordance with the one or more parameters in the first manifest request. In accordance with another embodiment, the generated first programming schedule 111 may include the first additional content, in accordance with the one or more parameters in the first manifest request. In accordance with another embodiment, the generated first programming schedule 111 may include a subset of the first additional content, in accordance with the one or more parameters in the first manifest request.

In accordance with an embodiment, the first additional content scheduled to be inserted, may be inserted into, for example, one or more pre-encoded assets in accordance with appropriate markers. The appropriate markers may be defined in the metadata of the one or more pre-encoded assets, and rules and conditions defined in the repository of schedule, rights, and user preferences database 144.

In accordance with an embodiment, the generated first programming schedule 111 may define locations and types of one or more decision points defined by the one or more content placement opportunities in the indexed metadata. The one or more decision points may be included in the first programming schedule 111. Within the first programming schedule 111, the one or more decision points may define various types of the decision points, for example, an Ad preference, skip next ad, skip future ads, watch ads immediately instead of at future ad locations, or personalized content preferences.

In an exemplary embodiment, the one or more pre-encoded media assets are scheduled and the one or more decision points, defined by the one or more content placement opportunities, are inserted in the first programming schedule 111. In such exemplary embodiment, the first programming schedule 111 may be configured to control the one or more pre-encoded media asset manifests to be published as, for example, the first disparate live media output stream manifest. Further, the first programming schedule 111 may include, for example, segments, markers, the one or more content placement opportunities, up to and including next available decision point.

At 426, the first programming schedule 111 may be delivered to the stream publishing engine 114. In accordance with an embodiment, the PEM 115 in the DACIS 103 may be configured to deliver the first programming schedule 111 to the stream publishing engine 114.

At 428, one or more live input stream manifests and/or one or more pre-encoded media asset manifests published in the content delivery system 130 may be selected. In accordance with an embodiment, the stream publishing engine 114 in the DACIS 103 may be configured to select the one or more live input stream manifests and/or the one or more pre-encoded media asset manifests published in the content delivery system 130.

At 430, a plurality of media segments indicated by the one or more pre-encoded media asset manifests and the one or more live input stream manifests, the associated indexed metadata, the targeted first non-programming content, and the customized first programming content may be indexed based on the first programming schedule 111 generated for the first client device. In accordance with an embodiment, the indexing and storage system 116 may be configured to index the plurality of media segments indicated by the one or more pre-encoded media asset manifests and the one or more live input stream manifests, the associated indexed metadata, the targeted first non-programming content, and the customized first programming content may be indexed based on the first programming schedule 111 generated for the first client device, for example the client device 132a.

At 432, a first disparate live media output stream manifest for the first client device may be published based on insertion of the selected one or more live input stream manifests and/or the one or more pre-encoded media asset manifests, the associated indexed metadata, and the determined first additional content, into the first disparate live media output stream manifest, in accordance with the first programming schedule 111 generated for the first client device. In accordance with an embodiment, the stream publishing engine 114 in the DACIS 103 may be configured to publish the first disparate live media output stream manifest for the first client device, for example the client device 132a. The publication may be based on insertion of the selected one or more live input stream manifests and/or the one or more pre-encoded media asset manifests, the associated indexed metadata, and the determined first additional content, into the first disparate live media output stream manifest, in accordance with the first programming schedule 111 generated for the first client device, for example the client device 132a.

At 434, the published first disparate live media output stream manifest may be transmitted to a media player of the first client device for playback of the first disparate live media output stream, for example the disparate live media output stream 117a. In accordance with an embodiment, the DACIS 103 may be configured to transmit the published first disparate live media output stream manifest to the media player of the first client device for playback of the first disparate live media output stream, for example the disparate live media output stream 117a. In accordance with an embodiment, the first disparate live media output stream manifest for the first client device, for example the client device 132a, may be generated based on one of a pre-defined conversion modes. The pre-defined conversion modes may correspond to conversion of pre-encoded media assets to live stream mode, pre-encoded media assets to live stream mode with scalable architecture, a live stream to live stream mode, and a mixed mode corresponding to switches between pre-encoded media assets and live streams.

In accordance with an embodiment, the published first disparate live media output stream manifest may be delivered to the first client device, for example the client device 132a. Accordingly, the media player of the first client device, for example the client device 132a, may begin or continue playback of the first disparate live media output stream 117a. Further, the media player, during playback of the first disparate live media output stream 117a at the first client device, for example the client device 132a, presents one or more decision points defined by the interactive content to initiate a user interaction at the first client device, for example the client device 132a.

In accordance with an embodiment, during the playback, in case a decision point exists, is enabled, and presented by the first client device, for example the client device 132a, the user of the client device 132a may interact with one or more interactive elements at the decision point and influence (or modify) remaining first disparate live media output stream 117a.

For example, in an embodiment of just-in-time non-programming content insertion, at the one or more decision points, the user interaction corresponds to one of a desired selection corresponding to the user interaction with one or more interactive elements, or a default selection corresponding to non-interaction of a user with the customized first programming content and/or the targeted first non-programming content in the first disparate live media output stream 117a played back by the media player. In another example, in an embodiment of personalized content playlist, at the one or more decision points, the user interaction corresponds to one of exclusion of the targeted first non-programming content or the customized first programming content and replacement by default content, selection of alternate customized first programming content, selection of a subsequent second programming content, approval or disapproval of the selected customized first programming content, exclusion of subsequent second non-programming content for a remaining portion of the first disparate live media output stream 117a played back by the media player, selection of one or more targeted first non-programming content of a specific category, or viewing of some or all of the targeted first non-programming content immediately to avoid some or all of the targeted first non-programming content for the remaining portion of the first disparate live media output stream played back by the media player.

At 436, the user interaction may be received that corresponds to one of a desired selection corresponding to the user interaction with one or more interactive elements, or a default selection corresponding to a non-interaction of the user with the customized first programming content and/or the targeted first non-programming content in the first disparate live media output stream 117a played back by the media player. In accordance with an embodiment, the PEM 115 of the DACIS 103 may be configured to receive the user interaction may be received. The user interaction may correspond to one of a desired selection corresponding to the user interaction with one or more interactive elements, or a default selection corresponding to a non-interaction of the user with the customized first programming content and/or the targeted first non-programming content in the first disparate live media output stream 117a played back by the media player.

At 438, a remaining portion of the first programming schedule 111 that generates the first disparate live media output stream 117a corresponding to the first manifest request generated by the first client device, such as the client device 132a, may be modified based on the user interaction with the interactive content. In accordance with an embodiment, the PEM 115 of the DACIS 103 may be configured to modify the remaining portion of the first programming schedule 111 that generates the first disparate live media output stream 117a corresponding to the first manifest request generated by the first client device, such as the client device 132a, based on the user interaction with the interactive content.

At 440, a desired selection or the default selection may be transmitted to an external storage system that is the repository of schedules, rights, and user preferences database 144. In accordance with an embodiment, the first client device, for example the client device 132a, may be configured to transmit the desired selection or the default selection to the external storage system that is the repository of schedules, rights, and user preferences database 144.

In accordance with an embodiment, the user interaction or non-interaction result may be sent to future client manifest requests to influence the remainder of the first disparate live media output stream 117a. This may allow for a user choice, such as to skip an ad, to result with another manifest request to the DACIS 103 to update the existing first disparate live media output stream 117a with the intended behavior and affect playback of the first disparate live media output stream 117a within the first client device.

Figure 4C:
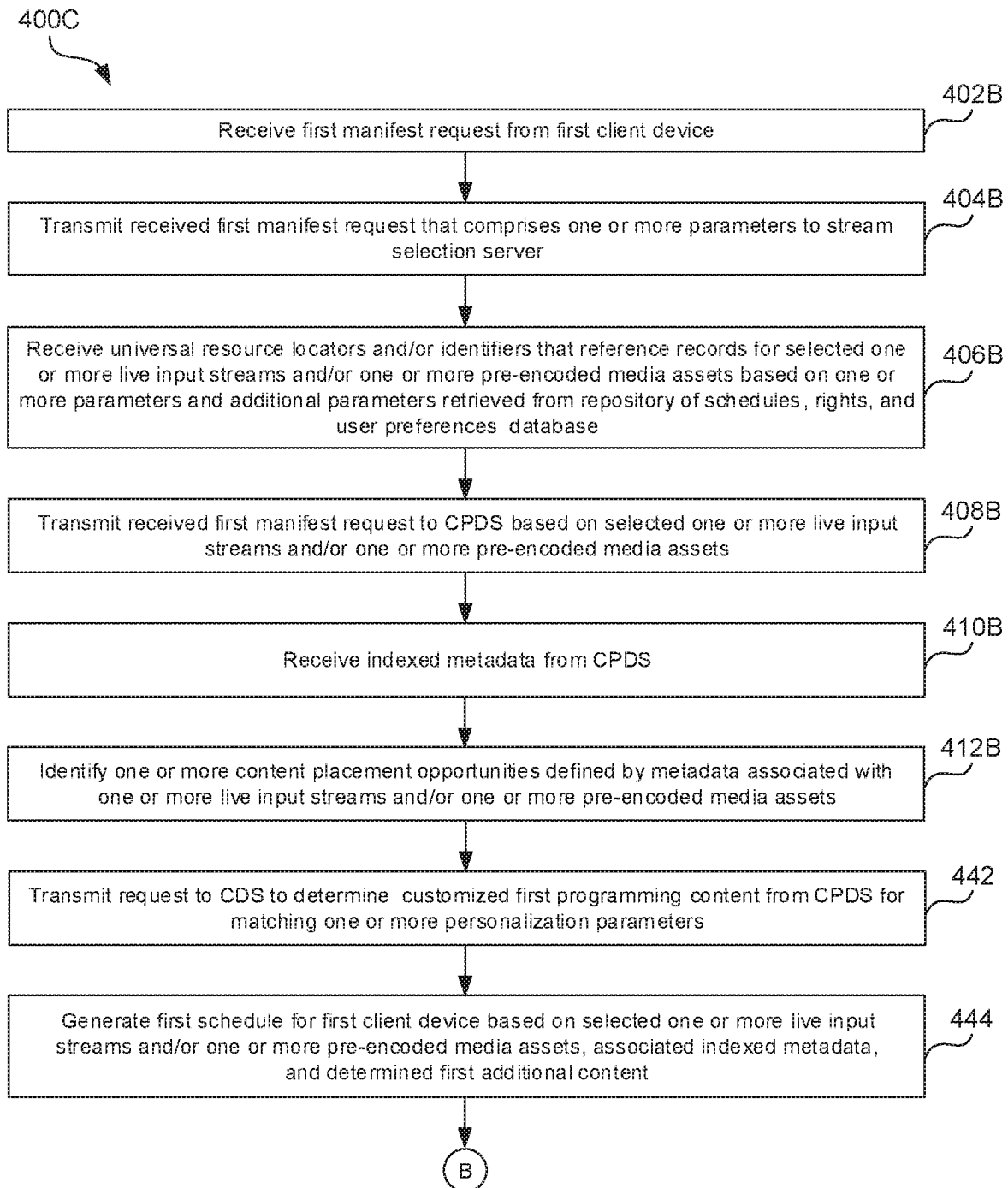

Referring to FIG. 4C, flowchart 400C depicts a method for personalized insertion of playlist of non-programming content and/or programming content, in accordance with an embodiment of the disclosure.

At 402B, a first manifest request may be received from a first client device. In accordance with an embodiment, the DACIS 103 may be configured to receive the first manifest request from the first client device, such as a client device 132a, to begin or continue playback of a first disparate live media output stream, for example the disparate live media output stream 117a. The first manifest request may comprise one or more parameters. Examples of the one or more parameters may include, but are not limited to, universal resource locators and/or identifiers referencing records for existing one or more live input streams or one or more pre-encoded media assets in the CPDS 107, a plurality of client-specific parameters, and a plurality of client-specified attributes derived from a user interaction with the first client device, such as the client device 132a. Examples of the plurality of client-specific parameters may include, but are not limited to, user preferences and identifiers, client device preferences and identifiers, and one or more rules governed by geolocation data and current position of playback of a first disparate live media output stream, such as the disparate live media output stream 117a, at the first client device, such as the client device 132a. In another embodiment, the client-specified attributes derived from a user interaction with the first client device may include, but are not limited to, a preference for a type and/or category of the targeted first non-programming content and/or the customized first programming content, and a possible time constraint (or duration) to fill with the targeted first non-programming content and/or the customized first programming content. The user interaction with the interactive content may comprise, for example, a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations.

The user interaction with the interactive content may comprise, for example, a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations.

At 404B, the received first manifest request that comprises one or more parameters may be transmitted to the stream selection service 142. In an embodiment, the PEM 115 of the DACIS 103 may be configured to transmit the received first manifest request that comprises the one or more parameters to the stream selection service 142.

In an embodiment, based on the received first manifest request, the stream selection service 142 may be configured to select one or more live input streams and/or one or more pre-encoded media assets based on the one or more parameters and additional parameters retrieved from the repository of schedules, rights, and user preferences database 144. Accordingly, the stream selection service 142 may be configured to return universal resource locators and/or identifiers that reference records for the selected one or more live input streams and/or one or more pre-encoded media assets to the PEM 115.

At 406B, the universal resource locators and/or identifiers that reference records for the selected one or more live input streams and/or one or more pre-encoded media assets based on the one or more parameters and additional parameters retrieved from the repository of schedules, rights, and user preferences database 144 may be received. In an embodiment, the PEM 115 of the DACIS 103 may be configured to receive the universal resource locators and/or identifiers that reference records for the selected one or more live input streams and/or one or more pre-encoded media assets based on the one or more parameters and additional parameters retrieved from the repository of schedules, rights, and user preferences database 144.

At 408B, the received first manifest request may be transmitted to the CPDS 107 based on the selected one or more live input streams and/or one or more pre-encoded media assets. In an embodiment, the PEM 115 of the DACIS 103 may be configured to transmit the received first manifest request to the CPDS 107 based on the selected one or more live input streams and/or one or more pre-encoded media assets.

In an embodiment, based on the received request, the CPDS 107 may be configured to retrieve indexed metadata, for example, non-programming indicators, such as ad break locations, graphical treatment indicators, such as overlay markers/triggers, programming indictors, such as SCTE35 markers, content duration, and categories (such as, "basketball", "sports", "Knicks") to which the programming content has been assigned.

At 410B, the indexed metadata may be received from the CPDS 107. In an embodiment, the PEM 115 of the DACIS 103 may be configured to receive the indexed metadata from the CPDS 107. Examples of the indexed metadata may include, but are not limited to, non-programming indicators, such as ad break locations, graphical treatment indicators, such as overlay markers/triggers, programming indictors, such as SCTE35 markers and content duration, as described above.

At 412B, one or more content placement opportunities defined by the metadata associated with the one or more live input streams and/or one or more pre-encoded media assets may be identified. In an embodiment, the PEM 115 of the DACIS 103 may be configured to identify the one or more content placement opportunities defined by the metadata associated with the one or more live input streams and/or one or more pre-encoded media assets. Examples of the one or more content placement opportunities may include, but are not limited to, non-programming indicators, such as ad break locations, graphical treatment indicators, such as overlay markers/triggers, programming indictors, such as SCTE35 markers and personalized content opportunity. In an embodiment, for the identified one or more content placement opportunities, the PEM 115 of the DACIS 103 may be configured to determine additional content, such as non-programming content (such as advertisements), personalized programming content (such as promotional content), graphical treatment (such as overlays), and one or more decision point locations.

At 442, a request may be transmitted to the CDS 105 to determine a customized first programming content from the CPDS 107 for matching one or more personalization parameters. In accordance with an embodiment, the PEM 115 of the DACIS 103 may be configured to transmit a request to the CDS 105 to determine the customized first programming content from the CPDS 107 for matching one or more personalization parameters. Examples of the one or more personalization parameters may include, but are not limited to, user preferences and identifiers from the first manifest request or retrieved from the repository of schedules, rights, and user preferences database 144, and time constraints. The time constraints may be determined based on user preferences retrieved from the repository of schedules, rights, and user preferences database 144, a range defined in the first manifest request, and schedule tolerances defined in the repository of schedules, rights, and user preferences database 144, client device preferences or identifiers from the first manifest request or retrieved from the repository of schedules, rights, and user preferences database 144, geo-location information from the first manifest request or retrieved from the repository of schedules, rights, and user preferences database 144, and/or a content recommendation engine.

At 444, the first programming schedule 111 may be generated for the first client device based on the selected one or more live input streams and/or the one or more pre-encoded media assets, the associated indexed metadata, and the determined first additional content. In accordance with an embodiment, the PEM 115 of the DACIS 103 may be configured to generate the first programming schedule 111 for the first client device, such as the client device 132a, based on the selected one or more live input streams and/or the one or more pre-encoded media assets, the associated indexed metadata, and the determined first additional content.

In accordance with an embodiment, the first additional content scheduled to be inserted, may be inserted into, for example, one or more pre-encoded assets in accordance with appropriate markers. The appropriate markers may be defined in the metadata of the one or more pre-encoded assets, and rules and conditions defined in the repository of schedule, rights, and user preferences database 144.

In accordance with an embodiment, the generated first programming schedule 111 may define locations and types of one or more decision points defined by the one or more content placement opportunities in the indexed metadata. Such one or more decision points may be included in the first programming schedule 111. Within the first programming schedule 111, the one or more decision points may define personalized content preferences, skipping of personalized content and moving to default content, and approval or disapproval of the personalized content.

In an exemplary embodiment, the one or more pre-encoded media assets are scheduled and the one or more decision points, defined by the one or more content placement opportunities, are inserted in the first programming schedule 111. In such exemplary embodiment, the first programming schedule 111 may be configured to control the one or more pre-encoded media asset manifests to be published as, for example, the first disparate live media output stream manifest. Further, the first programming schedule 111 may include, for example, segments, markers, the one or more content placement opportunities, up to and including next available decision point. Thereafter, control passes to 426 in flowchart 400B and exemplary operations till 440 may be performed in similar manner as described above.

Figure 4D:
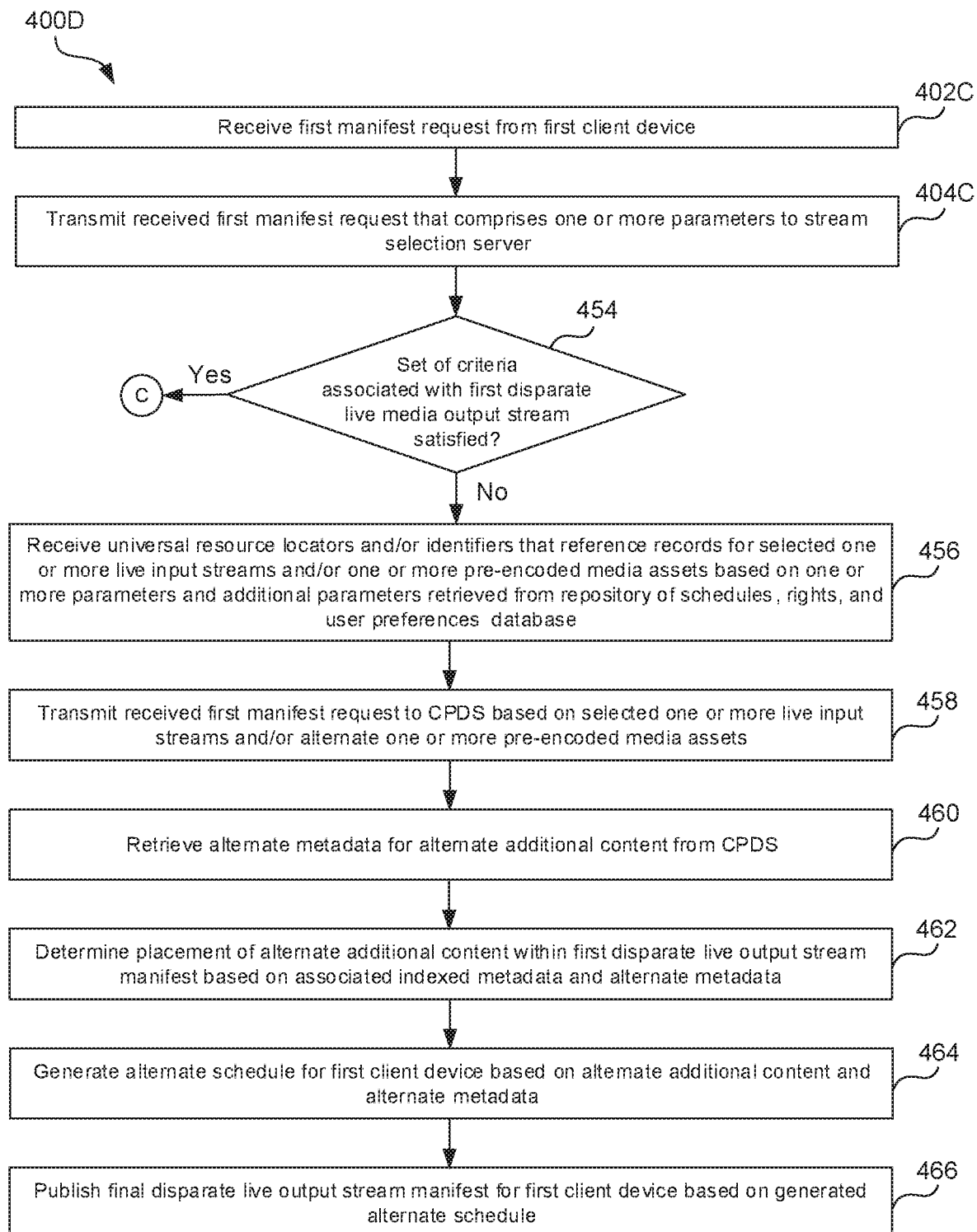

Referring to FIG. 4D, there is illustrated a flowchart 400D depicting a method for stream failover, in accordance with an embodiment of the disclosure.

At 402C, a first manifest request may be received from a first client device. In accordance with an embodiment, the DACIS 103 may be configured to receive the first manifest request from the first client device, such as a client device 132a, to begin or continue playback of a first disparate live media output stream, for example the disparate live media output stream 117a. The first manifest request may comprise one or more parameters. Examples of the one or more parameters may include, but are not limited to, universal resource locators of existing one or more live input streams, identifiers referencing records for existing one or more live input streams or one or more pre-encoded media assets in the CPDS 107, and a plurality of client-specific parameters. Examples of the plurality of client-specific parameters may include, but are not limited to, user preferences and identifiers, client device preferences and identifiers, and one or more rules governed by geolocation data and current position of playback of a first disparate live media output stream, such as the disparate live media output stream 117a, at the first client device, such as the client device 132a.

At 404C, received first manifest request that comprises one or more parameters may be transmitted to the stream selection service 142. In accordance with an embodiment, the PEM 115 of the DACIS 103 may be configured to transmit the received first manifest request that comprises the one or more parameters to the stream selection service 142.

At 454, it may be determined that a set of criteria associated with the first disparate live media output stream is satisfied. In accordance with an embodiment, the stream selection service 142 may be configured to determine if the set of criteria associated with the first disparate live media output stream is satisfied. The set of criteria may include an accessibility of the first disparate live media output stream, update of the first disparate live media output stream and/or compatibility of the first disparate live media output stream having media and/or a manifest with the first manifest request. The stream selection service 142 may be further configured to determine the one or more live input streams and/or one or more pre-encoded media assets based on the one or more parameters in the first manifest request, and additional parameters retrieved from the repository of schedules, rights, and user preferences database 144. The stream selection service 142 may be further configured to determine the one or more live input streams and/or one or more pre-encoded media assets based on rules provided by a stream owner/operator (such as a regional blackout for the first client device leading to an alternative stream to watch) and user preferences (that exclude certain categories) defined in the repository of schedules, rights, and user preferences database 144.

In accordance with an embodiment, when the first disparate live media output stream is not accessible, the first disparate live media output stream is not updated and/or the first disparate live media output stream having media and/or manifest that is not compatible with the first manifest request. Further, in an absence of one or more live input streams, the stream selection service 142 may be configured to select a pre-encoded asset indicated in the first manifest request to continue playback as the first disparate live media output stream. In such embodiment, control passes to operation 456. Otherwise, control passes to operation 406A of the flowchart 400A.

At 456, universal resource locators and/or identifiers that reference records for the selected one or more live input streams or alternate one or more pre-encoded media assets based on the one or more parameters and additional parameters retrieved from the repository of schedules, rights, and user preferences database 144 may be received. In accordance with an embodiment, the PEM 115 of the DACIS 103 may be configured to receive the universal resource locators and/or identifiers that reference records for the selected one or more live input streams or alternate one or more pre-encoded media assets based on the one or more parameters and additional parameters retrieved from the repository of schedules, rights, and user preferences database 144.

At 458, a received first manifest request may be transmitted to the CPDS 107 based on the selected one or more live input streams or alternate one or more pre-encoded media assets. In accordance with an embodiment, the PEM 115 of the DACIS 103 may be configured to transmit the received first manifest request to the CPDS 107 based on the selected one or more live input streams or alternate one or more pre-encoded media assets.

At 460, alternate metadata for alternate additional content may be received from the CPDS 107. In accordance with an embodiment, the PEM 115 of the DACIS 103 may be configured to receive the alternate metadata for the alternate additional content from the CPDS 107. The metadata may include, for example, Ad break locations, overlay markers/triggers, SCTE35 markers/triggers, content duration, and one or more decision points. The alternate metadata may further include a location to transition from the first additional content to the alternate additional content.

At 462, a placement of alternate additional content within the first disparate live media output stream manifest may be determined based on the associated indexed metadata and the alternate metadata. In accordance with an embodiment, the PEM 15 of the DACIS 103 may be configured to determine the placement of the alternate additional content within the first disparate live media output stream manifest based on the associated indexed metadata and the alternate metadata.

At 464, an alternate programming schedule may be generated for the first client device based on the alternate additional content and alternate metadata. In accordance with an embodiment, the PEM 15 of the DACIS 103 may be configured to generate the alternate programming schedule for the first client device, such as the client device 132a, based on the alternate additional content and alternate metadata.

At 466, a final disparate live output stream manifest may be published for the first client device based on the generated alternate programming schedule. In accordance with an embodiment, the PEM 15 of the DACIS 103 may be configured to publish the final disparate live output stream manifest for the first client device, such as the client device 132a, based on the generated alternate programming schedule.

In accordance with an embodiment, the final disparate live output stream manifest for the first client device may be generated based on one of the pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switches between pre-encoded media assets and live streams.

In accordance with an embodiment, during playout, the first additional content may be transitioned to the alternate additional content based on one or more transition parameters. The one or more transition parameters may comprise one or more parameters from the first manifest request, current state of the first disparate live media output stream manifest determined based on accessibility, regular update, and suitable encoding, digital rights management, and compatibility with the first client device, rules provided by a stream owner operator, and user preferences defined in the repository of schedules, rights, and user preferences database 144.

As described above in FIGS. 4A and 4B, the published final disparate live output stream manifest may be transmitted to the media player of the first client device for playback of the final disparate live media output stream. Accordingly, the first client device begins or continues the playback of the final disparate live media output stream.

In an alternate embodiment, at 454, the stream selection service 142 may be configured to select a second disparate live media output stream according to accessibility of the first disparate live media output stream in case the set of criteria associated with the first disparate live media output stream is not satisfied. The stream selection service 142 may be configured to select the second disparate live media output stream according to rules provided by a stream owner/operator and user preferences defined in the repository of schedules, rights, and user preferences database 144. The operations that follow may be performed in a similar manner, as the operations for the first disparate live media output stream are performed.

Figure 5:
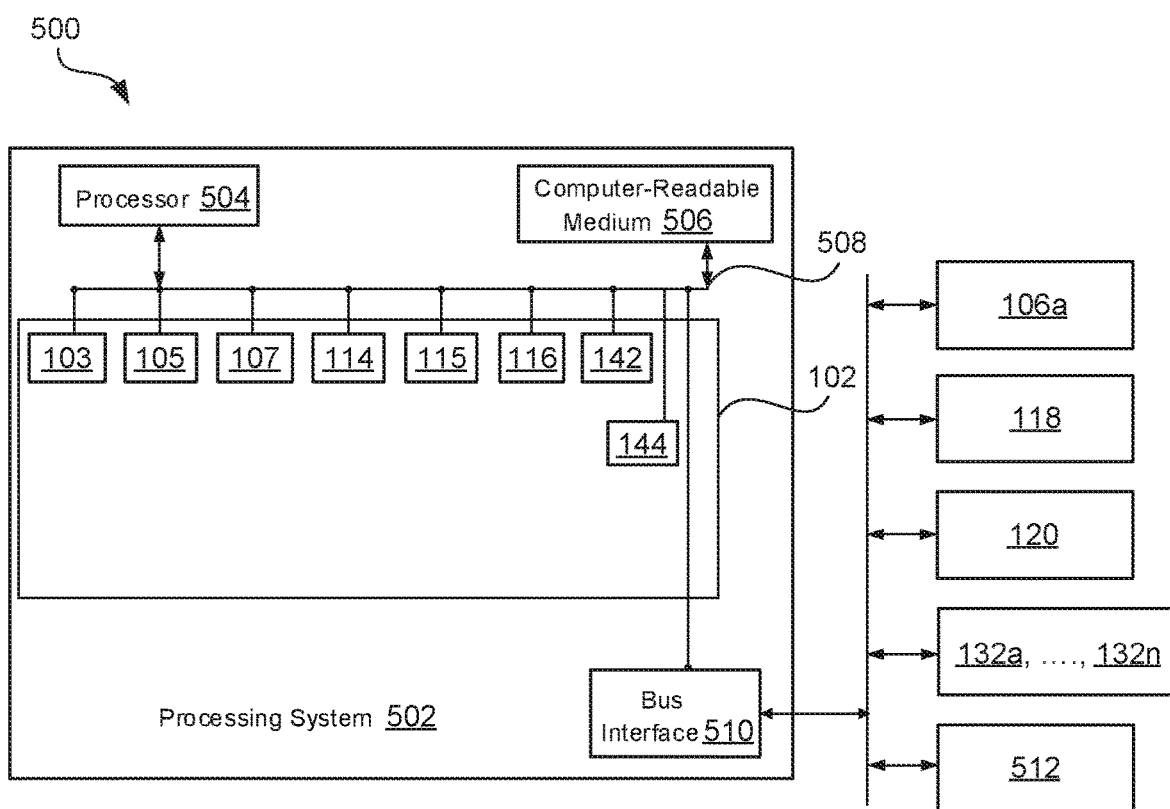
FIG. 5 is a conceptual diagram illustrating an example of a hardware implementation for the DACIS employing a processing system for publishing a disparate per-client live media output stream based on dynamic insertion of targeted non-programming content and customized programming content and for server-side dynamic insertion of programming content in an indexed disparate live media output stream.

FIG. 5 is a conceptual diagram illustrating an example of a hardware implementation for a media packaging and distribution system 102 employing a processing system for publishing a disparate per-client live media output stream based on dynamic insertion of targeted non-programming content and customized programming content, in accordance with exemplary embodiment of the disclosure. Referring to FIG. 5, the hardware implementation shown by a representation 500 for the media packaging and distribution system 102 employs a processing system 502 for publishing a disparate per-client live media output stream based on dynamic insertion of targeted non-programming content and customized programming content, in accordance with exemplary embodiment of the disclosure, as described herein.

In some examples, the processing system 502 may comprise one or more hardware processors 504, a non-transitory computer-readable medium 506, a bus 508, a bus interface 510, and a transceiver 512. FIG. 5 further illustrates the DACIS 103, the CDS 105, the CPDS 107, the stream publishing engine 114, PEM 115, indexing and storage system 116, the stream selection service 142, and the repository of schedules, rights, and user preferences database 144, as described in detail in FIGS. 1A and 1B.

The hardware processor 504 may be configured to manage the bus 508 and general processing, including the execution of a set of instructions stored on the non-transitory computer-readable medium 506. The set of instructions, when executed by the processor 504, causes the media packaging and distribution system 102 to execute the various functions described herein for any particular apparatus. The hardware processor 504 may be implemented, based on a number of processor technologies known in the art. Examples of the hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 506 may be used for storing data that is manipulated by the processor 504 when executing the set of instructions. The data is stored for short periods or in the presence of power. The non-transitory computer-readable medium 506 may also be configured to store data for one or more of the DACIS 103, the CDS 105, the CPDS 107, the stream publishing engine 114, PEM 115, indexing and storage system 116, the stream selection service 142, and the repository of schedules, rights, and user preferences database 144.

The bus 508 is configured to link together various circuits. In this example, the media packaging and distribution system 102 employing the processing system 502 and the non-transitory computer-readable medium 506 may be implemented with bus architecture, represented generally by bus 508. The bus 508 may include any number of interconnecting buses and bridges depending on the specific implementation of the media packaging and distribution system 102 and the overall design constraints. The bus interface 510 may be configured to provide an interface between the bus 508 and other circuits, such as, transceiver 512, and external devices, such as source device 118, external data source 120, and client devices 132a, . . . , 132n.

The transceiver 512 may be configured to provide a communication of the media packaging and distribution system 102 with various other apparatus, such as the Ad decisioning servers 106a, . . . , 106n, the consumer devices 110a, . . . , 110n, such as the client devices 132a, . . . , 132n, the external data source 120, and the source device 118, via the network 108. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments. For example, the DACIS 103, the CDS 105, the CPDS 107, the stream publishing engine 114, PEM 115, indexing and storage system 116, the stream selection service 142, and the repository of schedules, rights, and user preferences database 144 may include software that may be executed across a single or multiple processing environments.

In an aspect of the disclosure, the processor 504, the non-transitory computer-readable medium 506, or a combination of both may be configured or otherwise specially programmed to execute the operations or functionality of the DACIS 103, the CDS 105, the CPDS 107, the stream publishing engine 114, PEM 115, indexing and storage system 116, the stream selection service 142, and the repository of schedules, rights, and user preferences database 144, or various other components described herein, as described with respect to FIGS. 1A to 4D, and FIGS. 6A to 6E.

Figure 5A:
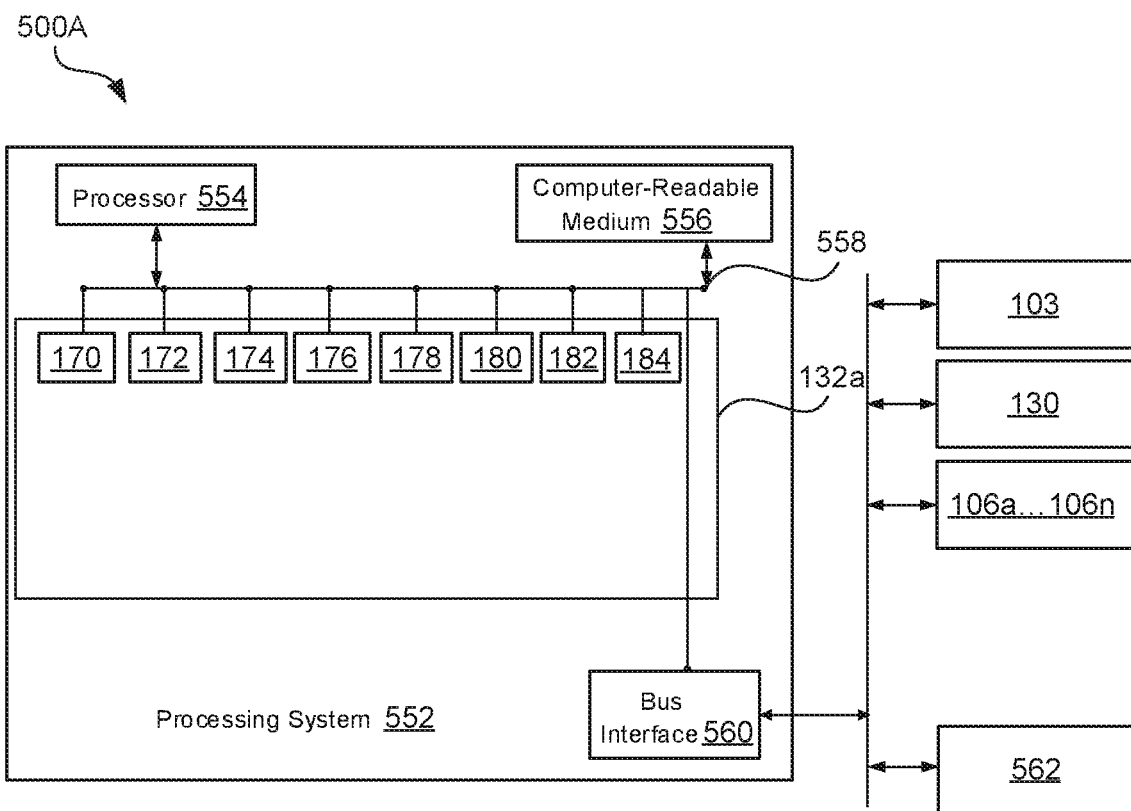
FIG. 5A is a conceptual diagram illustrating an example of a hardware implementation for a first client device employing a processing system for client-side dynamic presentation of programming content in an indexed disparate live media output stream, in accordance with exemplary embodiments of the disclosure.

FIG. 5A is a conceptual diagram illustrating an example of a hardware implementation for a first client device employing a processing system for client-side dynamic presentation of programming content in an indexed disparate live media output stream, in accordance with exemplary embodiments of the disclosure. Referring to FIG. 5A, the hardware implementation shown by a representation 500A for the first client device, such as client device 132a, employs a processing system 552 for client-side dynamic presentation of programming content in an indexed disparate live media output stream, in accordance with exemplary embodiment of the disclosure, as described herein.

In some examples, the processing system 552 may comprise one or more hardware processors 554, a non-transitory computer-readable medium 556, a bus 558, a bus interface 560, and a transceiver 562. FIG. 5A further illustrates the processing unit 170, the I/O unit 172, the client interface 174, the memory unit 176, the ROM 176a, the PROM 176b, the EPROM 176c, the EEPROM 176d, the RAM 176e, the client application 178, the storage devices 180, the network interface 182, and the operating system 184.

The hardware processor 554 may be configured to manage the bus 558 and general processing, including the execution of a set of instructions stored on the non-transitory computer-readable medium 556. The set of instructions, when executed by the one or more hardware processors 554, causes the first client device, such as client device 132a, to execute the various functions described herein for any particular apparatus. The one or more hardware processors 554 may be implemented, based on a number of processor technologies known in the art. Examples of the one or more hardware processors 554 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 556 may be used for storing data that is manipulated by the one or more hardware processors 554 when executing the set of instructions. The data is stored for short periods or in the presence of power. The non-transitory computer-readable medium 556 may also be configured to store data for one or more of the processing unit 170, the I/O unit 172, the client interface 174, the memory unit 176, the ROM 176a, the PROM 176b, the EPROM 176c, the EEPROM 176d, the RAM 176e, the client application 178, the storage devices 180, the network interface 182, and the operating system 184.

The bus 558 may be configured to link together various circuits. In this example, the first client device, such as client device 132a, employing the processing system 552 and the non-transitory computer-readable medium 556 may be implemented with bus architecture, represented generally by bus 558. The bus 558 may include any number of interconnecting buses and bridges depending on the specific implementation of the first client device, such as client device 132a, and the overall design constraints. The bus interface 560 may be configured to provide an interface between the bus 558 and other circuits.

The transceiver 562 may be configured to provide a communication of the first client device, such as client device 132a, with various other apparatus, such as the DACIS 103, the content delivery system 130, and the Ad decisioning servers 106a, . . . , 106n. The transceiver 562 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5A may include software whose corresponding code may be executed by at least one processor, for across multiple processing environments. For example, the processing unit 170, the I/O unit 172, the client interface 174, the memory unit 176, the ROM 176a, the PROM 176b, the EPROM 176c, the EEPROM 176d, the RAM 176e, the client application 178, the storage devices 180, the network interface 182, and the operating system 184 may include software that may be executed across a single or multiple processing environments.

In an aspect of the disclosure, the one or more hardware processors 554, the non-transitory computer-readable medium 556, or a combination of both may be configured or otherwise specially programmed to execute the operations or functionality of the first client device, such as client device 132a, or various other components described herein, as described with respect to FIG. 1C and FIGS. 7A to 7D.

FIGS. 6A to 6E depict flowcharts illustrating exemplary operations for server-side dynamic insertion of programming content in an indexed disparate live media output stream by the DACIS 103 of FIG. 1B, in accordance with exemplary embodiments of the disclosure. FIGS. 6A to 6E are described in conjunction with FIG. 3A. Specifically, flowchart 600A depicts a method for indexing a first disparate live media output stream and presenting the indexed first disparate live media output stream on a first client device, in accordance with an embodiment of the disclosure. Flowchart 600B depicts a method for a first use case when one or more functionalities include a first functionality to restart programming content in the first disparate live media output stream, in accordance with an embodiment of the disclosure. Flowchart 600C depicts a method for a second use case when one or more functionalities include a second functionality to skip to a future scheduled programming content in the first disparate live media output stream, in accordance with an embodiment of the disclosure. Flowchart 600D depicts a method for a third use case when one or more functionalities include a third functionality to time-shift within the programming content in the first disparate live media output stream, in accordance with an embodiment of the disclosure. Flowchart 600E depicts a method for a fourth use case when one or more functionalities include a fourth functionality to resume playback within the programming content in the first disparate live media output stream, in accordance with an embodiment of the disclosure.

Figure 6A:
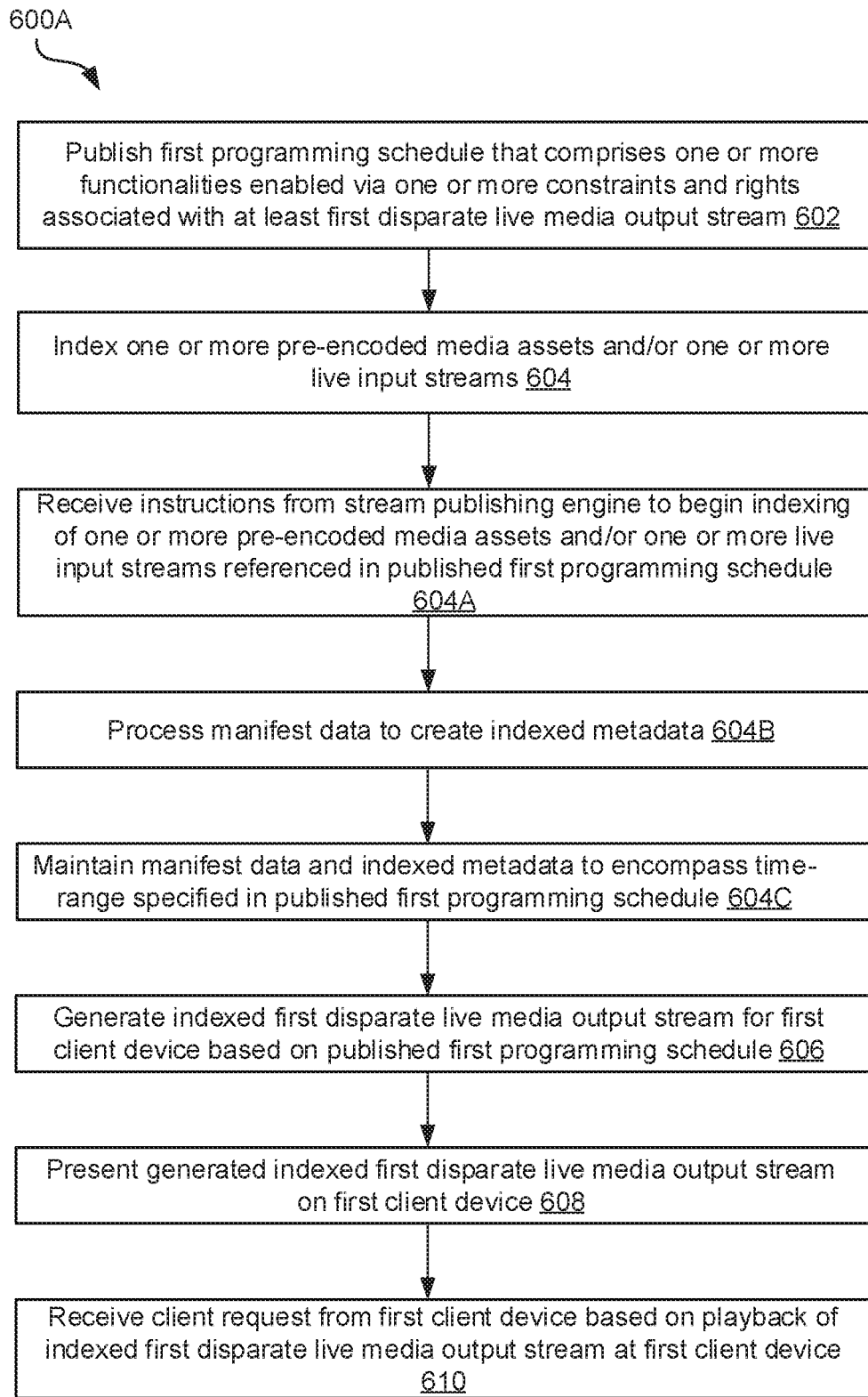
FIGS. 6A to 6E depict flowcharts illustrating exemplary operations for server-side dynamic insertion of programming content in an indexed disparate live media output stream by the DACIS 103 of FIG. 1B, in accordance with exemplary embodiments of the disclosure.
Figure 6B:
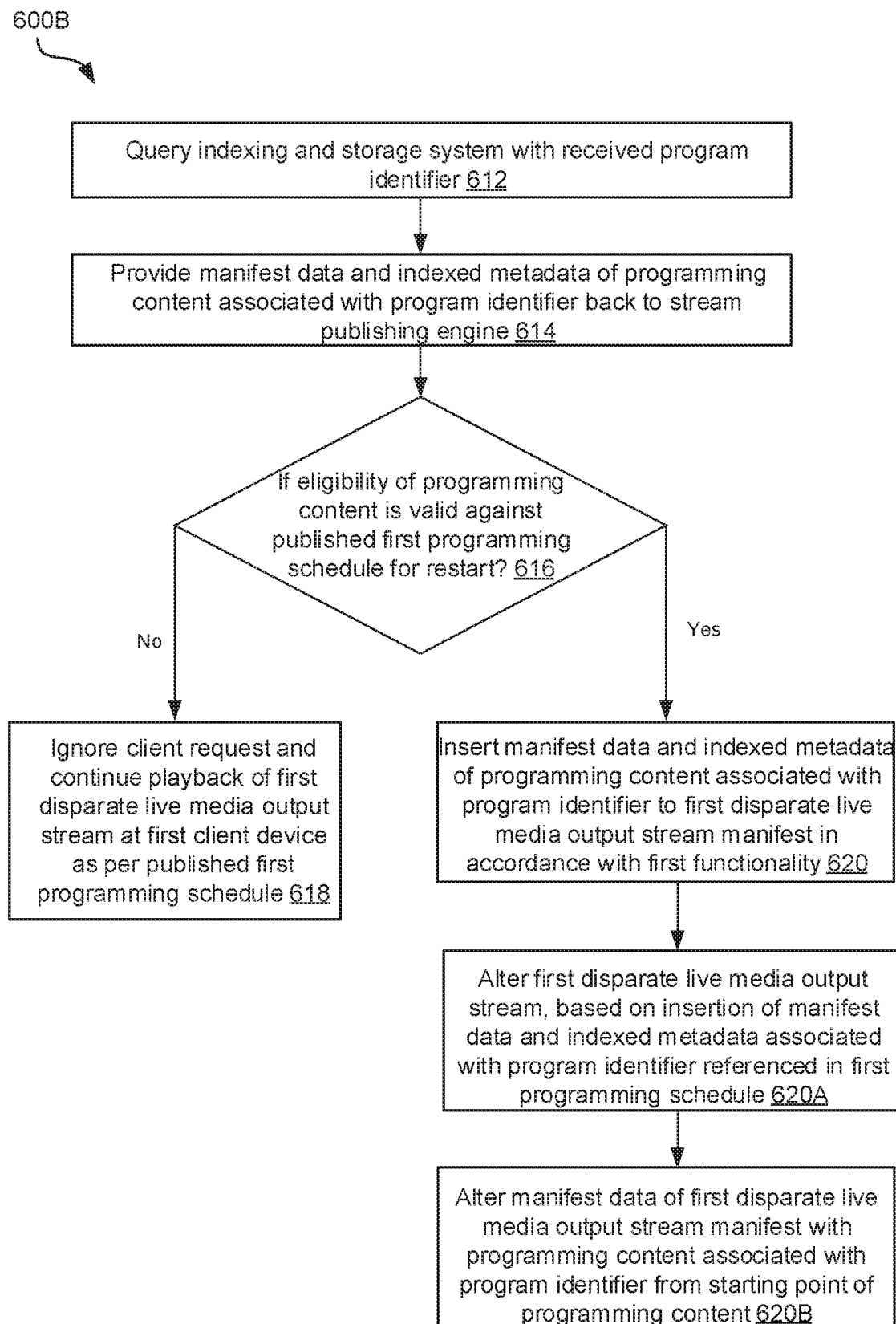
Figure 6C:
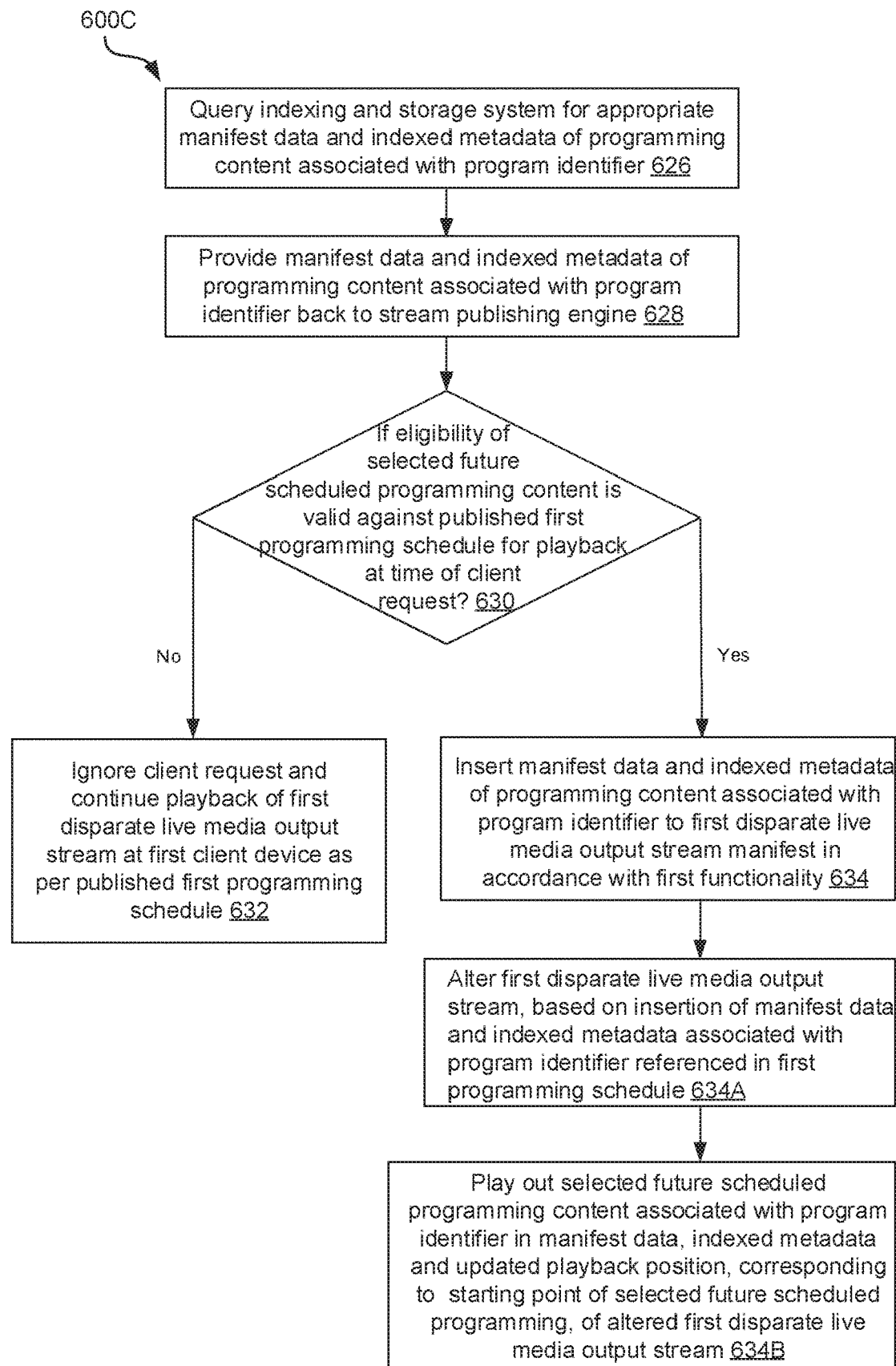
Figure 6D:
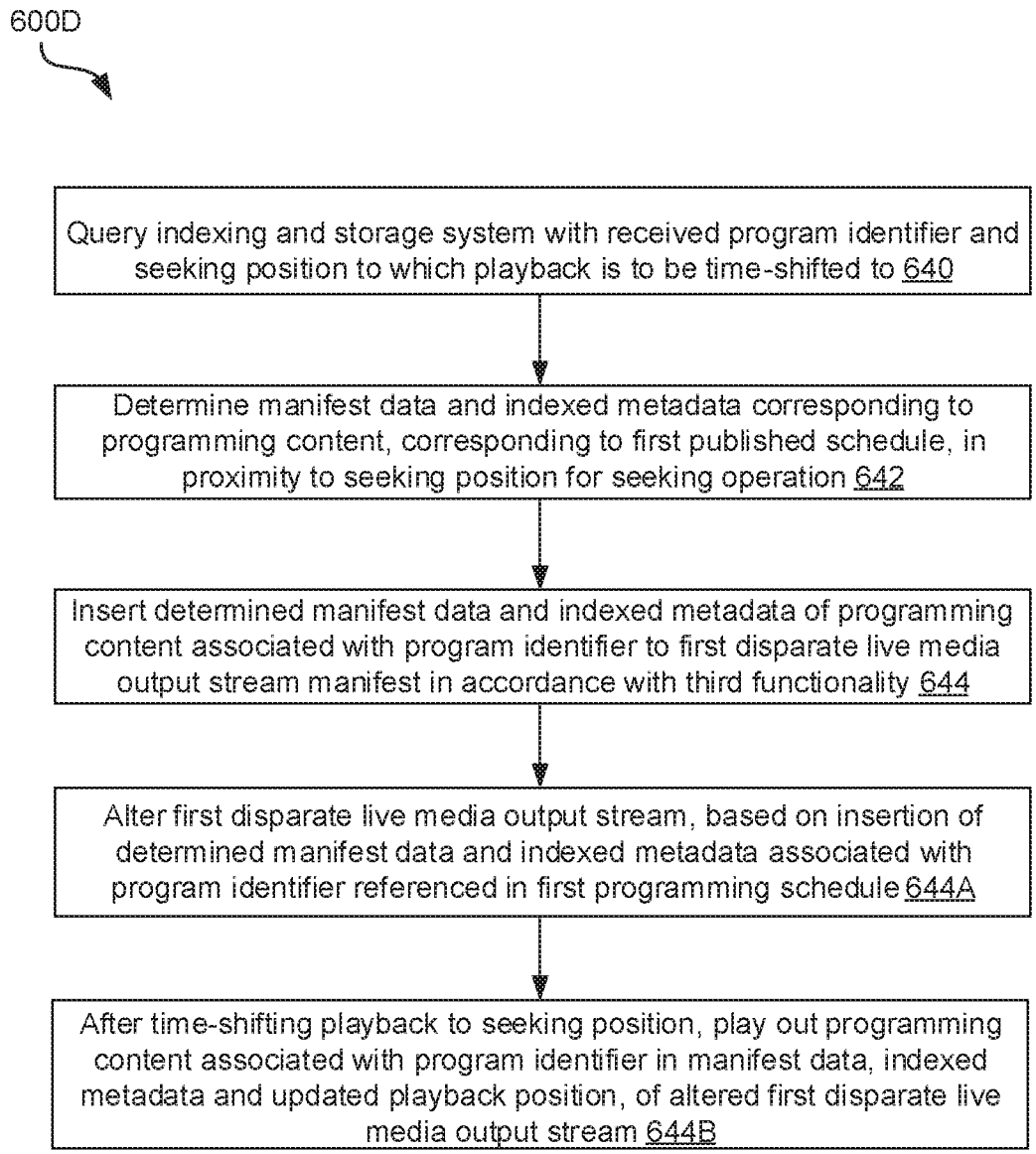
Figure 6E:
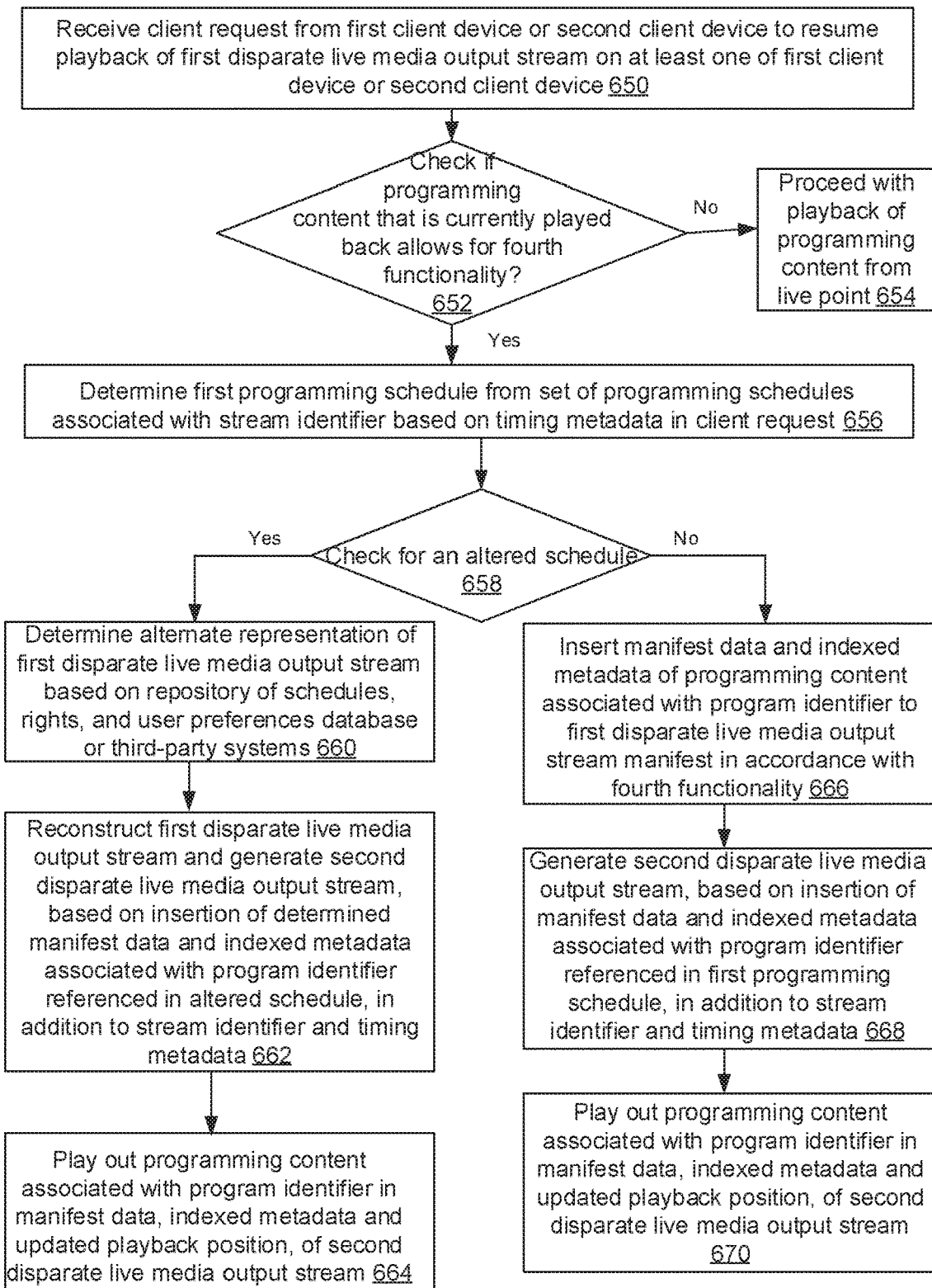

Referring to FIG. 6A, there is illustrated a flowchart 600A depicting a method for indexing a first disparate live media output stream and presenting the indexed first disparate live media output stream on a first client device, in accordance with an embodiment of the disclosure.

At 602, a first programming schedule that comprises one or more functionalities enabled via one or more constraints and rights associated with at least a first disparate live media output stream, may be published. In accordance with an embodiment, the PEM 115 of the DACIS 103 may be configured to publish the first programming schedule 111 that comprises one or more functionalities enabled via one or more constraints and rights associated with at least the first disparate live media output stream.

In accordance with an embodiment, the published first programming schedule 111 may reference one or more pre-encoded media assets and/or one or more live input streams for at least the first disparate live media output stream. Thus, the PEM 115 of the DACIS 103 may publish the first programming schedule 111 referencing at least one live input stream or a pre-encoded asset as a source to be used in at least the first disparate live media output stream. In accordance with an embodiment, the one or more live input streams may comprise pre-encoded media assets. In accordance with another embodiment, the one or more live input streams may comprise singularly encoded live input streams. Various media container formats of the live input streams and/or pre-encoded media assets may include, but are not limited to, transport stream (TS), fragmented MP4 (fMP4), Common Media Application Format (CMAF) and the like.

As discussed above, the first programming schedule 111 may indicate the one or more functionalities enabled via the one or more constraints and rights associated with at least the first disparate live media output stream. In accordance with an embodiment, the one or more functionalities enabled via the one or more constraints and rights may include a first functionality to restart a programming content in the first disparate live media output stream that is presented on at least the first client device, such as the client device 132*a*. In accordance with another embodiment, the one or more functionalities enabled via the one or more constraints and rights may include a second functionality to skip to a future scheduled programming content in the first disparate live media output stream. In accordance with another embodiment, the one or more functionalities enabled via the one or more constraints and rights may include a third functionality to time-shift within the programming content in the first disparate live media output stream. In accordance with another embodiment, the one or more functionalities enabled via the one or more constraints and rights may include and a fourth functionality to resume playback within the programming content in the first disparate live media output stream.

In accordance with an embodiment, the one or more constraints and rights associated with at least the first disparate live media output stream may be retrieved from the repository of schedules, rights, and user preferences database 144. The repository of schedules, rights, and user preferences database 144 may be configured to store the one or more constraints and rights associated with disparate live media output streams that may be derived from one or more of schedules for all source feeds, availability rights for all the content in the schedules, regional blackout zones for the various sports leagues, predefined location-based viewing preferences, individual client viewing preferences, and any viewing rules, transition rules, and business rules provided by or applicable to the stream owner operator.

At 604, the one or more pre-encoded media assets and/or the one or more live input streams referenced in the published first programming schedule 111 may be indexed. In accordance with an embodiment, the indexing and storage system 116 of the DACIS 103 may be configured to index the one or more pre-encoded media assets and/or the one or more live input streams.

At 604A, instructions from the stream publishing engine 114 to begin indexing of the one or more pre-encoded media assets and/or the one or more live input streams referenced in the published first programming schedule 111 may be received. In accordance with an embodiment, the indexing and storage system 116 of the DACIS 103 may be configured to receive instructions from the stream publishing engine 114 to begin indexing of the one or more pre-encoded media assets and/or the one or more live input streams referenced in the published first programming schedule 111. The indexing and storage system 116 of the DACIS 103 may be configured to fetch one or more pre-encoded media assets and/or the one or more live input streams referenced in the published first programming schedule 111 from the CPDS 107. In accordance with an embodiment, the indexing and storage system 116 of the DACIS 103 may be configured to index the one or more live input streams repeatedly at variable time intervals.

In accordance with an embodiment, the indexing and storage system 116 of the DACIS 103 may be further configured to record content of manifest data that may correspond to one or both of the one or more pre-encoded media assets and/or the one or more live input streams, including any variants defined in a master manifest. The manifest data may correspond to one or both of an encoded live input stream and a pre-encoded media asset associated with the program identifier. The manifest data may define at least an associated media content, one or more programming indicators (such as SCTE messages), timing metadata, one or more media content identifiers, and one or more contextual event identifiers. The timing metadata may correspond to the playback position in the published first programming schedule 111.

At 604B, the manifest data may be processed to create the indexed metadata. In accordance with an embodiment, the indexing and storage system 116 of the DACIS 103 may be further configured to process the manifest data to create the indexed metadata. The indexed metadata may define one or more program indicators (such as program start/end) and calculated durations, a program identification (that correspond to a programming content that is currently playing), non-programming content indicators (such as Ad break start/end) and calculated durations, a non-programming content identification (that correspond to Ads that are currently playing), and one or more event markers (such as blackout notifications).

At 604C, the manifest data and the indexed metadata may be maintained to encompass a time-range specified in the published first programming schedule 111. In accordance with an embodiment, the indexing and storage system 116 of the DACIS 103 may be further configured to maintain the manifest data and the indexed metadata to encompass a time-range specified in the published first programming schedule 111. For example, the indexing and storage system 116 may keep 24 hours of indexed metadata despite the live input stream being published in 5 minute increments.

At 606, the indexed first disparate live media output stream for the first client device may be generated based on the published first programming schedule 111. In accordance with an embodiment, the stream publishing engine 114 of the DACIS 103 may be configured to generate the indexed first disparate live media output stream for the first client device, such as the client device 132*a*, based on the published first programming schedule 111. The stream publishing engine 114 may be configured to publish unique-to-client streaming manifests leveraging different indexes created by the indexing and storage system 116 from the various live input streams, pre-encoded media assets, targeted non-programming content and customized programming content based on a defined per-client schedule, such as the published first programming schedule 111. In other words, the stream publishing engine 114 of the DACIS 103 may be configured to generate the indexed first disparate live media output stream for the first client device, such as the client device 132a, based on the indexed one or more pre-encoded media assets and/or one or more live input streams, as the published first programming schedule 111 now references indexed one or more pre-encoded media assets and/or the one or more live input streams.

At 608, the generated indexed first disparate live media output stream for the first client device, such as the client device 132a, may be presented on the first client device, such as the client device 132a. In accordance with an embodiment, the content delivery system 130 of the DACIS 103 may be configured to present the generated indexed first disparate live media output stream on the first client device, such as the client device 132a. The indexed first disparate live media output stream may be provided to the first client device, such as the client device 132a, via, for example, a transport stream, a segmented streaming, a progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

At 610, a client request may be received from the first client device, such as the client device 132a, based on a playback of the indexed first disparate live media output stream at the first client device, such as the client device 132a. In accordance with an embodiment, the stream publishing engine 114 in the DACIS 103 may be configured to receive the client request from the first client device, such as the client device 132a, based on the playback of the indexed first disparate live media output stream at the first client device, such as the client device 132a.

The client request may comprise at least the program identifier referenced in the published first programming schedule 111 with respect to the playback position in the published first programming schedule 111. In accordance with an embodiment, the playback position may be an indicator of a current play position within a media item of the first disparate live media output stream. For example, the playback position may be a displayed icon at the first client device, such as the client device 132a, or a line that indicates a relative position of playback within some other indicia (for example, a displayed bar) of the total play time of the media item.

In accordance with an embodiment, the program identifier may be specified within the first disparate live media output stream manifest that corresponds to the first disparate live media output stream for a specific programming content, for example a programming content that is currently or recently played back. Such programming content may include one or more media segments corresponding to at least an encoded live input stream and a pre-encoded media asset within a playout buffer of the first disparate live media output stream manifest. The programming identifier may be associated with a programming content that may be selected based on a user input provided at the first client device, such as the client device 132a. Examples of the user input may include, but not limited to, a selection of the programming content from a list of programming content or a selection of a restart or resume option to initiate corresponding operation at the DACIS 103 operation.

The client request may be generated by the first client device, such as the client device 132a, based on the user input while the first disparate live media output stream (returned from the DACIS 103) is played back at the first client device, such as the client device 132a. Based on the user input, the first client device, such as the client device 132a, may instruct the DACIS 103 to perform an operation, such as restart, skip, time-shift, or resume, in accordance with one or more functionalities enabled via the one or more constraints and rights associated with at least the first disparate live media output stream. In accordance with various embodiments, the one or more functionalities may include the first functionality to restart a programming content in the first disparate live media output stream that is presented on at least the first client device, such as the client device 132a, the second functionality to skip to a future scheduled programming content in the first disparate live media output stream, the third functionality to time-shift within the programming content in the first disparate live media output stream, and the fourth functionality to resume playback within the programming content in the first disparate live media output stream.

In accordance with an embodiment, when the one or more functionalities correspond to the first functionality to restart the programming content in the first disparate live media output stream, control passes to step 612 in the flowchart 600B. In such an embodiment, at least the first client device, such as the client device 132a, may be configured to determine the program identifier of a programming content that is currently or recently played back in the first disparate live media output stream. The program identifier of the programming content may be determined based on a request for a list of programming content, via for example an electronic program guide, associated with the first disparate live media output stream from the repository of schedules, rights, and user preferences database 144. The list of programming content may comprise additional metadata that may control the first functionality of a current programming content and each of past programming content as enabled via the one or more constraints and rights in the published first programming schedule 111.

In accordance with another embodiment, the program identifier of the programming content may be specified within the first disparate live media output stream manifest. The first disparate live media output stream manifest corresponds to the first disparate live media output stream for the programming content that is currently or recently played back and still within the live window of the published first disparate live media output stream manifest, as shown in FIG. 3A.

As the first client device, such as the client device 132a, plays the first disparate live media output stream returned from the DACIS 103, the user input may be provided to restart the programming content that is currently or recently played back in the first disparate live media output stream, in accordance with the first functionality defined in the published first programming schedule 111.

Based on the user input, the stream publishing engine 114 in the DACIS 103 may be configured to receive the client request from the first client device, such as the client device 132a. The client request thus received, includes the program identifier for the programming content (that is currently or recently played back in the first disparate live media output stream in accordance with the first functionality defined in the published first programming schedule 111) to be restarted.

At 612, the indexing and storage system 116 may be queried with the received program identifier. In accordance with an embodiment, the stream publishing engine 114 in the DACIS 103 may be configured to query the indexing and storage system 116 with the received program identifier. The stream publishing engine 114 in the DACIS 103 may query the indexing and storage system 116 for an appropriate manifest data and indexed metadata of the programming content associated with the program identifier.

At 614, manifest data and indexed metadata of the programming content associated with the program identifier may be provided back to the stream publishing engine 114. In accordance with an embodiment, the indexing and storage system 116 in the DACIS 103 may be configured to provide the manifest data and indexed metadata of the programming content associated with the program identifier back to the stream publishing engine 114. As discussed above, the manifest data may define at least an associated media content, one or more programming indicators (such as SCTE messages), timing metadata, one or more media content identifiers, and one or more contextual event identifiers. The timing metadata may correspond to the playback position in the published first programming schedule 111.

At 616, it may be determined whether the eligibility of the programming content is valid against the published first programming schedule 111 for the restart. In accordance with an embodiment, the stream publishing engine 114 in the DACIS 103 may be further configured to validate against the published first programming schedule 111 that the programming content is eligible for a restart. In accordance with an embodiment, the eligibility of the programming content is determined to be invalid against the published first programming schedule 111 for the restart, and the control passes to 620. In accordance with another embodiment, the eligibility of the programming content is determined to be valid against the published first programming schedule 111 for the restart, and the control passes to 622.

At 618, the client request may be ignored and playback of the first disparate live media output stream is continued at the first client device, such as the client device 132*a*, as per the published first programming schedule 111, when the eligibility of the programming content is determined to be invalid against the published first programming schedule 111 for the restart. In accordance with an embodiment, the stream publishing engine 114 in the DACIS 103 may be configured to ignore the client request and the playback of the first disparate live media output stream is continued at the first client device, such as the client device 132*a*, as per the published first programming schedule 111, when the eligibility of the programming content is determined to be invalid against the published first programming schedule 111 for the restart.

At 620, the manifest data and indexed metadata of the programming content associated with the program identifier may be inserted to the first disparate live media output stream manifest in accordance with the first functionality, when the programming content is eligible for the restart. In accordance with an embodiment, the stream publishing engine 114 in the DACIS 103 may be configured to insert the manifest data and indexed metadata of the programming content associated with the program identifier to the first disparate live media output stream manifest in accordance with the first functionality, when the programming content is eligible for the restart.

At 620A, the first disparate live media output stream may be altered based on the insertion of the manifest data and indexed metadata associated with the program identifier referenced in the first programming schedule 111. In accordance with an embodiment, the stream publishing engine 114 in the DACIS 103 may be configured to alter the first disparate live media output stream, based on the insertion of the manifest data and indexed metadata associated with the program identifier referenced in the first programming schedule 111. Such an altered first disparate live media output stream may comprise the manifest data, the indexed metadata and an updated playback position.

In accordance with various embodiments, the first disparate live media output stream for the first client device, such as the client device 132*a*, may be altered based on the insertion of the manifest data and indexed metadata in accordance with one of pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams.

At 620B, the manifest data of the first disparate live media output stream manifest may be altered with the programming content associated with the program identifier from a starting point of the programming content when the programming content is eligible for the restart. In accordance with an embodiment, the stream publishing engine 114 in the DACIS 103 may be configured to alter the manifest data of the first disparate live media output stream manifest with the programming content associated with the program identifier from a starting point of the programming content when the programming content is eligible for the restart. Thus, the stream publishing engine 114 may alter the first disparate live media output stream to start playing out the programming content, as specified by the program identifier from the starting point.

Referring back to step 610, in accordance with another embodiment, when the one or more functionalities correspond to the second functionality to skip to a future scheduled programming content in the first disparate live media output stream, control passes to step 626 in the flowchart 600D. In such an embodiment, the second functionality is allowed for a first set of pre-encoded media content or the live input stream that comprises a second set of pre-encoded media content. The program identifier of the programming content may be determined based on a request for a list of programming content, via for example an electronic program guide, associated with the first disparate live media output stream from the repository of schedules, rights, and user preferences database 144. The list of programming content may comprise additional metadata that may control the second functionality of the future scheduled programming content as enabled via the one or more constraints and rights in the published first programming schedule 111.

As the first client device, such as the client device 132*a*, plays the first disparate live media output stream returned from the DACIS 103, the user input may be provided to select a future scheduled programming content from the list of programming content (that corresponds to upcoming programming content), in accordance with the second functionality defined in the published first programming schedule 111. In such an embodiment, at least the first client device, such as the client device 132*a*, may be configured to determine the program identifier based on selection of the future scheduled programming content from the list of programming content associated with the first disparate live media output stream from the repository of schedules, rights, and user preferences database 144. Thus, the program identifier referenced in the published first programming schedule 111 corresponds to the selected future scheduled programming content that is scheduled to be played out during a future timestamp after a live point in a playback buffer of the first disparate live media output stream.

Based on the user input, the stream publishing engine 114 in the DACIS 103 may be configured to receive the client request from the first client device, such as the client device 132*a*, to start the selected future scheduled programming content, in accordance with the second functionality defined in the published first programming schedule 111. The client request thus received, includes the program identifier for the future scheduled programming content to be skipped to and get started with.

At 626, the indexing and storage system 116 may be queried with the received program identifier. In accordance with an embodiment, the stream publishing engine 114 in the DACIS 103 may be configured to query the indexing and storage system 116 with the received program identifier. The stream publishing engine 114 in the DACIS 103 may query the indexing and storage system 116 for an appropriate manifest data and indexed metadata of the programming content associated with the program identifier.

At 628, manifest data and indexed metadata of the programming content associated with the program identifier may be provided back to the stream publishing engine 114. In accordance with an embodiment, the indexing and storage system 116 in the DACIS 103 may be configured to provide the manifest data and indexed metadata of the programming content associated with the program identifier back to the stream publishing engine 114. As discussed above, the manifest data may define at least an associated media content, one or more programming indicators (such as SCTE messages), timing metadata, one or more media content identifiers, and one or more contextual event identifiers. The timing metadata may correspond to the playback position in the published first programming schedule 111.

At 630, it may be determined whether the eligibility of the selected future scheduled programming content is valid against the published first programming schedule 111 for the playback at the time of the client request. In accordance with an embodiment, the stream publishing engine 114 in the DACIS 103 may be further configured to validate against the published first programming schedule 111 that the selected future scheduled programming content is eligible for a playback at a time of the client request. In accordance with an embodiment, the eligibility of the selected future scheduled programming content is determined to be invalid against the published first programming schedule 111 for the playback at the time of the client request, and the control passes to 634. In accordance with another embodiment, the eligibility of the selected future scheduled programming content is determined to be valid against the published first programming schedule 111 for the playback at the time of the client request, and the control passes to 636.

At 632, the client request may be ignored and playback of the first disparate live media output stream is continued at the first client device, such as the client device 132*a*, as per the published first programming schedule 111, when the eligibility of the selected future scheduled programming content is determined to be invalid against the published first programming schedule 111 for the playback at the time of the client request. In accordance with an embodiment, the stream publishing engine 114 in the DACIS 103 may be configured to ignore the client request and the playback of the first disparate live media output stream is continued at the first client device, such as the client device 132*a*, as per the published first programming schedule 111, when the eligibility of the selected future scheduled programming content is determined to be invalid against the published first programming schedule 111 for the playback at the time of the client request.

At 634, the manifest data and indexed metadata of the programming content associated with the program identifier may be inserted to the first disparate live media output stream manifest in accordance with the second functionality, when the future scheduled programming content is eligible for the playback at the time of the client request. In accordance with an embodiment, the stream publishing engine 114 in the DACIS 103 may be configured to insert the manifest data and indexed metadata of the programming content associated with the program identifier to the first disparate live media output stream manifest in accordance with the second functionality, when the future scheduled programming content is eligible for the playback at the time of the client request.

At 634A, the first disparate live media output stream may be altered based on the insertion of the manifest data and indexed metadata associated with the program identifier referenced in the first programming schedule 111. In accordance with an embodiment, the stream publishing engine 114 in the DACIS 103 may be configured to alter the first disparate live media output stream, based on the insertion of the manifest data and indexed metadata associated with the program identifier referenced in the first programming schedule 111. Such an altered first disparate live media output stream may comprise the manifest data, the indexed metadata and an updated playback position.

In accordance with various embodiments, the first disparate live media output stream for the first client device, such as the client device 132*a*, may be altered based on the insertion of the manifest data and indexed metadata in accordance with one of pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams.

At 634B, the selected future scheduled programming content associated with the program identifier in the manifest data, the indexed metadata and the updated playback position, corresponding to a starting point of the selected future scheduled programming, of the altered first disparate live media output stream may be played out. In accordance with an embodiment, the stream publishing engine 114 in the DACIS 103 may be configured to play out the selected future scheduled programming content associated with the program identifier in the manifest data, the indexed metadata and the updated playback position, corresponding to a starting point of the selected future scheduled programming, of the altered first disparate live media output stream. Thus, the stream publishing engine 114 may alter the first disparate live media output stream to start playing out the programming content, as specified by the program identifier from the starting point.

Referring back to step 610, in accordance with another embodiment, when the one or more functionalities include the third functionality to time-shift within the programming content in the first disparate live media output stream, control passes to step 640 in the flowchart 600D. In such an embodiment, the first disparate live media output stream manifest associated with the first disparate live media output stream presented at the client interface of the first client device, such as the client device 132a, comprises timing metadata. The timing metadata may comprise embedded time-based identifiers corresponding to media segments in the first disparate live media output stream. An example of such time-based identifier may be the one that is defined in HLS by EXT-X-PROGRAM-DATE-TIME tag. However, this example should not be interpreted as causing a departure from the spirit of the present disclosure, and other time-based identifiers may also be incorporated in accordance with incorporation of corresponding streaming protocols.

The program identifier of the programming content may be determined based on a request for a list of programming content, via for example an electronic program guide, associated with the first disparate live media output stream from the repository of schedules, rights, and user preferences database 144. The list of programming content may comprise additional metadata that may control the third functionality which corresponds to each programming content as enabled via the one or more constraints and rights in the published first programming schedule 111.

In accordance with an embodiment, the client interface may be presented at the first client device, such as the client device 132a, in accordance with the third functionality. Accordingly, in accordance with an embodiment, a seeking option within the programming content in the first disparate live media output stream may be enabled at the client interface of at least the first client device, such as the client device 132a. The seeking option may be enabled in accordance with a default playback buffer of at least the first client device, such as the client device 132a, when the programming content that is currently played back does not allow for the third functionality. In other words, if the currently playing programming content does not allow for the third functionality, the client interface may enable seeking within the programming according to the default playback buffer. In accordance with another embodiment, a seeking option within each programming content in the first disparate live media output stream may be enabled at the client interface of at least the first client device, such as the client device 132a, when the programming content that is currently played back allows for the third functionality. In accordance with an embodiment, the seeking option, such as a seeking operation forwards in time, is enabled within each programming content. The seeking operation forwards in time may be enabled up to a latest published media segment within the first disparate live media output stream manifest. In other words, if the currently playing programming content allows for the third functionality, seeking may be allowed throughout the entirety of the programming content that has been published up to the current live edge by referencing indexed segments that preceded the current playback buffer. In accordance with another embodiment, the seeking option, such as a seeking operation backwards in time, is enabled within each programming content. The seeking operation backwards in time continues into a prior programming content when the seeking operation backwards in time reaches a starting point of the programming content that is currently played back and the third functionality of the prior programming content is enabled. In other words, if the seeking operation backwards in time reaches the beginning of a specific programming content, and the prior programming content before the specific programming content also has time-shifting capability enabled, the seeking operation may continue into the prior programming content. Thus, the seeking operation may continue until a programming content has been reached that does not allow time-shifting or no more programming content is available to seek back to.

As the first client device, such as the client device 132a, plays the first disparate live media output stream returned from the DACIS 103, the user input may be provided to select one of the above seeking options, such as the seeking operation forwards in time or the seeking operation backwards in time, in accordance with the third functionality defined in the published first programming schedule 111.

Based on the user input, the stream publishing engine 114 in the DACIS 103 may be configured to receive the client request from the first client device, such as the client device 132a, to time-shift within the programming content in the first disparate live media output stream, in accordance with the third functionality. The client request thus received, includes the program identifier for the programming content (within which the time-shift is to be performed) and a seeking position to which playback is to be time-shifted to.

In accordance with an embodiment, the seeking position may comprise the time-based identifier which may correspond to the embedded time-based identifier, for example, as defined in HLS by the EXT-X-PROGRAM-DATE-TIME tag, within the first disparate live media output stream. In accordance with another embodiment, the seeking position may be calculated based on the embedded time-based identifier associated with a current position of a playhead and a desired duration to seek backwards or forwards in time. For example, the current position of the play head is 07:30 and the desired duration to seek backwards in time is 00.30. Accordingly, the seeking position may be calculated to be 07:00. In another example, the current position of the play head is 07:30 and the desired duration to seek forwards in time is 00.45. Accordingly the seeking position may be calculated to be 07:45. In an embodiment, the seeking position may be calculated at the server-side, i.e. the DACIS 103. In another embodiment, the seeking position may be calculated at the client-side, i.e. the first client device.

At 640, the indexing and storage system 116 may be queried with the received program identifier and the seeking position to which playback is to be time-shifted to. In accordance with an embodiment, the stream publishing engine 114 in the DACIS 103 may be configured to query the indexing and storage system 116 with the received program identifier and the seeking position to which playback is to be time-shifted to. The stream publishing engine 114 in the DACIS 103 may query the indexing and storage system 116 for an appropriate manifest data and indexed metadata of the programming content associated with the program identifier in proximity to the seeking position.

At 642, manifest data and indexed metadata corresponding to the programming content, corresponding to the first programming schedule 111, in proximity to the seeking position for the seeking operation may be determined. In accordance with an embodiment, the indexing and storage system 116 in the DACIS 103 may be configured to determine the manifest data and indexed metadata corresponding to the programming content, corresponding to the first programming schedule 111, in proximity to the seeking position for the seeking operation.

At 644, the determined manifest data and indexed metadata of the programming content associated with the program identifier may be inserted to the first disparate live media output stream manifest in accordance with the third functionality. In accordance with an embodiment, the stream publishing engine 114 in the DACIS 103 may be configured to insert the determined manifest data and indexed metadata of the programming content associated with the program identifier to the first disparate live media output stream manifest in accordance with the third functionality.

At 644A, the first disparate live media output stream may be altered based on the insertion of the determined manifest data and indexed metadata associated with the program identifier referenced in the first programming schedule 111. In accordance with an embodiment, the stream publishing engine 114 in the DACIS 103 may be configured to alter the first disparate live media output stream, based on the insertion of the determined manifest data and indexed metadata associated with the program identifier referenced in the first programming schedule 111. Such an altered first disparate live media output stream may comprise the manifest data, the indexed metadata and an updated playback position.

In accordance with various embodiments, the first disparate live media output stream for the first client device, such as the client device 132a, may be altered based on the insertion of the manifest data and indexed metadata in accordance with one of pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams.

At 644B, the programming content associated with the program identifier in the manifest data, the indexed metadata and the updated playback position, of the altered first disparate live media output stream may be played out after time-shifting the playback to the seeking position. In accordance with an embodiment, after time-shifting the playback to the seeking position, the stream publishing engine 114 in the DACIS 103 may be configured to play out the programming content associated with the program identifier in the manifest data, the indexed metadata and the updated playback position, of the altered first disparate live media output stream. The altered first disparate live media output stream may be viewed at the first client device, such as the client device 132a.

Referring back to step 610, in accordance with another embodiment, when the one or more functionalities include the fourth functionality to resume playback within the programming content in the first disparate live media output stream, control passes to step 650 in the flowchart 600E. In such an embodiment, the first disparate live media output stream manifest associated with the first disparate live media output stream comprises timing metadata. The timing metadata may comprise embedded time-based identifiers corresponding to media segments in the first disparate live media output stream. An example of such time-based identifier may be the one that is defined in HLS by EXT-X-PROGRAM-DATE-TIME tag. However, this example should not be interpreted as causing a departure from the spirit of the present disclosure, and other time-based identifiers may also be incorporated in accordance with incorporation of corresponding streaming protocols.

In accordance with an embodiment, the client interface may be presented at the first client device, such as the client device 132a, in accordance with the fourth functionality which corresponds to each programming content as enabled via the one or more constraints and rights. The first client device, such as the client device 132a, may proceed to playback the first disparate live media output stream. As the playback occurs, the first client device, such as the client device 132a, remains updated about the current playback time as provided by the embedded time-based identifiers in the timing metadata corresponding to media segments in the first disparate live media output stream.

As the first disparate live media output stream is played back at the first client device, such as the client device 132a, a user input may be provided, which may correspond to a pause operation or a termination operation of the playback of the first disparate live media output stream at the first client device, such as the client device 132a.

Based on the pause operation or a termination operation, a stream identifier of the first disparate live media output stream, the program identifier of the programming content that is currently playing back, and the timing metadata within the first disparate live media output stream may be captured by at least the first client device, such as the client device 132a. In accordance with various embodiments, the first client device, such as the client device 132a may be configured to store the captured stream identifier, the program identifier, and the timing metadata in one or more of at least the first client device, such as the client device 132a, associated with a user identifier, a server associated with the user identifier, or the repository of schedules, rights, and user preferences database 144. The stream identifier, the program identifier, and the timing metadata, thus stored, may correspond to a bookmark identifier that may define a state of the first disparate live media output stream. In accordance with an embodiment, the user identifier may correspond to a user associated with at least the first client device, such as the client device 132a.

At 650, a client request may be received from the first client device, such as the client device 132a, or the second client device, such as the client device 132b, to resume playback of the first disparate live media output stream on at least one of the first client device, such as the client device 132a, or the second client device, such as the client device 132b. In accordance with an embodiment, the stream publishing engine 114 in the DACIS 103 may be configured to receive the client request from the first client device, such as the client device 132a, or the second client device, such as the client device 132b, to resume playback of the first disparate live media output stream on at least one of the first client device, such as the client device 132a, or the second client device, such as the client device 132b. The received client request may correspond to a user selection to resume playback of the first disparate live media output stream on at least one of the first client device, such as the client device 132a, or a second client device, such as the client device 132b. In such an embodiment, the user identifier of the first client device, such as the client device 132a, may be further associated with the second client device, such as the client device 132b. In such embodiment, the client request may comprise the stream identifier of the first disparate live media output stream, the program identifier of the programming content that is currently playing back, and the timing metadata within the first disparate live media output stream.

At 652, it may be checked if programming content that is currently played back allows for fourth functionality. In accordance with an embodiment, the stream publishing engine 114 in the DACIS 103 may be configured to check if the programming content that is currently played back allows for fourth functionality. In an embodiment, when the programming content that is currently played back does not allow for the fourth functionality, control passes to 654. In another embodiment, when the programming content that is currently played back allows for the fourth functionality, control passes to 656.

At 654, playout of the programming content may be proceeded from live point. In accordance with an embodiment, the stream publishing engine 114 in the DACIS 103 may be configured to proceed with the playout of the programming content from live point.

At 656, the first programming schedule 111 may be determined from a set of programming schedules associated with the stream identifier based on the timing metadata in the client request. In accordance with an embodiment, the stream publishing engine 114 in the DACIS 103 may be configured to determine the first programming schedule 111 from the set of programming schedules associated with the stream identifier from the indexing and storage system 116 based on the timing metadata in the client request. In other words, the stream publishing engine 114 may look up prior programming schedules that are associated with the stream identifier and scheduled during the timing metadata from the indexing and storage system 116.

At 658, an altered schedule may be checked. In accordance with an embodiment, the stream publishing engine 114 in the DACIS 103 may be configured to check for an altered schedule. In an embodiment, for an altered schedule, control passes to 660. In another embodiment, for the same schedule, that is the first programming schedule 111, control passes to 668.

At 660, an alternate representation of the first disparate live media output stream may be determined based on the repository of schedules, rights, and user preferences database 144 or third-party systems. In accordance with an embodiment, the stream publishing engine 114 in the DACIS 103 may be configured to determine an alternate representation of the first disparate live media output stream based on the repository of schedules, rights, and user preferences database 144 or third-party systems. In accordance with an embodiment, the determined alternate representation of the first disparate live media output stream may be optimized for another client device, i.e. at least the second client device, such as the client device 132b, when the client request is generated at the first client device, such as the client device 132a. For example, in case the first disparate live media output stream is paused at the client device 132a, such as a tablet, and the playback is requested to be resumed on the client device 132b, such as a mobile client, the stream publishing engine 114 may elect to generate an altered schedule to reconstruct the first disparate live media output stream optimized for mobile playback. In accordance with another embodiment, the determined alternate representation of the first disparate live media output stream may comprise non-programming content targeted for one or more users associated with one or both of the first client device, such as the client device 132a, and the second client device, such as the client device 132b. For example, in case the first disparate live media output stream is paused at the client device 132a, such as a mobile client, and the playback is requested to be resumed on the client device 132b, such as a television screen, known to be used by multiple users, the stream publishing engine 114 may elect to generate an altered schedule to reconstruct the first disparate live media output stream for the client device 132b known to be used by multiple users. Accordingly, additional advertising or promotional content may be included and targeted for the multiple users associated with the client device 132b.

At 662, the first disparate live media output stream may be reconstructed and a second disparate live media output stream may be generated based on an insertion of manifest data and indexed metadata of the programming content associated with the program identifier referenced in altered schedule, in addition to stream identifier and timing metadata. In accordance with an embodiment, the stream publishing engine 114 in the DACIS 103 may be configured to reconstruct the first disparate live media output stream and generate a second disparate live media output stream based on the insertion of the manifest data and indexed metadata of the programming content associated with the program identifier referenced in altered schedule, in addition to stream identifier and timing metadata.

At 664, programming content associated with the program identifier in the manifest data, indexed metadata and updated playback position, of the second disparate live media output stream may be played out. In accordance with an embodiment, the stream publishing engine 114 in the DACIS 103 may be configured to play out the programming content associated with the program identifier in the manifest data, indexed metadata and updated playback position, of the second disparate live media output stream. The generated second disparate live media output stream may be viewed at one or both of the first client device, such as the client device 132a, and the second client device, such as the client device 132b, in response to the generated client request.

At 666, for an unaltered schedule, the manifest data and the indexed metadata of the programming content associated with the program identifier may be inserted to the first disparate live media output stream manifest in accordance with the fourth functionality. In accordance with an embodiment, the stream publishing engine 114 in the DACIS 103 may be configured to insert the manifest data and the indexed metadata of the programming content associated with the program identifier to the first disparate live media output stream manifest in accordance with the fourth functionality.

At 668, a second disparate live media output stream may be generated, based on the insertion of the manifest data and indexed metadata associated with the program identifier referenced in the first programming schedule 111, in addition to the stream identifier and the timing metadata. In accordance with an embodiment, the stream publishing engine 114 in the DACIS 103 may be configured to generate the second disparate live media output stream, based on the insertion of the manifest data and indexed metadata associated with the program identifier referenced in the first programming schedule 111, in addition to the stream identifier and the timing metadata. Such a generated second disparate live media output stream may comprise the manifest data, the indexed metadata, and the updated playback position for resuming at one or both of the first client device, such as the client device 132a, and the second client device, such as client device 132b, as requested. For example, the timing metadata of the user input (a terminate operation) at the client device 132a is 07:00:01 and the timing metadata of the client request at the client device 132b is 07:30:03. In such an embodiment, the manifest data and indexed metadata associated with the program identifier may also include the programming content of a duration of 00:30:02 hours that was lapsed after the user input was provided at the client device 132a to terminate the first disparate live media output stream. The updated playback position may be set accordingly in the generated second disparate live media output stream manifest.

In accordance with an embodiment, the stream publishing engine 114 in the DACIS 103 may be configured to generate an altered first disparate live media output stream, based on the insertion of the determined manifest data and indexed metadata associated with the program identifier referenced in the first programming schedule 111, in addition to the stream identifier and the timing metadata. Such altered first disparate live media output stream may comprise the manifest data, the indexed metadata, and the updated playback position for resuming at one or both of the first client device, such as the client device 132*a*, and the second client device, such as client device 132*b*, as requested. For example, the timing metadata of the user input (a pause operation) at the client device 132*a* indicates 07:00:01 and the timing metadata of the client request at the client device 132*b* indicates 07:00:03. In such an embodiment, the updated playback position may be set accordingly in the altered first disparate live media output stream manifest.

In accordance with various embodiments, the second disparate live media output stream for the first client device, such as the client device 132*a*, or the second client device, such as the client device 132*b*, may be generated based on one of the pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams.

At 670, the programming content associated with the program identifier in the manifest data, the indexed metadata and the updated playback position, of the generated second disparate live media output stream may be played out. In accordance with an embodiment, the stream publishing engine 114 in the DACIS 103 may be configured to play out the programming content associated with the program identifier in the manifest data, the indexed metadata and the updated playback position, of the second disparate live media output stream. The second disparate live media output stream may be viewed at one or both of the first client device, such as the client device 132*a*, and the second client device, such as the client device 132*b*, in response to the generated client request.

FIGS. 7A to 7D depict flowcharts illustrating exemplary operations for client-side dynamic presentation of programming content in an indexed disparate live media output stream by the first client device, such as client device 132*a*, of FIG. 1C, in accordance with exemplary embodiments of the disclosure. FIGS. 7A to 7D are described in conjunction with FIG. 1C and FIG. 3A. Specifically, flowchart 700A depicts a first method for client-side dynamic presentation of programming content, in accordance with an embodiment of the disclosure. Flowchart 700B depicts a second method for client-side dynamic presentation of programming content, in accordance with another embodiment of the disclosure. Flowchart 700C depicts a third method for client-side dynamic presentation of programming content, in accordance with another embodiment of the disclosure. Flowchart 700D depicts a fourth method for client-side dynamic presentation of programming content, in accordance with another embodiment of the disclosure.

Figure 7A:
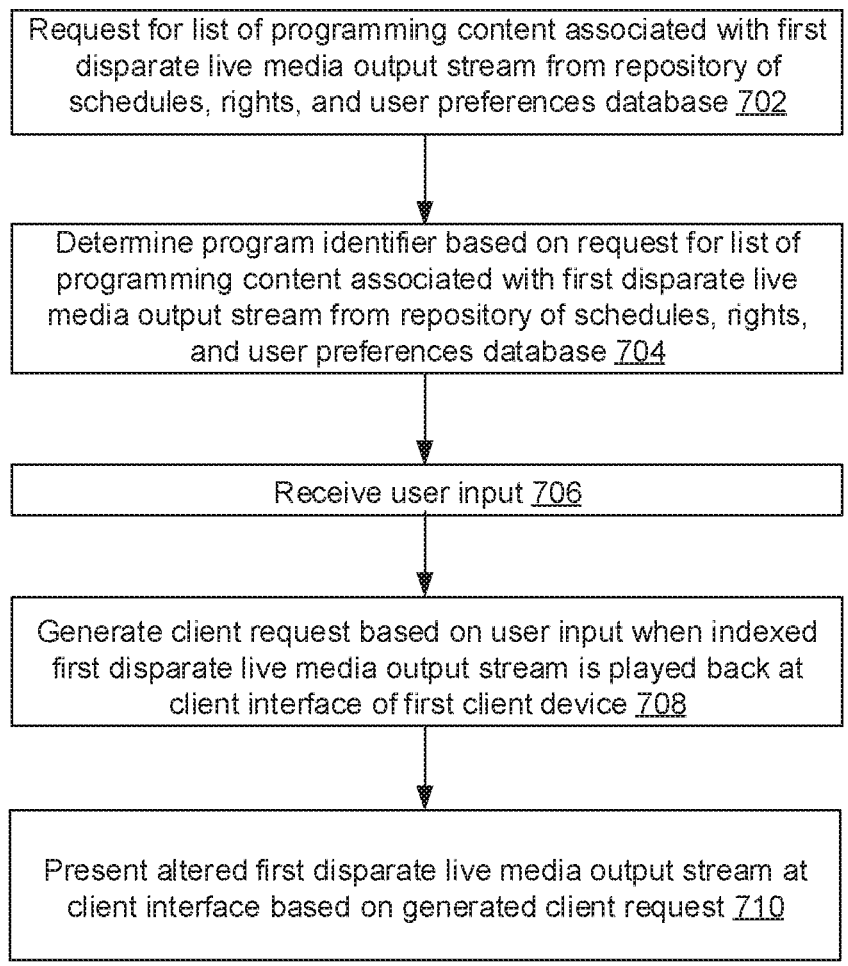
FIGS. 7A to 7D depict flowcharts illustrating exemplary operations for client-side dynamic presentation of programming content in an indexed disparate live media output stream by the first client device, such as client device 132a, of FIG. 1C, in accordance with exemplary embodiments of the disclosure.

Referring to FIG. 7A, flowchart 700A depicts the first method for client-side dynamic presentation of programming content, in accordance with an embodiment of the disclosure. Flowchart 700A corresponds to a first use case where one or more processors in the DACIS 103 of FIG. 1B are configured to restart the programming content in the first disparate live media output stream that is presented on at least the first client device (as described in FIGS. 6A and 6B), in accordance with a first functionality from one or more functionalities enabled via the one or more constraints and rights.

At 702, a list of programming content associated with the first disparate live media output stream may be requested from the repository of schedules, rights, and user preferences database 144. In accordance with an embodiment, the processing unit 170 of the first client device, such as the client device 132*a*, may be configured to request for a list of programming content associated with the first disparate live media output stream from the repository of schedules, rights, and user preferences database 144. The list of programming content may comprise additional metadata that controls the first functionality to restart the programming content in the first disparate live media output stream that is presented on at least the first client device.

In accordance with an embodiment, the client application 178 in conjunction with the I/O unit 172 may be configured to display the list of programming content associated with the first disparate live media output stream that is available for streaming and/or stored on the first client device, such as client device 132*a*, or on the content delivery system 130 and is available for selection by the user. In an embodiment, the client application 178 may be configured to present the list of programming content and allow the user to scroll through and preview the programming content. In an example, the client application 178 may be configured to display the list of programming content via an electronic program guide.

At 704, a program identifier may be determined based on the request for the list of programming content associated with the first disparate live media output stream from the repository of schedules, rights, and user preferences database 144. In accordance with an embodiment, the processing unit 170 of the first client device, such as the client device 132*a*, may be configured to determine the program identifier based on the request for the list of programming content associated with the first disparate live media output stream from the repository of schedules, rights, and user preferences database 144.

At 706, a user input may be received. In accordance with an embodiment, the client application 178 in conjunction with the I/O unit 172, may be configured to receive the user input. In accordance with an embodiment, the user input may be provided by the user of the first client device when the indexed first disparate live media output stream is played back at the client interface 174 of the first client device, such as client device 132*a*. The user input may be provided for restarting the programming content in the first disparate live media output stream that is presented on at least the first client device, such as the client device 132*a*.

At 708, a client request may be generated based on the user input when the indexed first disparate live media output stream is played back at the client interface 174 of the first client device. In accordance with an embodiment, the processing unit 170 in conjunction with the client application 178 in the memory unit 176 of the first client device, such as client device 132*a*, may be configured to generate the client request based on the user input when the indexed first disparate live media output stream is played back at the client interface 174 of the first client device. The client request may be generated by the first client device based on the user input provided to restart the programming content that is currently or recently played back in the first disparate live media output stream in accordance with the first functionality defined in the published first programming schedule 111. The client request may comprise at least the program identifier referenced in the published first programming schedule 111 with respect to a playback position in the published first programming schedule 111. The published first programming schedule may comprise one or more functionalities, such as the first functionality, enabled via one or more constraints and rights associated with at least the indexed first disparate live media output stream.

At 710, an altered first disparate live media output stream may be presented at the client interface 174 based on the generated client request. In accordance with an embodiment, the processing unit 170 in conjunction with the client application 178 and the I/O unit 172, may be configured to present the altered first disparate live media output stream at the client interface 174 based on the generated client request. In accordance with the first functionality, the altered first disparate live media output stream, presented at the client interface 174, comprises the manifest data, the indexed metadata and an updated playback position.

In accordance with an embodiment, the alteration of the first disparate live media output stream may be based on an insertion of manifest data and indexed metadata associated with the program identifier, associated with a programming content, referenced in the first programming schedule 111. In accordance with an embodiment, the alteration of the first disparate live media output stream may be performed at the server-side, i.e. the DACIS 103.

Figure 7B:
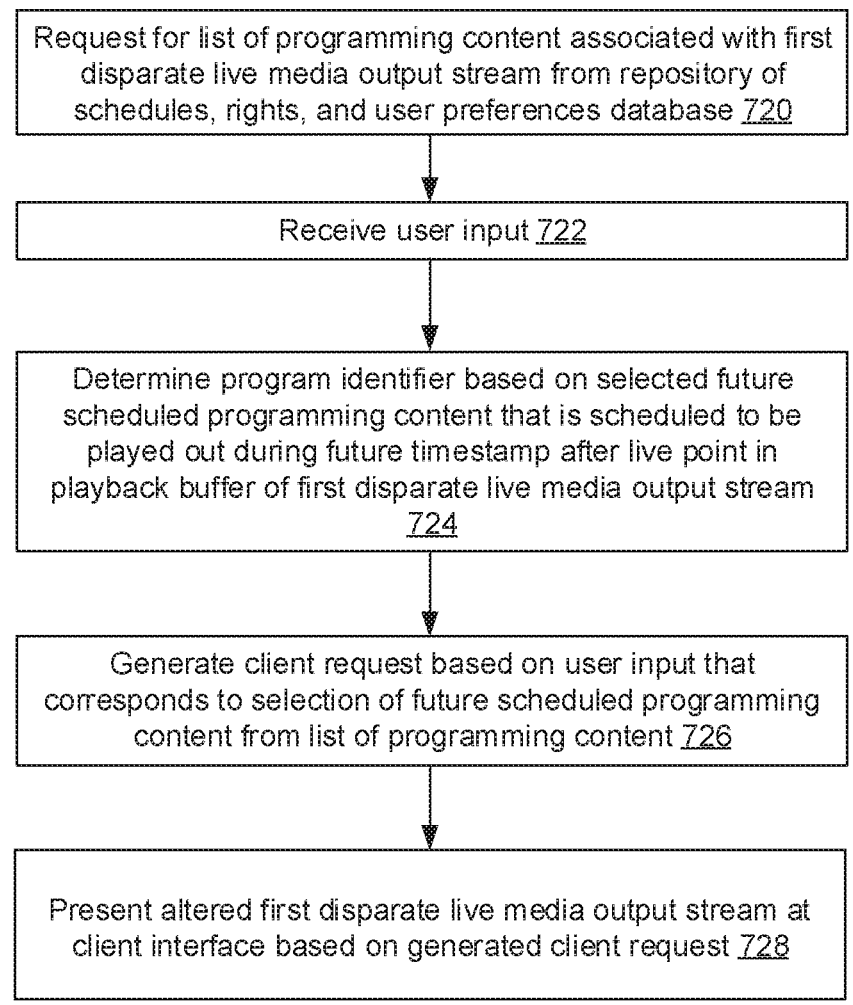

Referring to FIG. 7B, flowchart 700B depicts the second method for client-side dynamic presentation of programming content, in accordance with an embodiment of the disclosure. Flowchart 700B corresponds to a second use case where one or more processors in the DACIS 103 of FIG. 1B are configured to skip to a future scheduled programming content in the first disparate live media output stream (as described in FIGS. 6A and 6C), in accordance with a second functionality from one or more functionalities enabled via the one or more constraints and rights.

At 720, a list of programming content associated with the first disparate live media output stream from the repository of schedules, rights, and user preferences database 144 may be requested. In accordance with an embodiment, the processing unit 170 of the first client device, such as the client device 132a, may be configured to request for a list of programming content associated with the first disparate live media output stream from the repository of schedules, rights, and user preferences database 144. The list of programming content may comprise additional metadata that controls the second functionality to skip to a future scheduled programming content in the first disparate live media output stream. The second functionality is allowed for a first set of pre-encoded media content or a live input stream that comprises a second set of pre-encoded media content.

In accordance with an embodiment, the client application 178 in conjunction with the I/O unit 172, may be configured to display the list of programming content associated with the first disparate live media output stream that is upcoming for streaming and/or stored on the first client device, such as client device 132a, or on the content delivery system 130 and is available for selection by the user. In an embodiment, the client application 178 in conjunction with the I/O unit 172, may be configured to present the list of programming content and allow the user to scroll through and preview the programming content. In an example, the client application 178 may be configured to display the list of programming content via an electronic program guide.

At 722, a user input may be received. In accordance with an embodiment, the client application 178 in conjunction with the I/O unit 172, may be configured to receive the user input. In accordance with an embodiment, the user input may be provided by the user of the first client device when the indexed first disparate live media output stream is played back at the client interface 174 of the first client device, such as client device 132a. The user input may be provided for a selection of the future scheduled programming content from the list of programming content.

At 724, a program identifier may be determined based on the selected future scheduled programming content that is scheduled to be played out during a future timestamp after a live point in a playback buffer of the first disparate live media output stream. In accordance with an embodiment, the processing unit 170 of the first client device, such as the client device 132a, may be configured to determine the program identifier based on the selected future scheduled programming content that is scheduled to be played out during a future timestamp after a live point in a playback buffer of the first disparate live media output stream. Such program identifier may be referenced in the published first programming schedule 111.

At 726, a client request may be generated based on the user input that corresponds to the selection of the future scheduled programming content from the list of programming content. In accordance with an embodiment, the processing unit 170 in conjunction with the client application 178, may be configured to generate the client request based on the user input that corresponds to the selection of the future scheduled programming content from the list of programming content. The client request may comprise at least the program identifier referenced in the published first programming schedule 111 with respect to a playback position in the published first programming schedule 111. The published first programming schedule 111 may comprise one or more functionalities, such as the second functionality, enabled via one or more constraints and rights associated with at least the indexed first disparate live media output stream.

At 728, an altered first disparate live media output stream may be presented at the client interface 174 based on the generated client request. In accordance with an embodiment, the processing unit 170 in conjunction with the client application 178 and the I/O unit 172 may be configured to present the altered first disparate live media output stream at the client interface 174 based on the generated client request. In accordance with the second functionality, the altered first disparate live media output stream, presented at the client interface 174, comprises the manifest data, the indexed metadata and an updated playback position.

In accordance with an embodiment, the alteration of the first disparate live media output stream may be based on an insertion of manifest data and indexed metadata associated with the program identifier, associated with a programming content, referenced in the first programming schedule 111. In accordance with an embodiment, the alteration of the first disparate live media output stream may be performed at the server-side, i.e. the DACIS 103.

Figure 7C:
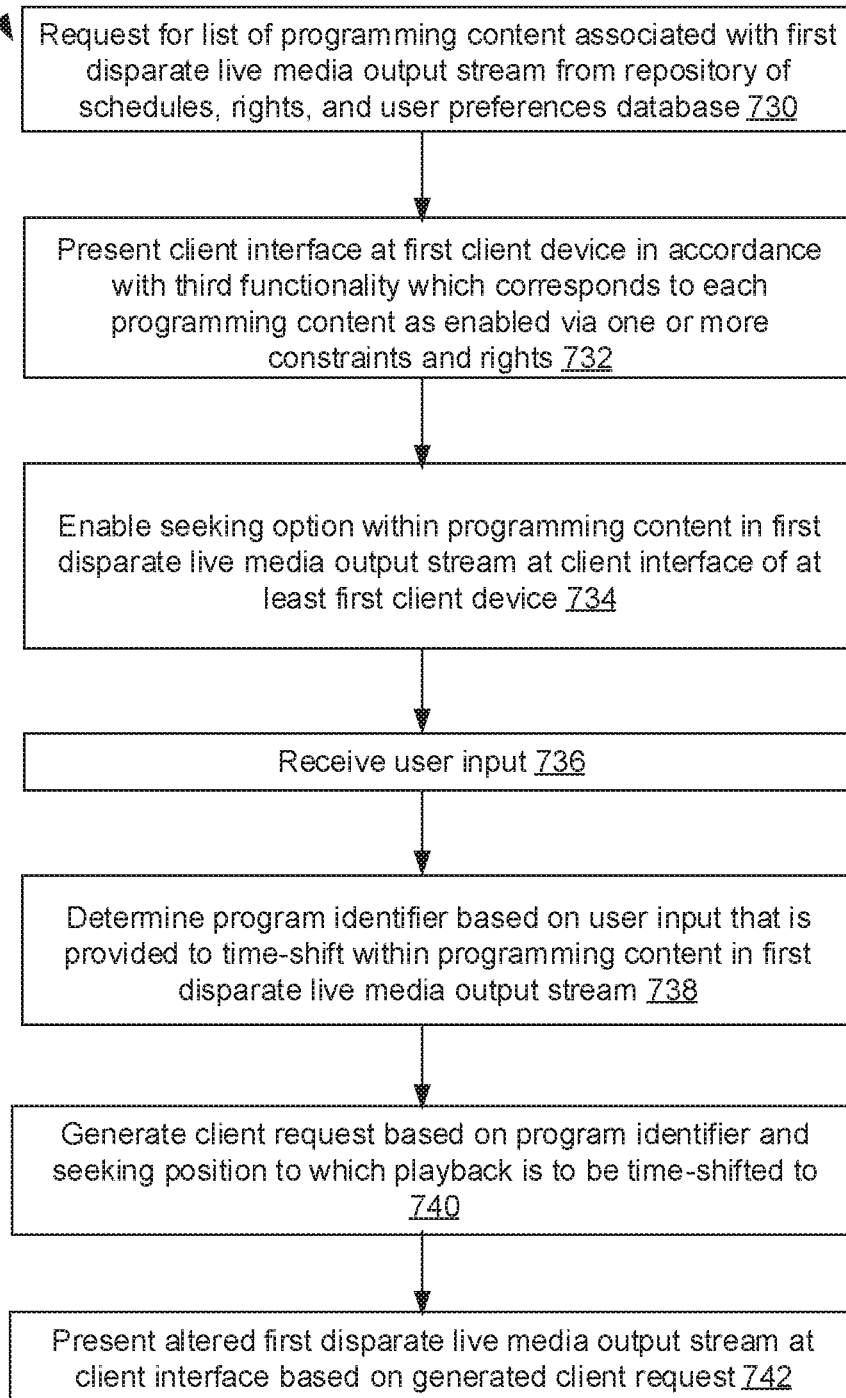

Referring to FIG. 7C, flowchart 700C depicts the third method for client-side dynamic presentation of programming content, in accordance with an embodiment of the disclosure. Flowchart 700C corresponds to a third use case where one or more processors in the DACIS 103 of FIG. 1B are configured to time-shift within the programming content in the first disparate live media output stream (as described in FIGS. 6A and 6D), in accordance with a third functionality from one or more functionalities enabled via the one or more constraints and rights.

At 730, a list of programming content associated with the first disparate live media output stream from the repository of schedules, rights, and user preferences database 144 may be requested. In accordance with an embodiment, the processing unit 170 of the first client device, such as the client device 132a, may be configured to request for a list of programming content associated with the first disparate live media output stream from the repository of schedules, rights, and user preferences database 144. The list of programming content may comprise additional metadata that controls the third functionality to time-shift within the programming content in the first disparate live media output stream.

In accordance with an embodiment, the client application 178 in conjunction with the I/O unit 172 may be configured to display the list of programming content associated with the first disparate live media output stream and/or stored on the first client device, such as client device 132a, or on the content delivery system 130 and is available for selection by the user. In an embodiment, the client application 178 may be configured to present the list of programming content and allow the user to scroll through and preview the programming content. In an example, the client application 178 may be configured to display the list of programming content via an electronic program guide.

At 732, the client interface 174 at the first client device may be presented in accordance with the third functionality which corresponds to each programming content as enabled via the one or more constraints and rights. In accordance with an embodiment, the processing unit 170 in conjunction with the client application 178 and the I/O unit 172, may be configured to present the client interface 174 at the first client device in accordance with the third functionality which corresponds to each programming content as enabled via the one or more constraints and rights.

At 734, a seeking option may be enabled within the programming content in the first disparate live media output stream at the client interface 174 of at least the first client device. In accordance with an embodiment, the processing unit 170 in conjunction with the client application 178 may be configured to enable the seeking option within the programming content in the first disparate live media output stream at the client interface 174 of at least the first client device.

In accordance with an embodiment, the first disparate live media output stream manifest associated with the first disparate live media output stream presented at the first client device may comprise timing metadata. The timing metadata may comprise embedded time-based identifiers corresponding to media segments in the first disparate live media output stream.

At 736, a user input may be received. In accordance with an embodiment, the client application 178 in the memory unit 176 in conjunction with the I/O unit 172, may be configured to receive the user input. In accordance with an embodiment, the user input may be provided by the user of the first client device when the indexed first disparate live media output stream is played back at the client interface 174 of the first client device, such as client device 132a. The user input may be provided, via the enabled seeking option, for a seeking position to which playback is to be time-shifted to. The seeking position may comprise a time-based identifier which corresponds to an embedded time-based identifier within the first disparate live media output stream.

At 738, a program identifier may be determined based on the user input that is provided to time-shift within the programming content in the first disparate live media output stream. In accordance with an embodiment, the processing unit 170 of the first client device, such as the client device 132a, may be configured to determine the program identifier based on the user input that is provided to time-shift within the programming content in the first disparate live media output stream.

At 740, a client request may be generated based on the program identifier and the seeking position to which playback is to be time-shifted to. In accordance with an embodiment, the processing unit 170 in conjunction with the client application 178, may be configured to generate the client request based on the program identifier and a seeking position to which playback is to be time-shifted to. Thus, the client request may comprise the program identifier referenced in the published first programming schedule 111 with respect to a playback position in the published first programming schedule 111, and the seeking position to which playback is to be time-shifted to. The published first programming schedule 111 may comprise one or more functionalities, such as the third functionality, enabled via one or more constraints and rights associated with at least the indexed first disparate live media output stream.

At 742, an altered first disparate live media output stream may be presented at the client interface 174 based on the generated client request. In accordance with an embodiment, the processing unit 170 in conjunction with the client application 178 and the I/O unit 172 may be configured to present the altered first disparate live media output stream at the client interface 174 based on the generated client request. In accordance with the third functionality, the altered first disparate live media output stream presented at the client interface 174 based on the generated client request, comprises the manifest data, the indexed metadata and an updated playback position.

In accordance with an embodiment, the alteration of the first disparate live media output stream may be based on an insertion of manifest data and indexed metadata associated with the program identifier, associated with a programming content, referenced in the first programming schedule 111. In accordance with an embodiment, the alteration of the first disparate live media output stream may be performed at the server-side, i.e. the DACIS 103.

Figure 7D:
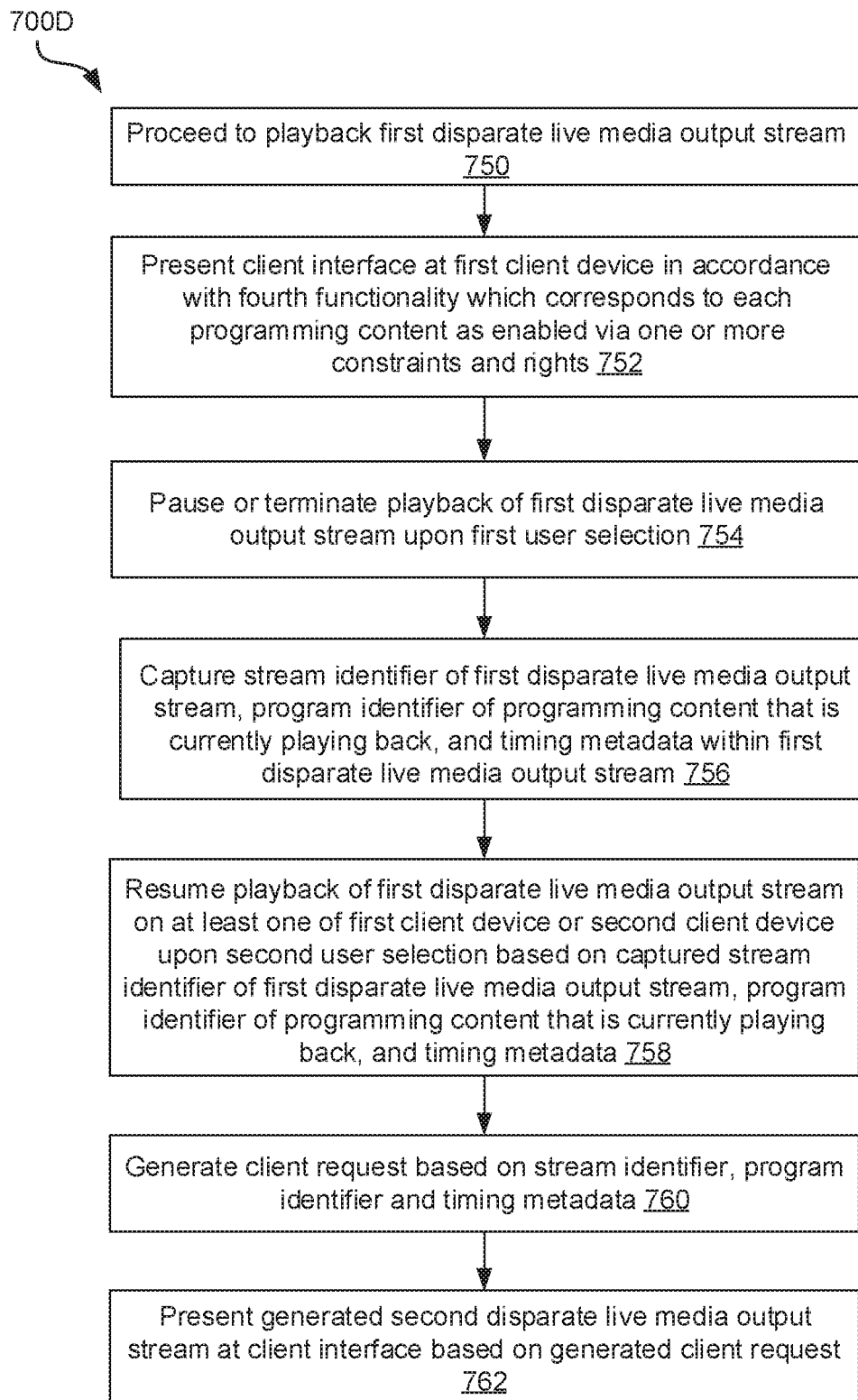

Referring to FIG. 7D, flowchart 700D depicts the fourth method for client-side dynamic presentation of programming content, in accordance with an embodiment of the disclosure. Flowchart 700D corresponds to a fourth use case where one or more processors in the DACIS 103 of FIG. 1B are configured to resume playback within the programming content in the first disparate live media output stream (as described in FIGS. 6A and 6E), in accordance with a fourth functionality from one or more functionalities enabled via the one or more constraints and rights.

At 750, the first disparate live media output stream may proceed to playback. In accordance with an embodiment, the processing unit 170 in conjunction with the client application 178 may be configured to proceed to playback the first disparate live media output stream. The first disparate live media output stream manifest associated with the first disparate live media output stream presented on the first client device comprises timing metadata. The timing metadata may comprise embedded time-based identifiers. In other words, as the playback occurs, the first client device will always be aware of current time of playback as provided by timestamp embedded in first disparate live media output stream manifest.

At 752, the client interface 174 at the first client device may be presented in accordance with the fourth functionality which corresponds to each programming content as enabled via the one or more constraints and rights. In accordance with an embodiment, the processing unit 170 in conjunction with the client application 178 and the I/O unit 172, may be configured to present the client interface 174 at the first client device in accordance with the fourth functionality which corresponds to each programming content as enabled via the one or more constraints and rights.

At 754, the playback of the first disparate live media output stream may be paused or terminated upon a first user selection. In accordance with an embodiment, the processing unit 170 in conjunction with the client application 178 and the I/O unit 172 may be configured to pause or terminate the playback of the first disparate live media output stream upon a first user selection.

At 756, a stream identifier of the first disparate live media output stream, the program identifier of the programming content that is currently playing back, and timing metadata within the first disparate live media output stream may be captured. In accordance with an embodiment, the processing unit 170 in conjunction with the client application 178 may be configured to capture the stream identifier of the first disparate live media output stream, the program identifier of the programming content that is currently playing back, and the timing metadata within the first disparate live media output stream.

At 758, the playback of the first disparate live media output stream may be resumed on at least one of the first client device, such as the client device 132a, or a second client device, such as the client device 132b, upon a second user selection based on the captured stream identifier of the first disparate live media output stream, the program identifier of the programming content that is currently playing back, and the timing metadata. In accordance with an embodiment, the processing unit 170 in conjunction with the client application 178 and the I/O unit 172 may be configured to resume the playback of the first disparate live media output stream on at least one of the first client device, such as the client device 132a, or a second client device, such as the client device 132b, upon a second user selection based on the captured stream identifier of the first disparate live media output stream, the program identifier of the programming content that is currently playing back, and the timing metadata.

At 760, a client request may be generated based on the stream identifier, program identifier and timing metadata. In accordance with an embodiment, the processing unit 170 in conjunction with the client application 178 may be configured to generate the client request based on the stream identifier, program identifier and timing metadata.

At 762, a generated second disparate live media output stream may be presented at the client interface 174 based on the generated client request. In accordance with an embodiment, the processing unit 170 in conjunction with the client application 178 and the I/O unit 172 may be configured to present the generated second disparate live media output stream at the client interface 174 based on the generated client request. In accordance with the fourth functionality, the second disparate live media output stream presented at the client interface 174 based on the generated client request, comprises the manifest data, the indexed metadata and an updated playback position.

In accordance with an embodiment, the generation of the second disparate live media output stream may be based on an insertion of manifest data and indexed metadata associated with the program identifier, associated with a programming content, referenced in the first programming schedule 111. In accordance with an embodiment, the generation of the second disparate live media output stream may be performed at the server-side, i.e. the DACIS 103.

Various embodiments of the disclosure comprise the media packaging and distribution system 102 that may be configured to publish disparate live media output streams to be viewed on a plurality of consumer devices (such as the consumer devices 110a, ..., 110n) based on user selection. The media packaging and distribution system 102 may comprise, for example, the DACIS 103, the CDS 105, the CPDS 107, the stream publishing engine 114, PEM 115, indexing and storage system 116, the stream selection service 142, and the repository of schedules, rights, and user preferences database 144. In accordance with an embodiment, one or more processors in the DACIS 103 may be configured to receive a first manifest request, comprising one or more parameters, from a first client device, such as client device 132a. The one or more processors in the DACIS 103 may be further configured to determine a first additional content comprising a customized first programming content and a targeted first non-programming content for the first client device based on the one or more parameters and associated indexed metadata retrieved based on the one or more parameters. The one or more processors in the DACIS 103 may be further configured to generate the first programming schedule 111, for the first client device based on selected one or more live input stream and/or the one or more pre-encoded media assets, the associated indexed metadata, and the determined first additional content. The one or more processors in the DACIS 103 may be further configured to select one or more live input stream manifests and/or one or more pre-encoded media asset manifests published in the content delivery system 130 and associated indexed metadata based on the one or more parameters. The one or more processors in the DACIS 103 may be further configured to publish a first disparate live media output stream manifest for the first client device based on insertion of the selected one or more live input stream manifests and/or the one or more pre-encoded media asset manifests, the associated indexed metadata, and the determined first additional content in accordance with the first programming schedule 111, generated for the first client device.

In accordance with an embodiment, the one or more processors in the DACIS 103 may be further configured to index a plurality of media segments indicated by the one or more pre-encoded media asset manifests and the one or more live input stream manifests, the associated indexed metadata, the targeted first non-programming content, and the customized first programming content based on the first programming schedule 111 generated for the first client. In accordance with an embodiment, the one or more processors in the DACIS 103 may be further configured to insert the first additional content at one or more content placement opportunities indicated in the first disparate live media output stream manifest based on the first programming schedule 111 generated for the first client device. The one or more content placement opportunities may be defined by the metadata associated with the one or more live input streams corresponding to the one or more live input stream manifests and/or one or more pre-encoded media assets corresponding to the one or more pre-encoded media asset manifests. The insertion of the targeted first non-programming content and the customized first programming content in real time, the associated indexed metadata and/or the one or more content placement opportunities may include programming content indicators, non-programming content indicators, graphical treatment indicators, and interactive content indicators.

In accordance with an embodiment, the insertion of the customized first programming content, in an instance in which the generated first disparate live media output stream manifest corresponds to a disparate live media output stream, a first set of processors in the DACIS 103 may be further configured to receive universal resource locators and/or identifiers referencing records for the selected one or more live input streams and/or the one or more pre-encoded media assets from the CPDS 107. The associated indexed metadata and/or one or more content placement opportunities may include programming content indicators, non-programming content indicators, graphical treatment indicators, and interactive content indicators. The programming content indicators may comprise a plurality of categories for the customized first programming content.

In accordance with an embodiment, the first set of processors in the DACIS 103 may be further configured to transmit a request to the CDS 105 for determining the customized first programming content from a content package and distribution system for matching one or more personalization parameters. The one or more personalization parameters may include user preferences and identifiers from the first manifest request or retrieved from the repository of schedules, rights, and user preferences database 144, and time constraints. The time constraints may be determined based on user preferences retrieved from the repository of schedules, rights, and user preferences database 144, a range defined in the first manifest request, and schedule tolerances defined in the repository of schedules, rights, and user preferences database 144, client device preferences or identifiers from the first manifest request or retrieved from the repository of schedules, rights, and user preferences database 144, geolocation information from the first manifest request or retrieved from the repository of schedules, rights, and user preferences database 144, and/or a content recommendation engine.

In accordance with an embodiment, the one or more parameters may comprise universal resource locators and/or identifiers referencing records for one or more live input streams or one or more pre-encoded media assets in the CPDS 107, a plurality of client-specific parameters, and a plurality of client-specified attributes derived from a user interaction with the first client device. The plurality of client-specific parameters may comprise user preferences and identifiers, client device preferences and identifiers, and one or more rules governed by geolocation data and current position of playback of a first disparate live media output stream at the first client device. In accordance with an embodiment, for the insertion of the targeted first non-programming content, the plurality of client-specified attributes may comprise the user interaction with interactive content in the customized first programming content and the targeted first non-programming content, and a preference for a type and/or category of the targeted first non-programming content and/or the customized first programming content. The user interaction with the interactive content comprises a selection to exclude the targeted first non-programming content and/or the customized first programming content, a selection to include a subset of the targeted first non-programming content and/or the customized first programming content, and a selection to include all of the targeted first non-programming content and/or the customized first programming content within one or more specified non-programming content locations. The targeted first non-programming content may comprise personalized advertisements including video advertisements, graphical treatment, cue points, and the interactive content comprising a set of interactive elements for the targeted first non-programming content. The customized first programming content may comprise personalized non-advertising content including promotional content, a short-form content, and an alternate additional content for replacement of at least a portion of a first disparate live media output stream generated for the first client.

In accordance with an embodiment, the one or more processors in the DACIS 103 may be further configured to transmit the published first disparate live media output stream manifest to a media player of the first client device for a playback of a first disparate live media output stream. The media player, during playback of the first disparate live media output stream at the first client device, may present one or more decision points defined by the interactive content to initiate a user interaction at the first client device. At the one or more decision points, the user interaction may correspond to one of a desired selection corresponding to the user interaction with one or more interactive elements, or a default selection corresponding to non-interaction of a user with the customized first programming content and/or the targeted first non-programming content in the first disparate live media output stream played back by the media player. The desired selection or the default selection may be transmitted to an external storage system that is the repository of schedules, rights, and user preferences database 144. At the one or more decision points, the one or more interactive elements may be configured to exclude the targeted first non-programming content or the customized first programming content and be replaced by default content, select alternate customized first programming content, select a subsequent second programming content, approve or disapprove selected customized first programming content, exclude subsequent second non-programming content for a remaining portion of the first disparate live media output stream played back by the media player, select one or more targeted first non-programming content of a specific category, or view some or all of the targeted first non-programming content immediately to avoid some or all of the targeted first non-programming content for the remaining portion of the first disparate live media output stream played back by the media player.

In accordance with an embodiment, the one or more processors in the DACIS 103 may be further configured to modify a remaining portion of the first programming schedule 111 that generates first disparate live media output stream corresponding to the first manifest request generated by the first client device based on the user interaction with the interactive content. A first set of processors in the DACIS 103 may be configured to receive the first manifest request from a second set of processors in the DACIS 103, select, based on the received first manifest request, one or more live input streams and/or one or more pre-encoded media assets based on the one or more parameters and additional parameters retrieved from the repository of schedules, rights, and user preferences database 144, and transmit universal resource locators and/or identifiers referencing records for the selected one or more live input streams and/or the one or more pre-encoded media assets to the second set of processors in the DACIS 103.

In accordance with an embodiment, the second set of processors in the DACIS 103 may be further configured to retrieve the indexed metadata associated with the selected one or more live input streams and/or the one or more pre-encoded media assets from the CPDS 107. The associated indexed metadata may define one or more content placement opportunities within the selected one or more live input streams and/or the one or more pre-encoded media assets. The customized first programming content and the targeted first non-programming content may be identified as the first additional content to be scheduled at the one or more content placement opportunities based on the one or more parameters in the received first manifest request and the associated indexed metadata, wherein the generated first programming schedule 111 excludes the first additional content or includes the first additional content completely or partially.

In accordance with an embodiment, a third set of processors in the DACIS 103 may be further configured to insert, based on the generated first programming schedule 111, the identified customized first programming content and the targeted first non-programming content into the first disparate live media output stream manifest in accordance with the one or more content placement opportunities defined in the associated indexed metadata and one or more rules and conditions defined in the repository of schedules, rights, and user preferences database 144. The identification of the targeted first non-programming content may be based on execution of a non-programming content service based on rules and conditions defined in additional parameters of the repository of schedules, rights, and user preferences database 144, and the one or more parameters defined in the first manifest request. The identification of the customized first programming content may be based on execution of the CDS 105 based on the rules and conditions defined in the additional parameters of the repository of schedules, rights, and user preferences database 144. In accordance with an embodiment, the first programming schedule 111 may define locations and types of one or more decision points defined by one or more content placement opportunities in the indexed metadata. In an instance when one or more pre-encoded media assets are being scheduled and the one or more decision points defined by the one or more content placement opportunities are to be inserted in the first programming schedule 111, the first programming schedule 111 may be configured to control the one or more pre-encoded media asset manifests to be published as the first disparate live media output stream manifest.

In accordance with an embodiment, a conversion of one or more pre-encoded media assets into a first disparate live media output stream facilitates one or more subsequent modifications on the first disparate live media output stream. The one or more subsequent modifications may correspond to a user selection, a user preference, a change in the first programming schedule 111, or a time or geolocation-based rule.

In accordance with an embodiment, the first set of processors in the DACIS 103 may be further configured to transmit universal resource locators and/or identifiers referencing records for the selected one or more live input streams and/or the one or more pre-encoded media assets to the second set of processors. In an absence of one or more live input streams, the first set of processors may be configured to select a pre-encoded asset indicated in the first manifest request to continue playback as the first disparate live media output stream. The second set of processors may be configured to select a second disparate live media output stream according to accessibility of the first disparate live media output stream. The first disparate live media output stream is not updated and/or the first disparate live media output stream has media and/or a manifest that is incompatible with a client request. The second set of processors may be further configured to select the second disparate live media output stream according to rules provided by a stream owner/operator and user preferences defined in the repository of schedules, rights, and user preferences database 144.

In accordance with an embodiment, the one or more processors in the DACIS 103 may be further configured to transition from the first additional content to an alternate additional content based on one or more transition parameters. The one or more transition parameters may comprise one or more parameters from the first manifest request, current state of the first disparate live media output stream manifest determined based on accessibility, regular update, and suitable encoding, digital rights management, and compatibility with the first client device, rules provided by a stream owner operator, and user preferences defined in the repository of schedules, rights, and user preferences database 144.

In accordance with an embodiment, the one or more processors in the DACIS 103 may be further configured to retrieve alternate metadata for the alternate additional content from the CPDS 107. The alternate metadata may indicate a location to transition from the first additional content to the alternate additional content. The one or more processors may be further configured to determine placement of the alternate additional content within the first disparate live media output stream manifest based on the associated indexed metadata and the alternate metadata. The one or more processors may be further configured to generate the alternate programming schedule 113, for the first client device based on the alternate additional content and the alternate metadata, and transmit the generated alternate programming schedule to the first set of processors. The first set of processors may be configured to generate a final disparate live output stream manifest for the first client device. In accordance with an embodiment, another conversion of the first disparate live media output stream into the one or more pre-encoded media assets facilitates download of the one or more pre-encoded media assets at the first client device and mitigates dependency on the system for playback of remaining portion. In accordance with an embodiment, the one or more processors in the DACIS 103 may be further configured to receive a request from the first client device, wherein the request comprises the one or more parameters. The one or more processors in the DACIS 103 may be further configured to determine alternate additional content for inclusion in the first disparate live media output stream manifest or replacement of the first additional content in the first disparate live media output stream manifest based on the one or more parameters. The one or more processors in the DACIS 103 may be further configured to modify the first programming schedule 111 to generate an alternate programming schedule for the first client device based on the alternate additional content and associated metadata. The one or more processors in the DACIS 103 may be further configured to transmit the generated alternate programming schedule to a second set of processors, wherein the second set of processors is configured to generate a final disparate live output stream manifest for the first client device.

In accordance with an embodiment, the one or more processors in the DACIS 103 may be further configured to revoke the first disparate live media output stream manifest published for the first client device based on an identifier primitive associated with the first disparate live media output stream of the first client device in an instance in which a media player of the first client device is determined to be a plagiarized media player. The first disparate live media output stream may include at least one unique identifier inserted by the one or more processors n the DACIS 103.

In accordance with various embodiments, the first disparate live media output stream manifest for the first client device may be generated based on one of a pre-defined conversion modes. The pre-defined conversion modes may correspond to pre-encoded media assets to live stream mode, pre-encoded media assets to live stream mode with scalable architecture, a live stream to live stream mode, and a mixed mode corresponding to switching between pre-encoded media assets and live streams.

In accordance with an embodiment, one or more processors in the PEM 115 may be configured to receive a first manifest request, comprising one or more parameters, from the first client device. Further, the received first manifest request may be transmitted to a first set of processors in the stream selection service 142. The first set of processors may be configured to select, based on the received first manifest request, one or more live input streams and/or one or more pre-encoded media assets based on the one or more parameters and additional parameters retrieved from the repository of schedules, rights, and user preferences database 144. The one or more processors in the PEM 115 may be configured to receive universal resource locators and/or identifiers referencing records for the selected one or more live input streams and/or the one or more pre-encoded media assets from the first set of processors. The one or more processors in the PEM 115 may be configured to retrieve indexed metadata associated with the selected one or more live input streams and/or the one or more pre-encoded media assets from a content packaging and distribution system, wherein the indexed metadata defines one or more content placement opportunities within the selected one or more live input streams and/or the one or more pre-encoded media assets. The one or more processors in the PEM 115 may be further configured to identify a customized first programming content and a targeted first non-programming content as a first additional content to be scheduled in the one or more content placement opportunities based on the one or more parameters in the received first manifest and the associated indexed metadata. The one or more processors in the PEM 115 may be further configured to generate the first programming schedule 111 for the first client device based on the associated indexed metadata, the first additional content and the one or more live input streams and/or one or more pre-encoded media assets.

In accordance with another aspect of the disclosure, one or more processors in the DACIS 103, such as the PEM 115, may be configured to publish the first programming schedule 111 that comprises one or more functionalities enabled via one or more constraints and rights associated with at least a first disparate live media output stream. The published first programming schedule 111 may reference one or more pre-encoded media assets and/or one or more live input streams. The one or more processors in the DACIS 103, such as the indexing and storage system 116, may be configured to generate an indexed first disparate live media output stream for the first client device, such as the client device 132a, based on the published first programming schedule 111. The one or more processors in the DACIS 103, such as the stream publishing engine 114, may be configured to receive a client request from the first client device, such as the client device 132a, based on a playback of the indexed first disparate live media output stream at the first client device, such as the client device 132a, wherein the client request comprises at least a program identifier referenced in the published first programming schedule 111 with respect to a playback position in the published first programming schedule 111. The one or more processors in the DACIS 103, such as the stream publishing engine 114, may be configured to insert manifest data and indexed metadata of a programming content associated with the program identifier to a first disparate live media output stream manifest in accordance with the one or more functionalities. The one or more processors in the DACIS 103, such as the stream publishing engine 114, may be configured to at least one of alter the first disparate live media output stream or generate a second disparate live media output stream, based on the insertion of the manifest data and indexed metadata associated with the program identifier referenced in the first programming schedule 111, wherein the altered first disparate live media output stream or the generated second disparate live media output stream comprises the manifest data, the indexed metadata and an updated playback position. The manifest data may correspond to one or both of an encoded live input stream and a pre-encoded media asset associated with the program identifier. The manifest data may define at least an associated media content, one or more programming indicators, timing metadata, one or more media content identifiers, and one or more contextual event identifiers. The timing metadata corresponds to the playback position in the published first programming schedule 111.

The one or more processors in the DACIS 103, such as the indexing and storage system 116, may be configured to process the manifest data to create the indexed metadata, wherein the indexed metadata may define one or more program indicators and calculated durations, a program identification, non-programming content and calculated durations, a non-programming content identification, and one or more event markers.

The one or more processors in the DACIS 103, such as the indexing and storage system 116, may be configured to index the one or more pre-encoded media assets and/or the one or more live input streams referenced in the published first programming schedule 111. In an embodiment, the one or more live input streams may be indexed repeatedly at variable time intervals. The indexed first disparate live media output stream for the first client device, such as the client device 132a, may be generated based on the indexed one or more pre-encoded media assets and/or the one or more live input streams.

The one or more processors in the DACIS 103, such as the indexing and storage system 116, may be configured to maintain the manifest data and the indexed metadata to encompass a time-range specified in the published first programming schedule 111.

In accordance with an embodiment, the one or more functionalities enabled via the one or more constraints and rights include a first functionality to restart the programming content in the first disparate live media output stream that is presented on at least the first client device, such as the client device 132a. In such an embodiment, the program identifier may be determined by at least the first client device, such as the client device 132a, based on a request for a list of programming content associated with the first disparate live media output stream from a repository of schedules, rights, and user preferences database. The list of programming content may comprise additional metadata that controls the first functionality of a current programming content and each of past programming content as enabled via the one or more constraints and rights in the published first programming schedule 111. In accordance with an embodiment, the program identifier may be specified within the first disparate live media output stream manifest that corresponds to the first disparate live media output stream for the programming content that is currently or recently played back. One or more media segments of the programming content are within a playout buffer of the first disparate live media output stream manifest. The client request may be generated by the first client device, such as the client device 132a, based on a user input provided to restart the programming content that is currently or recently played back in the first disparate live media output stream in accordance with the first functionality defined in the published first programming schedule 111. The one or more processors in the DACIS 103, such as the stream publishing engine 114, may be configured to validate against the published first programming schedule 111 that the programming content is eligible for a restart. In accordance with an embodiment, the one or more processors in the DACIS 103, such as the stream publishing engine 114, may be configured to ignore the client request when the programming content is ineligible for the restart. Further, the playback of the first disparate live media output stream may be continued at the first client device, such as the client device 132*a*, as per the published first programming schedule 111.

In accordance with another embodiment, the one or more processors in the DACIS 103, such as the stream publishing engine 114, may be configured to alter the manifest data of the first disparate live media output stream manifest with the programming content associated with the program identifier from a starting point of the programming content when the programming content is eligible for the restart.

In accordance with an embodiment, the one or more functionalities enabled via the one or more constraints and rights include a second functionality to skip to a future scheduled programming content in the first disparate live media output stream. The second functionality may be allowed for a first set of pre-encoded media content or a live input stream that comprises a second set of pre-encoded media content.

A list of programming content associated with the first disparate live media output stream from a repository of schedules, rights, and user preferences database may be requested by the first client device, such as the client device 132*a*. The list of programming content may comprise additional metadata that controls the second functionality of the future scheduled programming content as enabled via the one or more constraints and rights in the published first programming schedule 111. In such an embodiment, the client request may be generated by the first client device, such as the client device 132*a*, based on a user input that may correspond to a selection of the future scheduled programming content from the list of programming content. The program identifier referenced in the published first programming schedule 111 may correspond to the selected future scheduled programming content that is scheduled to be played out during a future timestamp after a live point in a playback buffer of the first disparate live media output stream. Further, the one or more processors in the DACIS 103, such as the stream publishing engine 114, may be configured to validate against the published first programming schedule 111 that the selected future scheduled programming content is eligible for playback at a time of the client request. In accordance with an embodiment, the one or more processors in the DACIS 103, such as the stream publishing engine 114, may be configured to ignore the client request when the selected future scheduled programming content is ineligible for playback at the time of the client request. Further, the playback of the first disparate live media output stream may be continued at the first client device, such as the client device 132*a*, as per the published first programming schedule 111. The altered first disparate live media output stream may comprise the manifest data, the indexed metadata and the updated playback position when the selected future scheduled programming content is eligible for the playback at the time of the client request.

The one or more processors in the DACIS 103, such as the stream publishing engine 114, may be configured to play out the selected future scheduled programming content associated with the program identifier in the manifest data, the indexed metadata and the updated playback position, corresponding to a starting point of the selected future scheduled programming, of the altered first disparate live media output stream.

In accordance with another embodiment, the one or more functionalities enabled via the one or more constraints and rights include a third functionality to time-shift within the programming content in the first disparate live media output stream. The first disparate live media output stream manifest associated with the first disparate live media output stream presented at the first client device, such as the client device 132*a*, may comprise timing metadata. The timing metadata may comprise embedded time-based identifiers corresponding to media segments in the first disparate live media output stream. Further, a list of programming content associated with the first disparate live media output stream from a repository of schedules, rights, and user preferences database is requested by the first client device, such as the client device 132*a*. The list of programming content may comprise additional metadata that controls the third functionality which corresponds to each programming content as enabled via the one or more constraints and rights in the published first programming schedule 111. A client interface may be presented at the first client device, such as the client device 132*a*, in accordance with the third functionality which corresponds to each programming content as enabled via the one or more constraints and rights. A seeking option within the programming content in the first disparate live media output stream may be enabled at the client interface of at least the first client device, such as the client device 132*a*, in accordance with a default playback buffer of at least the first client device, such as the client device 132*a*, when the programming content that is currently played back does not allow for the third functionality. In another embodiment, the seeking option within each programming content in the first disparate live media output stream may be enabled at the client interface of at least the first client device, such as the client device 132*a*, when the programming content that is currently played back allows for the third functionality. Such seeking option is enabled within each programming content and a seeking operation forwards in time is up to a latest published media segment within the first disparate live media output stream manifest. The client request may further comprise a seeking position to which playback is to be time-shifted to. A seeking operation continues into a prior programming content when the seeking operation backwards in time reaches a starting point of the programming content that is currently played back and the third functionality of the prior programming content is enabled. In an embodiment, the seeking position may comprise a time-based identifier which corresponds to an embedded time-based identifier within the first disparate live media output stream. In another embodiment, the seeking position may be calculated based on an embedded time-based identifier associated with a current position of a playhead and a desired duration to seek backward or forward.

The one or more processors in the DACIS 103, such as the stream publishing engine 114, may be configured to determine the manifest data and indexed metadata corresponding to the programming content, corresponding to the first programming schedule, in proximity to the seeking position for the seeking operation. The altered first disparate live media output stream to be viewed by at least the first client device, such as the client device 132a, may be generated by the one or more processors, such as the stream publishing engine 114, based on the insertion of the determined manifest data and indexed metadata.

In accordance with another embodiment, the one or more functionalities enabled via the one or more constraints and rights include a fourth functionality to resume playback within the programming content in the first disparate live media output stream. The first disparate live media output stream manifest associated with the first disparate live media output stream presented on at least the first client device, such as the client device 132a, may comprise timing metadata. The timing metadata may comprise embedded time-based identifiers.

In an embodiment, a playback of the first disparate live media output stream may be paused or terminated by at least the first client device, such as the client device 132a. A stream identifier of the first disparate live media output stream, the program identifier of the programming content that is currently playing back, and timing metadata within the first disparate live media output stream may be captured by at least the first client device, such as the client device 132a. The captured stream identifier, the program identifier, and the timing metadata may be stored in one or more of at least the first client device, such as the client device 132a, a server associated with a user identifier, or a repository of schedules, rights, and user preferences database. The user identifier may correspond to a user associated with at least the first client device, such as the client device 132a. The stored stream identifier, the program identifier, and the timing metadata may correspond to a bookmark identifier that defines a state of the first disparate live media output stream. In such case, the client request may correspond to a user selection to resume playback of the first disparate live media output stream on at least one of the first client device, such as the client device 132a, or a second client device, such as client device 132b. The user identifier of the first client device, such as the client device 132a, may be further associated with the second client device, such as client device 132b. Thus, the client request further comprises the stream identifier and the timing metadata in addition to the program identifier.

The one or more processors in the DACIS 103, such as the stream publishing engine 114, may be configured to determine the first programming schedule 111 from a set of programming schedules associated with the stream identifier based on the timing metadata in the client request, and reconstruct the first disparate live media output stream for the altered schedule associated with the stream identifier, the program identifier, and the timing metadata. In accordance with an embodiment, the reconstructed first disparate live media output stream corresponds to the second disparate live media output stream, and the generated second disparate live media output stream is viewed at one or both of the first client device and the second client device The one or more processors in the DACIS 103, such as the stream publishing engine 114, may be configured to determine an alternate representation of the first disparate live media output stream from the repository of schedules, rights, and user preferences database 144 or third-party systems. In an embodiment, the determined alternate representation of the first disparate live media output stream may be optimized for at least the second client device, such as client device 132b. In accordance with an embodiment, the determined alternate representation of the first disparate live media output stream comprises non-programming content targeted for one or more users associated with one or both of the first client device, such as the client device 132a, and the second client device, such as client device 132b.

In accordance with another aspect of the disclosure, one or more processors in the first client device, such as the client device 132a, may be configured to generate a client request based on a user input when an indexed first disparate live media output stream is played back or to be played back at a client interface, such as the client interface 176f of the first client device. The client request may comprise at least a program identifier referenced in the published first programming schedule 111 with respect to a playback position in the published first programming schedule. The published first programming schedule 111 may comprise one or more functionalities enabled via one or more constraints and rights associated with at least the indexed first disparate live media output stream. The one or more processors may be further configured to present at least one of an altered first disparate live media output stream or a generated second disparate live media output stream at the client interface based on the generated client request. The alteration of the first disparate live media output stream or the generation of the second disparate live media output stream may be based on an insertion of manifest data and indexed metadata associated with the program identifier, associated with a programming content, referenced in the first programming schedule 111. The altered first disparate live media output stream or the generated second disparate live media output stream may comprises the manifest data, the indexed metadata and an updated playback position. In accordance with an embodiment, the manifest data may correspond to one or both of an encoded live input stream and a pre-encoded media asset associated with the program identifier. The manifest data defines at least an associated media content, one or more programming indicators, timing metadata, one or more media content identifiers, and one or more contextual event identifiers. The timing metadata corresponds to the playback position in the published first programming schedule 111.

In accordance with an embodiment, the one or more functionalities enabled via the one or more constraints and rights may include a first functionality to restart the programming content in the first disparate live media output stream that is presented on at least the first client device. The one or more processors may be configured to determine the program identifier based on a request for a list of programming content associated with the first disparate live media output stream from a repository of schedules, rights, and user preferences database 144. The list of programming content comprises additional metadata that controls the first functionality of a current programming content and each of past programming content as enabled via the one or more constraints and rights in the published first programming schedule 111. The client request may be generated by the first client device based on a user input provided to restart the programming content that is currently or recently played back in the first disparate live media output stream in accordance with the first functionality defined in the published first programming schedule 111.

In accordance with another embodiment, the one or more functionalities enabled via the one or more constraints and rights include a second functionality to skip to a future scheduled programming content in the first disparate live media output stream. The second functionality is allowed for a first set of pre-encoded media content or a live input stream that comprises a second set of pre-encoded media content. The one or more processors may be configured to request a list of programming content associated with the first disparate live media output stream from a repository of schedules, rights, and user preferences database 144. The list of programming content comprises additional metadata that controls the second functionality of the future scheduled programming content as enabled via the one or more constraints and rights in the published first programming schedule 111. The client request may be generated by the first client device based on the user input that corresponds to a selection of the future scheduled programming content from the list of programming content. The program identifier referenced in the published first programming schedule 111 corresponds to the selected future scheduled programming content that is scheduled to be played out during a future timestamp after a live point in a playback buffer of the first disparate live media output stream.

In accordance with another embodiment, the one or more functionalities enabled via the one or more constraints and rights may include a third functionality to time-shift within the programming content in the first disparate live media output stream. The first disparate live media output stream manifest associated with the first disparate live media output stream presented at the first client device comprises timing metadata. The timing metadata comprises embedded time-based identifiers corresponding to media segments in the first disparate live media output stream. The one or more processors may be configured to present the client interface 176*f* at the first client device in accordance with the third functionality which corresponds to each programming content as enabled via the one or more constraints and rights. The one or more processors may be further configured to enable a seeking option within the programming content in the first disparate live media output stream at the client interface 176*f* of at least the first client device. The client request may further comprise a seeking position to which playback is to be time-shifted to. The seeking position comprises a time-based identifier which corresponds to an embedded time-based identifier within the first disparate live media output stream.

In accordance with another embodiment, the one or more functionalities enabled via the one or more constraints and rights may include a fourth functionality to resume playback within the programming content in the first disparate live media output stream. The first disparate live media output stream manifest associated with the first disparate live media output stream presented on the first client device comprises timing metadata. The timing metadata comprises embedded time-based identifiers. The one or more processors may be further configured to pause or terminate the playback of the first disparate live media output stream upon a first user selection. The one or more processors may be further configured to capture a stream identifier of the first disparate live media output stream, the program identifier of the programming content that is currently playing back, and timing metadata within the first disparate live media output stream. The client request further comprises the stream identifier and the timing metadata in addition to the program identifier. The one or more processors may be further configured to resume playback of the first disparate live media output stream on at least one of the first client device or a second client device upon a second user selection based on the captured stream identifier of the first disparate live media output stream, the program identifier of the programming content that is currently playing back, and the timing metadata. A user identifier of the first client device may be further associated with the second client device. In such an embodiment, the client request further comprises the stream identifier and the timing metadata in addition to the program identifier.

Various embodiments of the disclosure may provide a computer-readable medium, such as the non-transitory computer-readable medium 506, having stored thereon, computer implemented instruction that when executed by the processor 504 causes the media packaging and distribution system 102 to execute operations for publishing a disparate per-client live media output stream based on dynamic insertion of targeted non-programming content and customized programming content. In accordance with an embodiment, the processor 504 causes the media packaging and distribution system 102 to execute operations to receive a first manifest request, comprising one or more parameters, from a first client device, such as client device 132*a*. The processor 504 causes the media packaging and distribution system 102 to execute operations to determine a first additional content comprising a customized first programming content and a targeted first non-programming content for the first client device based on the one or more parameters and associated indexed metadata retrieved based on the one or more parameters. The processor 504 causes the media packaging and distribution system 102 to execute operations to generate the first programming schedule 111, for the first client device based on selected one or more live input stream and/or the one or more pre-encoded media assets, the associated indexed metadata, and the determined first additional content. The processor 504 causes the media packaging and distribution system 102 to execute operations to select one or more live input stream manifests and/or one or more pre-encoded media asset manifests published in the content delivery system 130 and associated indexed metadata based on the one or more parameters. The processor 504 causes the media packaging and distribution system 102 to execute operations to publish a first disparate live media output stream manifest for the first client device based on insertion of the selected one or more live input stream manifests and/or the one or more pre-encoded media asset manifests, the associated indexed metadata, and the determined first additional content in accordance with the first programming schedule 111, generated for the first client device.

Various embodiments of the disclosure may provide a computer-readable medium, such as the non-transitory computer-readable medium 506, having stored thereon, computer implemented instruction that when executed by the processor 504 causes the media packaging and distribution system 102 to execute operations for server-side dynamic insertion of programming content in an indexed disparate live media output stream. In accordance with an embodiment, the processor 504 causes the media packaging and distribution system 102 to execute operations to publish a first programming schedule that may comprise one or more functionalities enabled via one or more constraints and rights associated with at least a first disparate live media output stream. The published first programming schedule may reference one or more pre-encoded media assets and/or one or more live input streams. The processor 504 causes the media packaging and distribution system 102 to execute operations to generate an indexed first disparate live media output stream for a first client device based on the published first programming schedule. The processor 504 causes the media packaging and distribution system 102 to execute operations to receive a client request from the first client device based on a playback of the indexed first disparate live media output stream at the first client device. The client request comprises at least a program identifier referenced in the published first programming schedule with respect to a playback position in the published first programming schedule. The processor 504 causes the media packaging and distribution system 102 to execute operations to insert manifest data and indexed metadata of a programming content associated with the program identifier to a first disparate live media output stream manifest in accordance with the one or more functionalities. The processor 504 causes the media packaging and distribution system 102 to execute operations to at least one of alter the first disparate live media output stream or generate a second disparate live media output stream, based on the insertion of the manifest data and indexed metadata associated with the program identifier referenced in the first programming schedule. The altered first disparate live media output stream or the generated second disparate live media output stream comprises the manifest data, the indexed metadata and an updated playback position.

Various embodiments of the disclosure may provide a computer-readable medium, such as the non-transitory computer-readable medium 556, having stored thereon, computer implemented instruction that when executed by the processing system 552 causes the first client device, such as client device 132*a*, to execute operations for client-side dynamic presentation of programming content in an indexed disparate live media output stream. In accordance with an embodiment, the processing system 552 causes the first client device, such as the client device 132*a*, to execute operations to publish a first programming schedule that may comprise one or more functionalities enabled via one or more constraints and rights associated with at least a first disparate live media output stream. The published first programming schedule may reference one or more pre-encoded media assets and/or one or more live input streams. The processing system 552 causes the first client device to execute operations to generate an indexed first disparate live media output stream for a first client device based on the published first programming schedule. The processing system 552 causes the first client device to execute operations to receive a client request from the first client device based on a playback of the indexed first disparate live media output stream at the first client device. The client request comprises at least a program identifier referenced in the published first programming schedule with respect to a playback position in the published first programming schedule. The processing system 552 causes the first client device to execute operations to insert manifest data and indexed metadata of a programming content associated with the program identifier to a first disparate live media output stream manifest in accordance with the one or more functionalities. The processing system 552 causes the first client device to execute operations to at least one of alter the first disparate live media output stream or generate a second disparate live media output stream, based on the insertion of the manifest data and indexed metadata associated with the program identifier referenced in the first programming schedule. The altered first disparate live media output stream or the generated second disparate live media output stream comprises the manifest data, the indexed metadata and an updated playback position.

Existing systems for SSAI support live streaming and make decisions to insert non-programing content in near real-time. However, for On-Demand streaming, such decisions to insert non-programing content are made upfront. Further, legacy technology of the existing systems for server-side content insertion and client-side content presentation support a finite playback buffer as the encoder typically publishes a rolling window having limited duration. Accordingly, amount of control the user can excerpt to influence what non-programming content and programming content is shown may get limited. Further, a concern with SSAI may be scaling to support millions of simultaneous sessions. Furthermore, newer ad models are developing that rely less on interruptive video advertising and more on contextual based graphical treatment advertising within the program content. To this extent, SSAI systems have been able to circumvent ad blockers by requesting video ads on behalf of the client device and stitching them into the disparate live media output stream manifest.

To address at least the above problems, in accordance with the various embodiments of the present disclosure, the DACIS 103 in the media packaging and distribution system 102 may be configured to include not showing non-programming content that the user elected to skip or rated poorly in an earlier non-programming content break, or could enable the user to skip all non-programming content because the user interacted with an previous non-programming content or made a purchase and the advertiser elected to sponsor the remainder of the program.

The DACIS 103 may notified about graphical treatment opportunities within the content, make the necessary ad calls on behalf of the client device, and provide the client device with the information needed to execute the overlays via a secure out-of-band channel between the DACIS 103 and the client device. In many cases, a channel already exists to support passing the program indicators, such as start and end information, to the client device and Video Player Ad-Serving Interface (VPAID) ads that cannot be stitched.

The DACIS 103 may also provide an opportunity to leverage the 1:1 scale of traditional SSAI systems to support custom content choices and not just targeted advertising. For example, when a user selects to join a live stream, the CDS 105 coupled with the DACIS 103 may determine that, instead of joining the live stream for the last few minutes of a program, the user should instead be shown content more relevant to the next program. For example, showing a personalized set of basketball highlights and ads to a user who likely joined the stream to watch the basketball game that is coming on next.

Further, the DACIS 103 may be used to provide seamless failover between redundant streams for large events, thus improving reliability. While some client devices support primary and backup streams and are able to fail between them, many client devices do not. In such cases, the client device may attempt to join the alternative stream after occurrence of an event, such as a device failure or crash. For such clients, the DACIS 103 monitors both the primary and backup stream, and if there is a failure, inserts the alternative stream into the output manifest. Thus, the media packaging and distribution system 102 provides an enhanced, intelligent, and personalized viewer experience with increased appeal in order to retain and gain a wider audience.

Furthermore, the DACIS 103, in conjunction with the first client device, such as the client device 132*a*, may allow the simulation of an infinite live window (or an infinite playback buffer). Accordingly, the user, via the client interface at the first client device, may seek to a desired point scheduled backwards or forwards with respect to a live point in a playback buffer of the first disparate live media output stream, limited by business rules. To simulate "rewinding" beyond what is currently defined in the buffer, the first disparate live media output stream may cease to play out the next sequence of media and instead elect to have the next appended media segment in the first disparate live media output stream be the desired media segment, which is either previously played out or to be played out, at the desired time. Furthermore, there is no need to store the state of the first disparate live media output stream play out on a moment-to-moment basis, but rather what entire programming content was played and at what date/time. Only parameters necessary to reconstruct the state of the first disparate live media output stream from any moment are stream identifier, which is correlated to one or more schedules of programs, program identifier, and timing metadata of desired playback time.

In certain cases, the system, corresponding to the DACIS 103 and the first client device, may be enabled to seek the playhead ahead or behind a playout window of a disparate live media output stream, which may result in an updated playout buffer. Further, the system, corresponding to the DACIS 103 and the first client device, may enable a saved scheduled state that comprises stream identifier, program identifier, time identifier, and associated programming schedule, based on which the disparate live media output stream may be reconstructed to represent the exact or slightly altered disparate live media output stream from the past.

In accordance with another aspect, the system for the first client device, such as the client device 132a, may present play controls on the client interface to seek the playhead ahead or behind a playout window of a disparate live media output stream, which results in an updated playout buffer. Further, the system for the first client device may present exact or slightly altered disparate live media output stream from the past based on a saved scheduled state at the DACIS 103. The first client device playing the disparate live media output stream may be configured to periodically store current playhead position and program identifier such that upon pausing, stopping, or termination of the playback session on the first client device, a second client device may be given an option to resume playback against the same program and last stored time position by appending the corresponding set of pre-encoded media content and indexed metadata associated to the disparate live media output stream manifests in accordance with disparate live media output stream constraints and rights.

The DACIS 103, the CDS 105, the CPDS 107, the stream publishing engine 114, PEM 115, indexing and storage system 116, the stream selection service 142, and the repository of schedules, rights, and user preferences database 144 in conjunction with each other, provide significant productivity and efficiency improvements since the process of generating disparate live media output streams with additional content is specific to each consumer device. The disparate live media output streams are simplified as the generated disparate live media output streams are independent of a requirement to re-process, that is re-encode and re-package, various live input streams for media distribution to the plurality of consumer devices in real time or near-real time. Thus, the network provider now may provide live channel offerings in a cost-effective manner.

Various components, as described above in FIG. 1B, enable the media packaging and distribution system 102 to leverage the modern streaming protocols, based on which the media packaging and distribution system 102 generates disparate live media output streams of the live broadcast channels with additional content and one or more decision points to influence the remaining disparate live media output streams. The disparate live media output streams may be generated based on insertion of live input streams into a generated disparate live media output stream using pre-encoded media assets. In this regard, manifests from the live input streams and the pre-encoded media assets may be manipulated and produced for distribution of the disparate live media output stream.

As the media content itself does not need to be processed beyond the initial creation of the live input streams and pre-encoded media assets prepared for distribution, it is extremely inexpensive to provide such disparate live media output streams and alternate disparate live media output stream (in case of stream failover). It may be based solely on the cost to manipulate the manifests, which provide the instructions for the media players in the client devices 132a, . . . , 132n to execute. The media packaging and distribution system 102 may also support targeted ad insertion and customized programming content insertion on a per client basis and may further leverage the processing power of the individual client devices 132a, . . . , 132n to insert targeted channel graphics and graphical treatment advertisements and promotions.

The media packaging and distribution system 102, in conjunction with the first client device, may also support unique functionality where the disparate live media output stream is required to effectively be re-stitched/rebuilt in real-time using indexed pre-encoded media assets or live input stream assets according to the time-shifting request originating from the user. The method described herein have additional benefits as such methods are optimized for scale and are extremely efficient. Having no need to store the state of the disparate live media output stream playout in a moment-to-moment basis, but rather what entire programming content was played and what date/time, as well as having each program that was played out indexed indefinitely in the indexing and storage system 116, the only parameters necessary to reconstruct the state of the disparate live media output stream from any moment are stream identifier, which is correlated to one or more published schedules of the programming content, program identifier, and timing metadata of desired playback time. The timing metadata plays a key role in the reconstruction, as it determines the precise schedule and position within the desired programming to begin playout.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for publishing a disparate per-client live media output stream based on dynamic insertion of targeted non-programming content and customized programming content.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
one or more processors in a first client device, wherein the one or more processors are configured to:
generate a client request based on a user input when an indexed first disparate live media output stream is played back or to be played back at a client interface of the first client device,
wherein the client request comprises at least a program identifier referenced in a published first programming schedule with respect to a playback position in the published first programming schedule, and
wherein the published first programming schedule comprises one or more functionalities enabled via one or more constraints and rights associated with at least the indexed first disparate live media output stream; and
present at least one of an altered first disparate live media output stream or a generated second disparate live media output stream at the client interface based on the generated client request,
wherein the alteration of the first disparate live media output stream or the generation of the second disparate live media output stream is based on an insertion of manifest data and indexed metadata associated with the program identifier, associated with a programming content, referenced in the published first programming schedule, and
wherein the altered first disparate live media output stream or the generated second disparate live media output stream comprises the manifest data, the indexed metadata and an updated playback position.

2. The system according to claim 1, wherein the manifest data corresponds to one or both of an encoded live input stream and a pre-encoded media asset associated with the program identifier,
wherein the manifest data defines at least an associated media content, one or more programming indicators, timing metadata, one or more media content identifiers, and one or more contextual event identifiers, and
wherein the timing metadata corresponds to the playback position in the published first programming schedule.

3. The system according to claim 1, wherein the one or more functionalities enabled via the one or more constraints and rights include a first functionality to restart the programming content in the first disparate live media output stream that is presented on at least the first client device.

4. The system according to claim 3, wherein the one or more processors are further configured to determine the program identifier based on a request for a list of programming content associated with the first disparate live media output stream from a repository of schedules, rights, and user preferences database, and
wherein the list of programming content comprises additional metadata that controls the first functionality of a current programming content and each of past programming content as enabled via the one or more constraints and rights in the published first programming schedule.

5. The system according to claim 3, wherein the client request is generated by the first client device based on a user input provided to restart the programming content that is currently or recently played back in the first disparate live media output stream in accordance with the first functionality defined in the published first programming schedule.

6. The system according to claim 1, wherein the one or more functionalities enabled via the one or more constraints and rights include a second functionality to skip to a future scheduled programming content in the first disparate live media output stream, and
wherein the second functionality is allowed for a first set of pre-encoded media content or a live input stream that comprises a second set of pre-encoded media content.

7. The system according to claim 6, wherein the one or more processors are further configured to request a list of programming content associated with the first disparate live media output stream from a repository of schedules, rights, and user preferences database, and
wherein the list of programming content comprises additional metadata that controls the second functionality of the future scheduled programming content as enabled via the one or more constraints and rights in the published first programming schedule.

8. The system according to claim 7, wherein the client request is generated by the first client device based on the user input that corresponds to a selection of the future scheduled programming content from the list of programming content, and
wherein the program identifier referenced in the published first programming schedule corresponds to the selected future scheduled programming content that is scheduled to be played out during a future timestamp after a live point in a playback buffer of the first disparate live media output stream.

9. The system according to claim 1, wherein the one or more functionalities enabled via the one or more constraints and rights include a third functionality to time-shift within the programming content in the first disparate live media output stream,
wherein the first disparate live media output stream manifest associated with the first disparate live media output stream presented at the first client device comprises timing metadata, and
wherein the timing metadata comprises embedded time-based identifiers corresponding to media segments in the first disparate live media output stream.

10. The system according to claim 9, wherein the one or more processors are further configured to:
present a client interface at the first client device in accordance with the third functionality which corresponds to each programming content as enabled via the one or more constraints and rights; and
enable a seeking option within the programming content in the first disparate live media output stream at the client interface of at least the first client device,
wherein the client request further comprises a seeking position to which playback is to be time-shifted to, and
wherein the seeking position comprises a time-based identifier which corresponds to an embedded time-based identifier within the first disparate live media output stream.

11. The system according to claim 1, wherein the one or more functionalities enabled via the one or more constraints and rights include a fourth functionality to resume playback within the programming content in the first disparate live media output stream,
wherein the first disparate live media output stream manifest associated with the first disparate live media output stream presented on the first client device comprises timing metadata, and
wherein the timing metadata comprises embedded time-based identifiers.

12. The system according to claim 11, wherein the one or more processors are further configured to:
pause or terminate the playback of the first disparate live media output stream upon a first user selection;
capture a stream identifier of the first disparate live media output stream, the program identifier of the programming content that is currently playing back, and timing metadata within the first disparate live media output stream,
wherein the client request further comprises the stream identifier and the timing metadata in addition to the program identifier; and
resume playback of the first disparate live media output stream on at least one of the first client device or a second client device upon a second user selection based on the captured stream identifier of the first disparate live media output stream, the program identifier of the programming content that is currently playing back, and the timing metadata,
wherein a user identifier of the first client device is further associated with the second client device, and
wherein the client request further comprises the stream identifier and the timing metadata in addition to the program identifier.

13. A method, comprising:
by one or more processors in a first client device:
generating a client request based on a user input when an indexed first disparate live media output stream is played back or to be played back at a client interface of the first client device, wherein the client request comprises at least a program identifier referenced in a published first programming schedule with respect to a playback position in the published first programming schedule, and wherein the published first programming schedule comprises one or more functionalities enabled via one or more constraints and rights associated with at least the indexed first disparate live media output stream; and presenting at least one of an altered first disparate live media output stream or a generated second disparate live media output stream at the client interface based on the generated client request, wherein the alteration of the first disparate live media output stream or the generation of the second disparate live media output stream is based on an insertion of manifest data and indexed metadata associated with the program identifier, associated with a programming content, referenced in the published first programming schedule, and wherein the altered first disparate live media output stream or the generated second disparate live media output stream comprises the manifest data, the indexed metadata and an updated playback position.

14. The method according to claim 13, wherein the manifest data corresponds to one or both of an encoded live input stream and a pre-encoded media asset associated with the program identifier, wherein the manifest data defines at least an associated media content, one or more programming indicators, timing metadata, one or more media content identifiers, and one or more contextual event identifiers, and wherein the timing metadata corresponds to the playback position in the published first programming schedule.

15. The method according to claim 13, wherein the one or more functionalities enabled via the one or more constraints and rights include a first functionality to restart the programming content in the first disparate live media output stream that is presented on at least the first client device.

16. The method according to claim 15, further comprising determining, by the one or more processors, the program identifier based on a request for a list of programming content associated with the first disparate live media output stream from a repository of schedules, rights, and user preferences database, and wherein the list of programming content comprises additional metadata that controls the first functionality of a current programming content and each of past programming content as enabled via the one or more constraints and rights in the published first programming schedule.

17. The method according to claim 15, wherein the client request is generated by the first client device based on a user input provided to restart the programming content that is currently or recently played back in the first disparate live media output stream in accordance with the first functionality defined in the published first programming schedule.

18. The method according to claim 13, wherein the one or more functionalities enabled via the one or more constraints and rights include a second functionality to skip to a future scheduled programming content in the first disparate live media output stream, and wherein the second functionality is allowed for a first set of pre-encoded media content or a live input stream that comprises a second set of pre-encoded media content.

19. The method according to claim 18, further comprising requesting, by the one or more processors, a list of programming content associated with the first disparate live media output stream from a repository of schedules, rights, and user preferences database, and wherein the list of programming content comprises additional metadata that controls the second functionality of the future scheduled programming content as enabled via the one or more constraints and rights in the published first programming schedule.

20. The method according to claim 19, wherein the client request is generated by the first client device based on the user input that corresponds to a selection of the future scheduled programming content from the list of programming content, and wherein the program identifier referenced in the published first programming schedule corresponds to the selected future scheduled programming content that is scheduled to be played out during a future timestamp after a live point in a playback buffer of the first disparate live media output stream.

21. The method according to claim 13, wherein the one or more functionalities enabled via the one or more constraints and rights include a third functionality to time-shift within the programming content in the first disparate live media output stream, wherein the first disparate live media output stream manifest associated with the first disparate live media output stream presented at the first client device comprises timing metadata, and wherein the timing metadata comprises embedded time-based identifiers corresponding to media segments in the first disparate live media output stream.

22. The method according to claim 21, further comprising:

presenting, by the one or more processors, a client interface at the first client device in accordance with the third functionality which corresponds to each programming content as enabled via the one or more constraints and rights; and enabling, by the one or more processors, a seeking option within the programming content in the first disparate live media output stream at the client interface of at least the first client device, wherein the client request further comprises a seeking position to which playback is to be time-shifted to, and wherein the seeking position comprises a time-based identifier which corresponds to an embedded time-based identifier within the first disparate live media output stream.

23. The method according to claim 13, wherein the one or more functionalities enabled via the one or more constraints and rights include a fourth functionality to resume playback within the programming content in the first disparate live media output stream, wherein the first disparate live media output stream manifest associated with the first disparate live media output stream presented on the first client device comprises timing metadata, and wherein the timing metadata comprises embedded time-based identifiers.

24. The method according to claim 23, further comprising:

pausing or terminating, by the one or more processors, the playback of the first disparate live media output stream upon a first user selection; and capturing, by the one or more processors, a stream identifier of the first disparate live media output stream, the program identifier of the programming content that is currently playing back, and timing metadata within the first disparate live media output stream, wherein the client request further comprises the stream identifier and the timing metadata in addition to the program identifier; and resuming, by the one or more processors, playback of the first disparate live media output stream on at least one of the first client device or a second client device upon a second user selection based on the captured stream identifier of the first disparate live media output stream, the program identifier of the programming content that is currently playing back, and the timing metadata, wherein a user identifier of the first client device is further associated with the second client device, and wherein the client request further comprises the stream identifier and the timing metadata in addition to the program identifier.

25. A non-transitory computer-readable medium having stored thereon, computer implemented instruction that when executed by a processor in a computer, causes the computer to execute operations, the operations comprising:

generating a client request based on a user input when an indexed first disparate live media output stream is played back or to be played back at a client interface of a first client device, wherein the client request comprises at least a program identifier referenced in a published first programming schedule with respect to a playback position in the published first programming schedule, and wherein the published first programming schedule comprises one or more functionalities enabled via one or more constraints and rights associated with at least the indexed first disparate live media output stream; and presenting at least one of an altered first disparate live media output stream or a generated second disparate live media output stream at the client interface based on the generated client request, wherein the alteration of the first disparate live media output stream or the generation of the second disparate live media output stream is based on an insertion of manifest data and indexed metadata associated with the program identifier, associated with a programming content, referenced in the published first programming schedule, and wherein the altered first disparate live media output stream or the generated second disparate live media output stream comprises the manifest data, the indexed metadata and an updated playback position.

* * * * *